US012395809B2

(12) United States Patent
Thomas et al.

(10) Patent No.: US 12,395,809 B2
(45) Date of Patent: Aug. 19, 2025

(54) AUDIBILITY AT USER LOCATION THROUGH MUTUAL DEVICE AUDIBILITY

(71) Applicants: DOLBY LABORATORIES LICENSING CORPORATION, San Francisco, CA (US); DOLBY INTERNATIONAL AB, Dublin (IE)

(72) Inventors: Mark R. P. Thomas, Walnut Creek, CA (US); Daniel Arteaga, Barcelona (ES); Christopher Graham Hines, Sydney (AU); Davide Scaini, Barcelona (ES); Benjamin Southwell, Gledswood Hills (AU); Avery Bruni, San Francisco, CA (US); Olha Michelle Townsend, San Francisco, CA (US)

(73) Assignees: Dolby Laboratories Licensing Corporation, San Francisco, CA (US); Dolby International AB, Dublin (IE)

( * ) Notice: Subject to any disclaimer, the term of this patent is extended or adjusted under 35 U.S.C. 154(b) by 158 days.

(21) Appl. No.: 18/327,797

(22) PCT Filed: Dec. 2, 2021

(86) PCT No.: PCT/US2021/061506

§ 371 (c)(1),
(2) Date: Jun. 1, 2023

(87) PCT Pub. No.: WO2022/119990

PCT Pub. Date: Jun. 9, 2022

(65) Prior Publication Data

US 2024/0187811 A1 Jun. 6, 2024

Related U.S. Application Data

(60) Provisional application No. 63/120,887, filed on Dec. 3, 2020, provisional application No. 63/121,007, filed (Continued)

(30) Foreign Application Priority Data

Dec. 31, 2020 (ES) ................................ ES202031212
May 20, 2021 (ES) ................................ ES202130458
Jul. 26, 2021 (ES) ................................ ES202130724

(51) Int. Cl.
*H04S 7/00* (2006.01)

(52) U.S. Cl.
CPC .............. *H04S 7/303* (2013.01); *H04S 7/307* (2013.01); *H04S 2400/11* (2013.01); *H04S 2400/13* (2013.01); *H04S 2400/15* (2013.01)

(58) Field of Classification Search
None
See application file for complete search history.

(56) References Cited

U.S. PATENT DOCUMENTS 4,773,094 A 9/1988 Dolby
6,088,461 A 7/2000 Lin (Continued)

FOREIGN PATENT DOCUMENTS

EP 3351015 B1 4/2019
EP 3417544 B1 12/2019

(Continued)

OTHER PUBLICATIONS

Isaac Amidror, "Scattered data interpolation methods for electronic imaging systems: a survey" in Journal of Electronic Imaging vol. 11, No. 2, Apr. 2002, pp. 157-176. 20 pages.

(Continued)

*Primary Examiner* — Kenny H Truong

(57) ABSTRACT

Some methods involve causing a plurality of audio devices in an audio environment to reproduce audio data, each audio device of the plurality of audio devices including at least one loudspeaker and at least one microphone, determining audio device location data including an audio device location for (Continued)

each audio device of the plurality of audio devices and obtaining microphone data from each audio device of the plurality of audio devices. Some methods involve determining a mutual audibility for each audio device of the plurality of audio devices relative to each other audio device of the plurality of audio devices, determining a user location of a person in the audio environment, determining a user location audibility of each audio device of the plurality of audio devices at the user location and controlling one or more aspects of audio device playback based, at least in part, on the user location audibility.

21 Claims, 36 Drawing Sheets

Related U.S. Application Data on Dec. 3, 2020, provisional application No. 63/155,369, filed on Mar. 2, 2021, provisional application No. 63/201,561, filed on May 4, 2021, provisional application No. 63/203,403, filed on Jul. 21, 2021, provisional application No. 63/224,778, filed on Jul. 22, 2021, provisional application No. 63/261,769, filed on Sep. 28, 2021.

(56) References Cited

U.S. PATENT DOCUMENTS

| | | | |
|---|---|---|---|
| 7,653,204 | B2 | 1/2010 | Chen |
| 7,697,699 | B2 | 4/2010 | Ozawa |
| 7,711,557 | B2 | 5/2010 | Ozawa |
| 7,805,210 | B2 | 9/2010 | Cucos |
| 8,682,675 | B2 | 3/2014 | Togami |
| 8,718,537 | B2 | 5/2014 | Sakata |
| 8,743,658 | B2 | 6/2014 | Claussen |
| 8,861,756 | B2 | 10/2014 | Zhu |
| 8,879,741 | B2 | 11/2014 | Fukuyama |
| 9,031,268 | B2 | 5/2015 | Fejzo |
| 9,107,023 | B2 | 8/2015 | Ninan |
| 9,197,978 | B2 | 11/2015 | Usami |
| 9,208,767 | B2 | 12/2015 | Su |
| 9,408,011 | B2 | 8/2016 | Kim |
| 9,472,203 | B1 | 10/2016 | Ayrapetian |
| 9,497,544 | B2 | 11/2016 | Mohammad |
| 9,549,253 | B2 | 1/2017 | Alexandridis |
| 9,589,575 | B1 | 3/2017 | Ayrapetian |
| 9,609,141 | B2 | 3/2017 | Beaucoup |
| 9,769,587 | B2 | 9/2017 | Schevciw |
| 9,788,119 | B2 | 10/2017 | Vilermo |
| 9,788,120 | B2 | 10/2017 | Miyasaka |
| 9,971,012 | B2 | 5/2018 | Nakamura |
| 10,070,244 | B1 | 9/2018 | Dabney |
| 10,080,088 | B1 | 9/2018 | Yang |
| 10,270,642 | B2 | 4/2019 | Zhang |
| 10,331,396 | B2 | 6/2019 | Habets |
| 10,462,598 | B1 | 10/2019 | Marina |
| 10,524,053 | B1 | 12/2019 | Moore |
| 10,681,463 | B1 | 6/2020 | Beckhardt |
| 10,748,544 | B2 | 8/2020 | Nakadai |
| 2002/0035456 | A1 | 3/2002 | Cremers |
| 2008/0004861 | A1 | 1/2008 | Holzrichter |
| 2010/0217590 | A1 | 8/2010 | Nemer |
| 2011/0091055 | A1 | 4/2011 | Leblanc |
| 2013/0058492 | A1 | 3/2013 | Silzle |
| 2013/0279707 | A1 | 10/2013 | Tagaeto |
| 2014/0105405 | A1 | 4/2014 | Mahabub |
| 2016/0241955 | A1 | 8/2016 | Thyssen |
| 2016/0302005 | A1 | 10/2016 | Fedosov |
| 2017/0041726 | A1 | 2/2017 | Jarvis |
| 2018/0288558 | A1 | 10/2018 | Umminger, III |
| 2018/0299527 | A1 | 10/2018 | Helwani |
| 2019/0132679 | A1 | 5/2019 | Poulsen |
| 2019/0132685 | A1 | 5/2019 | Skoglund |
| 2019/0237091 | A1 | 8/2019 | Jones |
| 2019/0253801 | A1 | 8/2019 | Arteaga |
| 2019/0355373 | A1 | 11/2019 | Nesta |
| 2020/0042285 | A1 | 2/2020 | Choi |
| 2020/0066295 | A1 | 2/2020 | Karimian-Azari |
| 2020/0084537 | A1 * | 3/2020 | Milne ...................... H04R 3/00 |
| 2020/0107116 | A1 | 4/2020 | Frank |
| 2020/0112813 | A1 | 4/2020 | Sanger |
| 2020/0288262 | A1 | 9/2020 | Eronen |
| 2023/0040846 | A1 | 2/2023 | Thomas |

FOREIGN PATENT DOCUMENTS

| | | | |
|---|---|---|---|
| WO | 2018064410 | A1 | 4/2018 |
| WO | 2019078816 | A1 | 4/2019 |
| WO | 2019209973 | A1 | 10/2019 |
| WO | 2019229746 | A1 | 12/2019 |
| WO | 202023856 | A1 | 1/2020 |
| WO | 2021021707 | A1 | 2/2021 |
| WO | 2021021857 | A1 | 2/2021 |
| WO | 2021127286 | A1 | 6/2021 |

OTHER PUBLICATIONS

Kozintsev, I. et al., “Position calibration of microphones and loudspeakers in distributed computing platforms”, IEEE Transactions on Speech and Audio Processing, Year: 2005 vol. 13 , Issue: 1 pp. 70-83.

Madhu, Nilesh et al; “Robust Speaker Localization Through Adaptive Weighted Pair Tdoa (AWEPAT) Estimation”; 2005; Interspeech; pp. 2341-2344.

Nadiri, O. et al.; “Localization of Multiple Speakers Under High Reverberation Using a Spherical Microphone Array and the Direct-Path Dominance Test”; Oct. 2014; IEEE/ACM Transactions on Audio, Speech, and Language Processing; vol. 22; No. 10; pp. 1494-1505.

Tashev, Ivan J. et al; “Cost Function for Sound Source Localization With Arbitrary Microphone Arrays”; 2017; IEEE; Hands-free Speech Communications and Microphone Arrays (HSCMA); pp. 74-80.

Tehrani, Ali Kafaei et al.; “Sound Source Localization Using Time Differences of Arrival; Euclidean Distance Matrices Based Approach”; 2018; 9th International Symposium on Telecommunications; p. 91-95.

Unpublished U.S. Appl. No. 62/663,302, filed Apr. 27, 2018. Per MPEP 609.04(A).

* cited by examiner

400

1800a

1800c

AUDIBILITY AT USER LOCATION THROUGH MUTUAL DEVICE AUDIBILITY

CROSS-REFERENCE TO RELATED APPLICATIONS

This application is U.S. National Stage of PCT Application No. PCT/US2021/061506, filed Dec. 2, 2021, which claims priority to the following applications:

U.S. Provisional Application No. 63/121,007 filed Dec. 3, 2020;

U.S. Provisional Application No. 63/261,769 filed Sep. 28, 2021;

Spanish Patent Application No. P202130724 filed Jul. 26, 2021;

U.S. Provisional Application No. 63/120,887 filed Dec. 3, 2020;

U.S. Provisional Application No. 63/201,561 filed May 4, 2021;

Spanish Patent Application No. P202031212 filed Dec. 3, 2020;

Spanish Patent Application No. P202130458 filed May 20, 2021;

U.S. Provisional Application No. 63/155,369 filed Mar. 2, 2021;

U.S. Provisional Application No. 63/203,403 filed Jul. 21, 2021;

U.S. Provisional Application No. 63/224,778 filed Jul. 22, 2021;

each of which is hereby incorporated by reference in its entirety.

TECHNICAL FIELD

This disclosure pertains to devices, systems and methods for determining audibility at a user location and for processing audio for playback according to the audibility at the user location.

BACKGROUND

Audio devices are widely deployed in many homes, vehicles and other environments. Although existing systems and methods for controlling audio devices provide benefits, improved systems and methods would be desirable.

NOTATION AND NOMENCLATURE

Throughout this disclosure, including in the claims, the terms "speaker," "loudspeaker" and "audio reproduction transducer" are used synonymously to denote any sound-emitting transducer (or set of transducers). A typical set of headphones includes two speakers. A speaker may be implemented to include multiple transducers (e.g., a woofer and a tweeter), which may be driven by a single, common speaker feed or multiple speaker feeds. In some examples, the speaker feed(s) may undergo different processing in different circuitry branches coupled to the different transducers.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X-M inputs are received from an external source) may also be referred to as a decoder system.

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

As used herein, a "smart device" is an electronic device, generally configured for communication with one or more other devices (or networks) via various wireless protocols such as Bluetooth, Zigbee, near-field communication, Wi-Fi, light fidelity (Li-Fi), 3G, 4G, 5G, etc., that can operate to some extent interactively and/or autonomously. Several notable types of smart devices are smartphones, smart cars, smart thermostats, smart doorbells, smart locks, smart refrigerators, phablets and tablets, smartwatches, smart bands, smart key chains and smart audio devices. The term "smart device" may also refer to a device that exhibits some properties of ubiquitous computing, such as artificial intelligence.

Herein, we use the expression "smart audio device" to denote a smart device that is either a single-purpose audio device or a multi-purpose audio device (e.g., a smart speaker or other audio device that implements at least some aspects of virtual assistant functionality). A single-purpose audio device is a device (e.g., a television (TV)) including or coupled to at least one microphone (and optionally also including or coupled to at least one speaker and/or at least one camera), and which is designed largely or primarily to achieve a single purpose. For example, although a TV typically can play (and is thought of as being capable of playing) audio from program material, in most instances a modern TV runs some operating system on which applications run locally, including the application of watching television. In this sense, a single-purpose audio device having speaker(s) and microphone(s) is often configured to run a local application and/or service to use the speaker(s) and microphone(s) directly. Some single-purpose audio devices may be configured to group together to achieve playing of audio over a zone or user configured area.

One common type of multi-purpose audio device is an audio device (e.g., a smart speaker) that implements at least some aspects of virtual assistant functionality, although other aspects of virtual assistant functionality may be implemented by one or more other devices, such as one or more servers with which the multi-purpose audio device is configured for communication. Such a multi-purpose audio device may be referred to herein as a "virtual assistant." A virtual assistant is a device (e.g., a smart speaker or voice assistant integrated device) including or coupled to at least one microphone (and optionally also including or coupled to at least one speaker and/or at least one camera). In some examples, a virtual assistant may provide an ability to utilize multiple devices (distinct from the virtual assistant) for applications that are in a sense cloud-enabled or otherwise not completely implemented in or on the virtual assistant itself. In other words, at least some aspects of virtual assistant functionality, e.g., speech recognition functionality, may be implemented (at least in part) by one or more servers or other devices with which a virtual assistant may communication via a network, such as the Internet. Virtual assistants may sometimes work together, e.g., in a discrete and conditionally defined way. For example, two or more virtual assistants may work together in the sense that one of them, e.g., the one which is most confident that it has heard a wakeword, responds to the wakeword. The connected virtual assistants may, in some implementations, form a sort of constellation, which may be managed by one main application which may be (or implement) a virtual assistant.

As used herein, the terms "program stream" and "content stream" refer to a collection of one or more audio signals, and in some instances video signals, at least portions of which are meant to be heard together. Examples include a selection of music, a movie soundtrack, a movie, a television program, the audio portion of a television program, a podcast, a live voice call, a synthesized voice response from a smart assistant, etc. In some instances, the content stream may include multiple versions of at least a portion of the audio signals, e.g., the same dialogue in more than one language. In such instances, only one version of the audio data or portion thereof (e.g., a version corresponding to a single language) is intended to be reproduced at one time.

SUMMARY

At least some aspects of the present disclosure may be implemented via methods. Some such methods may involve causing, by a control system, a plurality of audio devices in an audio environment to reproduce audio data. Each audio device of the plurality of audio devices may include at least one loudspeaker and at least one microphone. Some such methods may involve determining, by the control system, audio device location data including an audio device location for each audio device of the plurality of audio devices. Some such methods may involve obtaining, by the control system, microphone data from each audio device of the plurality of audio devices. The microphone data may correspond, at least in part, to sound reproduced by loudspeakers of other audio devices in the audio environment.

Some such methods may involve determining, by the control system, a mutual audibility for each audio device of the plurality of audio devices relative to each other audio device of the plurality of audio devices. Some such methods may involve determining, by the control system, a user location of a person in the audio environment. Some such methods may involve determining, by the control system, a user location audibility of each audio device of the plurality of audio devices at the user location.

Some such methods may involve controlling one or more aspects of audio device playback based, at least in part, on the user location audibility. In some examples, the one or more aspects of audio device playback may include leveling and/or equalization.

In some implementations, determining the audio device location data may involve an audio device auto-location process. In some such implementations, the audio device auto-location process may involve obtaining direction of arrival data for each audio device of the plurality of audio devices. Alternatively, or additionally, in some examples the audio device auto-location process may involve obtaining time of arrival data for each audio device of the plurality of audio devices. According to some implementations, determining the user location may be based, at least in part, on direction of arrival data and/or time of arrival data corresponding to one or more utterances of the person.

In some examples, determining the mutual audibility for each audio device may involve determining a mutual audibility matrix. In some such examples, determining the mutual audibility matrix may involve a process of mapping decibels relative to full scale to decibels of sound pressure level. According to some implementations, the mutual audibility matrix may include measured transfer functions between each audio device of the plurality of audio devices. In some examples, the mutual audibility matrix may include values for each frequency band of a plurality of frequency bands.

Some methods may involve determining an interpolated mutual audibility matrix by applying an interpolant to measured audibility data. In some examples, determining the interpolated mutual audibility matrix may involve applying a decay law model that is based in part on a distance decay constant. In some examples, the distance decay constant may include a per-device parameter and/or an audio environment parameter. In some instances, the decay law model may be frequency band based. According to some examples, the decay law model may include a critical distance parameter.

Some methods may involve estimating an output gain for each audio device of the plurality of audio devices according to values of the mutual audibility matrix and the decay law model. In some examples, estimating the output gain for each audio device may involve determining a least squares solution to a function of values of the mutual audibility matrix and the decay law model. Some methods may involve determining values for the interpolated mutual audibility matrix according to a function of the output gain for each audio device, the user location and each audio device location. In some examples, the values for the interpolated mutual audibility matrix may correspond to the user location audibility of each audio device.

Some methods may involve equalizing frequency band values of the interpolated mutual audibility matrix. Some methods may involve applying a delay compensation vector to the interpolated mutual audibility matrix.

According to some implementations, the audio environment may include at least one output-only audio device having at least one loudspeaker but no microphone. In some such examples, the method may involve determining the audibility of the at least one output-only audio device at the audio device location of each audio device of the plurality of audio devices.

In some implementations, the audio environment may include one or more input-only audio devices having at least one microphone but no loudspeaker. In some such examples, the method may involve determining an audibility of each loudspeaker-equipped audio device in the audio environment at a location of each of the one or more input-only audio devices.

In some examples, the method may involve causing, by the control system, each audio device of the plurality of audio devices to insert one or more frequency range gaps into audio data being reproduced by one or more loudspeakers of each audio device.

According to some examples, causing the plurality of audio devices to reproduce audio data may involve causing each audio device of the plurality of audio devices to play back audio when all other audio devices in the audio environment are not playing back audio.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented via one or more non-transitory media having software stored thereon.

At least some aspects of the present disclosure may be implemented via apparatus. For example, one or more devices may be capable of performing, at least in part, the methods disclosed herein. In some implementations, an apparatus may include an interface system and a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. In some examples, the apparatus may be an audio device, such as one of the audio devices disclosed herein. However, in some implementations the apparatus may be another type of device, such as a mobile device, a laptop, a server, etc. In some implementations, the apparatus may be an orchestrating device, such as what is referred to herein as a smart home hub, or via another type of orchestrating device.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

DETAILED DESCRIPTION OF EMBODIMENTS

Figure 1:
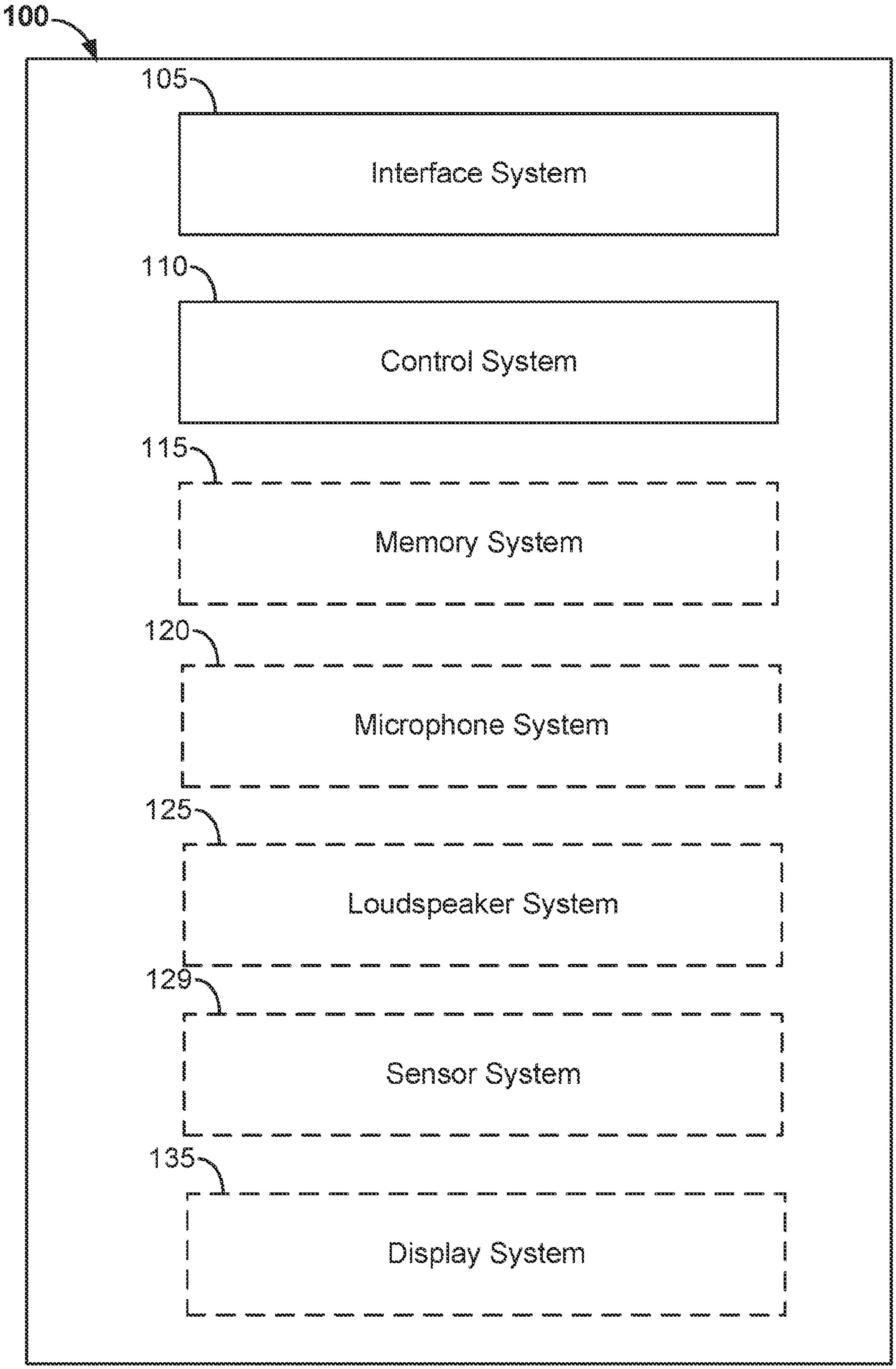
FIG. 1 is a block diagram that shows examples of components of an apparatus capable of implementing various aspects of this disclosure.

FIG. 1 is a block diagram that shows examples of components of an apparatus capable of implementing various aspects of this disclosure. According to some examples, the apparatus 100 may be, or may include, a smart audio device that is configured for performing at least some of the methods disclosed herein. In other implementations, the apparatus 100 may be, or may include, another device that is configured for performing at least some of the methods disclosed herein, such as a laptop computer, a cellular telephone, a tablet device, a smart home hub, etc. In some such implementations the apparatus 100 may be, or may include, a server. In some implementations the apparatus 100 may be configured to implement what may be referred to herein as an "orchestrating device" or an "audio session manager."

In this example, the apparatus 100 includes an interface system 105 and a control system 110. The interface system 105 may, in some implementations, be configured for communication with one or more devices that are executing, or configured for executing, software applications. Such software applications may sometimes be referred to herein as "applications" or simply "apps." The interface system 105 may, in some implementations, be configured for exchanging control information and associated data pertaining to the applications. The interface system 105 may, in some implementations, be configured for communication with one or more other devices of an audio environment. The audio environment may, in some examples, be a home audio environment. In other examples, the audio environment may be another type of environment, such as an office environment, a vehicle environment, a park or other outdoor environment, etc. The interface system 105 may, in some implementations, be configured for exchanging control information and associated data with audio devices of the audio environment. The control information and associated data may, in some examples, pertain to one or more applications with which the apparatus 100 is configured for communication.

The interface system 105 may, in some implementations, be configured for receiving audio program streams. The audio program streams may include audio signals that are scheduled to be reproduced by at least some speakers of the environment. The audio program streams may include spatial data, such as channel data and/or spatial metadata. The interface system 105 may, in some implementations, be configured for receiving input from one or more microphones in an environment.

The interface system 105 may include one or more network interfaces and/or one or more external device interfaces (such as one or more universal serial bus (USB) interfaces). According to some implementations, the interface system 105 may include one or more wireless interfaces. The interface system 105 may include one or more devices for implementing a user interface, such as one or more microphones, one or more speakers, a display system, a touch sensor system and/or a gesture sensor system. In some examples, the interface system 105 may include one or more interfaces between the control system 110 and a memory system, such as the optional memory system 115 shown in FIG. 1. However, the control system 110 may include a memory system in some instances.

The control system 110 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components.

In some implementations, the control system 110 may reside in more than one device. For example, a portion of the control system 110 may reside in a device within one of the environments depicted herein and another portion of the control system 110 may reside in a device that is outside the environment, such as a server, a mobile device (e.g., a smartphone or a tablet computer), etc. In other examples, a portion of the control system 110 may reside in a device within one of the environments depicted herein and another portion of the control system 110 may reside in one or more other devices of the environment. For example, control system functionality may be distributed across multiple smart audio devices of an environment, or may be shared by an orchestrating device (such as what may be referred to herein as a smart home hub) and one or more other devices of the environment. The interface system 105 also may, in some such examples, reside in more than one device.

In some implementations, the control system 110 may be configured for performing, at least in part, the methods disclosed herein. Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. The one or more non-transitory media may, for example, reside in the optional memory system 115 shown in FIG. 1 and/or in the control system 110. Accordingly, various innovative aspects of the subject matter described in this disclosure can be implemented in one or more non-transitory media having software stored thereon. The software may, for example, include instructions for controlling at least one device to process audio data. The software may, for example, be executable by one or more components of a control system such as the control system 110 of FIG. 1.

In some examples, the apparatus 100 may include the optional microphone system 120 shown in FIG. 1. The optional microphone system 120 may include one or more microphones. In some implementations, one or more of the microphones may be part of, or associated with, another device, such as a speaker of the speaker system, a smart audio device, etc. In some examples, the apparatus 100 may not include a microphone system 120. However, in some such implementations the apparatus 100 may nonetheless be configured to receive microphone data for one or more microphones in an audio environment via the interface system 110.

According to some implementations, the apparatus 100 may include the optional loudspeaker system 125 shown in FIG. 1. The optional loudspeaker system 125 may include one or more loudspeakers, which also may be referred to herein as "speakers." In some examples, at least some loudspeakers of the optional loudspeaker system 125 may be arbitrarily located. For example, at least some speakers of the optional loudspeaker system 125 may be placed in locations that do not correspond to any standard prescribed loudspeaker layout, such as Dolby 5.1, Dolby 5.1.2, Dolby 7.1, Dolby 7.1.4, Dolby 9.1, Hamasaki 22.2, etc. In some such examples, at least some loudspeakers of the optional speaker system 125 may be placed in locations that are convenient to the space (e.g., in locations where there is space to accommodate the loudspeakers), but not in any standard prescribed loudspeaker layout. In some examples, the apparatus 100 may not include a loudspeaker system 125.

In some implementations, the apparatus 100 may include the optional sensor system 129 shown in FIG. 1. The optional sensor system 129 may include one or more cameras, touch sensors, gesture sensors, motion detectors, etc. According to some implementations, the optional sensor system 129 may include one or more cameras. In some implementations, the cameras may be free-standing cameras. In some examples, one or more cameras of the optional sensor system 129 may reside in a smart audio device, which may be a single purpose audio device or a virtual assistant. In some such examples, one or more cameras of the optional sensor system 129 may reside in a TV, a mobile phone or a smart speaker. In some examples, the apparatus 100 may not include a sensor system 129. However, in some such implementations the apparatus 100 may nonetheless be configured to receive sensor data for one or more sensors in an audio environment via the interface system 110.

In some implementations, the apparatus 100 may include the optional display system 135 shown in FIG. 1. The optional display system 135 may include one or more displays, such as one or more light-emitting diode (LED) displays. In some instances, the optional display system 135 may include one or more organic light-emitting diode (OLED) displays. In some examples wherein the apparatus 100 includes the display system 135, the sensor system 129 may include a touch sensor system and/or a gesture sensor system proximate one or more displays of the display system 135. According to some such implementations, the control system 110 may be configured for controlling the display system 135 to present one or more graphical user interfaces (GUIs).

According to some such examples the apparatus 100 may be, or may include, a smart audio device. In some such implementations the apparatus 100 may be, or may include, a wakeword detector. For example, the apparatus 100 may be, or may include, a virtual assistant.

Legacy systems employing canonical loudspeaker layouts, such as Dolby 5.1, assume that loudspeakers have been placed in predetermined positions and that a listener is sitting in the sweet spot facing the front sound stage, e.g., facing the center speaker. The advent of smart speakers, some of which may incorporate multiple drive units and microphone arrays, in addition to existing audio devices including televisions and sound bars, and new microphone and loudspeaker-enabled connected devices such as lightbulbs and microwaves, creates a problem in which dozens of microphones and loudspeakers need locating relative to one another in order to achieve orchestration. Audio devices can no longer be assumed to lie in canonical layouts. In some instances, the audio devices in an audio environment may be randomly located, or at least may be distributed within the environment in an irregular and/or asymmetric manner.

Flexible rendering is a technique for rendering spatial audio over an arbitrary number of arbitrarily-placed loudspeakers. With the widespread deployment of smart audio devices (e.g., smart speakers) in the home, as well as other audio devices that may not be located according to any standard canonical loudspeaker layout, it can be advantageous to implement flexible rendering of audio data and playback of the so-rendered audio data.

Several technologies have been developed to implement flexible rendering, including Center of Mass Amplitude Panning (CMAP) and Flexible Virtualization (FV). Both of these technologies cast the rendering problem as one of cost function minimization, where the cost function includes at least a first term that models the desired spatial impression that the renderer is trying to achieve and a second term that assigns a cost to activating speakers. Detailed examples of CMAP, FV and combinations thereof are described in International Publication No. WO 2021/021707 A1, published on 4 Feb. 2021 and entitled "MANAGING PLAYBACK OF MULTIPLE STREAMS OF AUDIO OVER MULTIPLE SPEAKERS," on page 25, line 8 through page 31, line 27, which are hereby incorporated by reference.

An orchestrated system of smart audio devices configured to operate according to a flexible rendering method gives the user the flexibility to place audio devices at arbitrary locations in an audio environment while nonetheless having audio data played back in a satisfactory manner. In some such examples, a system of such smart audio devices may be configured to self-organize (e.g., via an auto-location process) and calibrate automatically. In some examples, audio device calibration may be conceptualized as having several layers. One layer may be geometric mapping, which involves discovering the physical location and orientation of audio devices, the user, and possibly additional noise sources and legacy audio devices such as televisions and/or soundbars, for which various methods are disclosed herein. It is important that a flexible renderer be provided accurate geometric mapping information in order to render a sound scene correctly.

The present assignee has produced several loudspeaker localization techniques that are excellent solutions in the use cases for which they were designed. Some such methods are described in detail herein. Some of the embodiments disclosed in this application allow for the localization of a collection of audio devices based on 1) the DOA between each pair of audio devices in an audio environment, and 2) the minimization of a non-linear optimization problem designed for input of data type 1). Other embodiments disclosed in the application allow for the localization of a collection of smart audio devices based on 1) the DOA between each pair of audio devices in the system, 2) the TOA between each pair of devices, and 3) the minimization of a non-linear optimization problem designed for input of data types 1) and 2). Some examples of automatically determining the location and orientation of a person in an audio environment are also disclosed herein. Details of some such methods are described below.

A second layer of calibration may involve leveling and equalization of loudspeaker output in order to account for various factors, such as manufacturing variations in the loudspeakers, the effect of loudspeaker locations and orientations in the audio environment, and audio environment acoustics. In some legacy examples, in particular with soundbars and audio/video receivers (AVRs), the user may optionally apply manual gains and equalization (EQ) curves or plug in a dedicated reference microphone at the listening location for calibration. However, the proportion of the population willing to go to these lengths is known to be very small. Therefore, it would be desirable for an orchestrated system of smart devices to be configured for automatic playback level and EQ calibration without the use of reference microphones, a process that may be referred to herein as audibility mapping. In some examples, geometric mapping and audibility mapping may form the two main components of acoustic mapping.

Some disclosed implementations treat audibility mapping as a sparse interpolation problem using the mutual audibility measured between audio devices and the estimated physical locations (and in some instances orientations) of audio devices and one or more people in an audio environment. The context of such implementations may be better appreciated with reference to a specific example of an audio environment.

Figure 2:
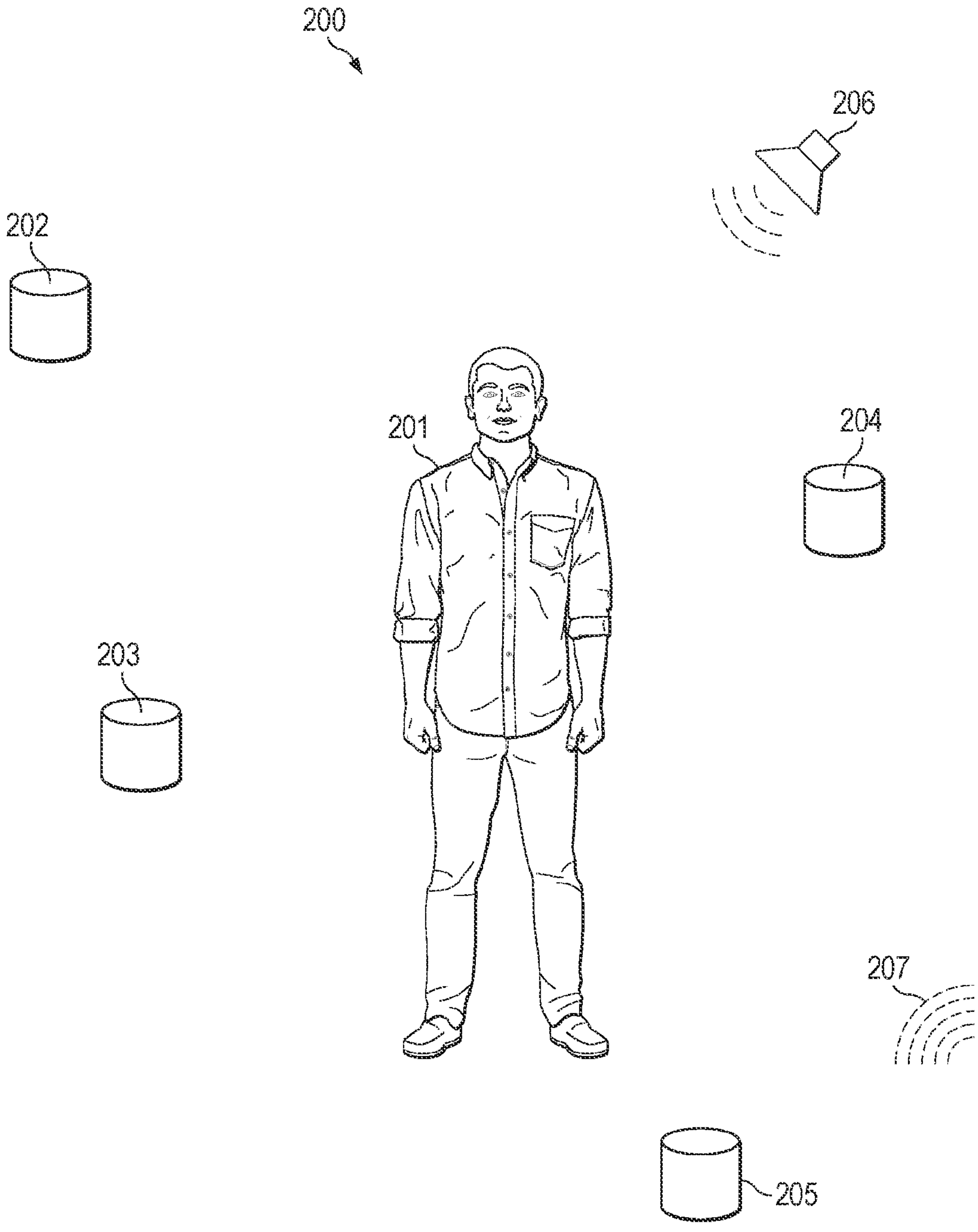
FIG. 2 depicts an audio environment, which is a living space in this example.

FIG. 2 depicts an audio environment, which is a living space in this example. As with other figures provided herein, the types, numbers and arrangements of elements shown in FIG. 2 are merely provided by way of example. Other implementations may include more, fewer and/or different types, numbers and/or arrangements of elements. In other examples, the audio environment may be another type of environment, such as an office environment, a vehicle environment, a park or other outdoor environment, etc. In this example, the elements of FIG. 2 include the following:

201: A person, who also may be referred to as a "user" or a "listener";

202: A smart speaker including one or more loudspeakers and one or more microphones;

203: A smart speaker including one or more loudspeakers and one or more microphones;

204: A smart speaker including one or more loudspeakers and one or more microphones;

205: A smart speaker including one or more loudspeakers and one or more microphones;

206: A sound source, which may be a noise source, which is located in the same room of the audio environment in which the person 201 and the smart speakers 202-206 are located and which has a known location. In some examples, the sound source 206 may be a legacy device, such as a radio, that is not part of an audio system that includes the smart speakers 202-206. In some instances, the volume of the sound source 206 may not be continuously adjustable by the person 201 and may not be adjustable by an orchestrating device. For example, the volume of the sound source 206 may be adjustable only by a manual process, e.g., via an on/off switch or by choosing a power or speed level (e.g., a power or speed level of a fan or an air conditioner); and

207: A sound source, which may be a noise source, which is not located in the same room of the audio environment in which the person 201 and the smart speakers 202-206 are located. In some examples, the sound source 207 may not have a known location. In some instances, the sound source 207 may be diffuse.

The following discussion involves a few underlying assumptions. For example, it is assumed that estimates of the locations of audio devices (such as the smart devices 102-105 of FIG. 2) and an estimate of a listener location (such as the location of the person 101) are available. Additionally, it is assumed that a measure of mutual audibility between audio devices is known. This measure of mutual audibility may, in some examples, be in the form of the received level in multiple frequency bands. Some examples are described below. In other examples, the measure of mutual audibility may be a broadband measure, such as a measure that includes only one frequency band.

The reader may question whether the microphones in consumer devices provide uniform responses, because unmatched microphone gains would add a layer of ambiguity. However, the majority of smart speakers include Micro-Electro-Mechanical Systems (MEMS) microphones, which are exceptionally well matched (at worst ±3 dB but typically within ±1 dB) and have a finite set of acoustic overload points, such that the absolute mapping from digital dBFS (decibels relative to full scale) to dBSPL (decibels of sound pressure level) can be determined by the model number and/or a device descriptor. As such, MEMS microphones can be assumed to provide a well-calibrated acoustic reference for mutual audibility measurements.

Figure 3A:
FIGS. 3A, 3B and 3C are block diagrams that represent three types of disclosed implementations.
Figure 3B:
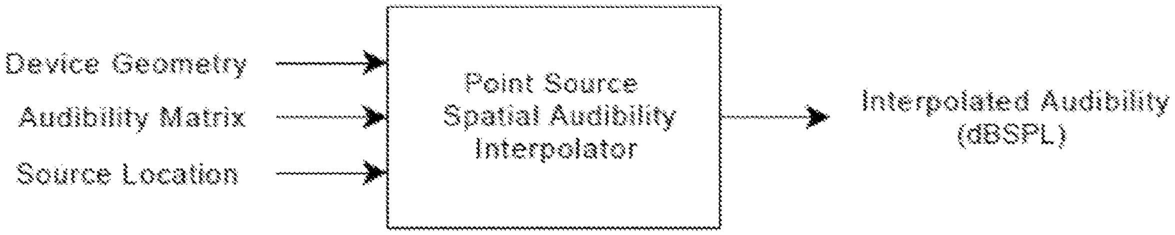
Figure 3C:
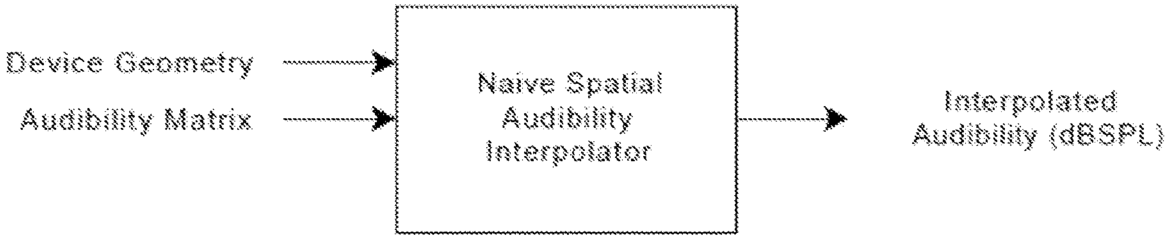

FIGS. 3A, 3B and 3C are block diagrams that represent three types of disclosed implementations. FIG. 3A represents an implementation that involves estimating the audibility (in this example, in dBSPL) at a user location (e.g., the location of the person 201 of FIG. 2) of all audio devices in an audio environment (e.g., the locations of the smart speakers 202-205), based upon mutual audibility between the audio devices, their physical locations, and the location of the user. Such implementations do not require the use of a reference microphone at the user location. In some such examples, audibility may be normalized by the digital level (in this example, in dBFS) of the loudspeaker driving signal to yield transfer functions between each audio device and the user. According to some examples, the implementation represented by FIG. 3A is essentially a sparse interpolation problem: given banded levels measured between a set of audio devices at known locations, apply a model to estimate the levels received at the listener location.

In the example shown in FIG. 3A, a full matrix spatial audibility interpolator is shown receiving device geometry information (audio device location information) a mutual audibility matrix (an example of which is described below) and user location information, and outputting interpolated transfer functions. In this example the interpolated transfer functions are from dBFS to dBSPL, which may be useful for leveling and equalizing audio devices, such as smart devices. In some examples, there may be some null rows or columns in the audibility matrix corresponding to input-only or output-only devices. Implementation details corresponding to the example of FIG. 3A are set forth below in the "Full Matrix Mutual Audibility Implementations" discussion below.

FIG. 3B represents an implementation that involves estimating the audibility (in this example, in dBSPL) at a user location of an uncontrolled point source (such as the sound source 206 of FIG. 2), based upon the audibility of the uncontrolled point source at the audio devices, the physical locations of the audio devices, the location of the uncontrolled point source and the location of the user. In some examples, the uncontrolled point source may be a noise source located in the same room as the audio devices and the person. In the example shown in FIG. 3B, a point source spatial audibility interpolator is shown receiving device geometry information (audio device location information) an audibility matrix (an example of which is described below) and sound source location information, and outputting interpolated audibility information.

FIG. 3C represents an implementation that involves estimating the audibility (in this example, in dBSPL) at a user location of a diffuse and/or unlocated and uncontrolled source (such as the sound source 207 of FIG. 2), based upon the audibility of the sound source at each of the audio devices, the physical locations of the audio devices and the location of the user. In this implementation, the location of the sound source is assumed to be unknown. In the example shown in FIG. 3C, a naïve spatial audibility interpolator is shown receiving device geometry information (audio device location information) and an audibility matrix (an example of which is described below), and outputting interpolated audibility information. In some examples, the interpolated audibility information referenced in FIGS. 3B and 3C may indicate interpolated audibility in dBSPL, which may be useful for estimating the received level from sound sources (e.g., from noise sources). By interpolating received levels of noise sources, noise compensation (e.g., a process of increasing the gain of content in the bands where noise is present) may be applied more accurately than can be achieved with reference to noise detected by a single microphone.

Full Matrix Mutual Audibility Implementations

Table 1 indicates what the terms of the equations in the following discussion represent.

TABLE 1

| | |
|---|---|
| Total devices | L |
| Total spectral bands | K |
| Band index | k |
| Total microphones in device i | $M_i$ |
| Rotation scalar | $\phi$ |
| Mutual audibility transfer function matrix | $H \in \mathbb{R}^{K \times L \times L}$ |
| Noise audibility level matrix | $A \in \mathbb{R}^{K \times L}$ |
| Elements of noise audibility level matrix | $A_i^{(k)}$ |
| $i^{th}$ device location vector | $x_i = [x_i\ y_i]^T$ |
| User location vector | $x_u = [x_u\ y_u]^T$ |
| Noise location vector | $x_n = [x_n\ y_n]^T$ |
| Geometry vector | $X \in \mathbb{R}^{L \times 2}$ |
| Output sensitivity | $g_i^{(k)}$ |
| Decay law | $\alpha_i^{(k)}$ |
| Critical distance | $d_c^{\ i}$ |

TABLE 1-continued

| | |
|---|---|
| Interpolated transfer function matrix | $B \in \mathbb{R}^{K\times L}$ |
| Interpolated noise level vector | $b \in \mathbb{R}^{K\times 1}$ |
| EQ and compensation gains matrix | $G \in \mathbb{R}^{K\times L}$ |
| Delay compensation vector | $\tau \in \mathbb{R}^{L\times 1}$ |
| Noise compensation gains | $q \in \mathbb{R}^{K\times 1}$ |

Let L be the total number of audio devices, each containing $M_i$ microphones, and let K be the total number of spectral bands reported by the audio devices. According to this example, a mutual audibility matrix $H\in \mathbb{R}^{K\times L\times L}$, containing measured transfer functions between all devices in all bands in linear units, is determined.

Several examples exist for determining H. However, the disclosed implementations are agnostic to the method used to determine H.

Some examples of determining H may involve multiple iterations of "one shot" calibration performed by each of the audio devices in turn, with controlled sources such as swept sines, noise sources, or curated program material. In some such examples, determining H may involve a sequential process of causing a single smart audio device to emit a sound while the other smart audio devices "listen" for the sound.

For example, referring to FIG. 2, one such process may involve: (a) causing the audio device 202 to emit a sound and receiving microphone data corresponding to the emitted sound from microphone arrays of the audio devices 203-205; then (b) causing the audio device 203 to emit a sound and receiving microphone data corresponding to the emitted sound from microphone arrays of the audio devices 202, 204 and 205; then (c) causing the audio device 204 to emit a sound and receiving microphone data corresponding to the emitted sound from microphone arrays of the audio devices 202, 203 and 205; then (d) causing the audio device 205 to emit a sound and receiving microphone data corresponding to the emitted sound from microphone arrays of the audio devices 202, 203 and 204. The emitted sounds may or may not be the same, depending on the particular implementation.

Some "continuous" calibration methods that are described in detail below involve measuring transfer functions beneath an audible threshold. These examples involve spectral hole punching (also referred to herein as forming "gaps").

According to some implementations, audio devices including multiple microphones may estimate multiple audibility matrices (e.g., one for each microphone) that are averaged to yield a single audibility matrix for each device. In some examples anomalous data, which may be due to malfunctioning microphones, may be detected and removed.

As noted above, the spatial locations $x_i$ of the audio devices in 2D or 3D coordinates are also assumed available. Some examples for determining device locations based upon time of arrival (TOA), direction of arrival (DOA) and combinations of DOA and TOA are described below. In other examples, the spatial locations $x_i$ of the audio devices may be determined by manual measurements, e.g., with a measuring tape.

Moreover, the location of the user $x_u$ is also assumed known, and in some cases both the location and the orientation of the user also may be known. Some methods for determining a listener location and a listener orientation are described in detail below. According to some examples, the device locations $X=[x_1\ x_2 \ldots x_L]^T$ may have been translated so that $x_u$ lies at the origin of a coordinate system.

According to some implementations, the aim is to estimate an interpolated mutual audibility matrix B by applying a suitable interpolant to the measured data. In one example, a decay law model of the following form may be chosen:

$$\frac{g_i^{(k)}}{\|x_i - x_j\|^{\alpha_i^{(k)}}}$$

In this example, $x_i$ represents the location of the transmitting device, $x_j$ represents the location of the receiving device, $g_i^{(k)}$ represents an unknown linear output gain in band k, and $\alpha_i^{(k)}$ represents a distance decay constant. The least squares solution $$\{\hat{g}_i^{(k)}, \hat{\alpha}_i^{(k)}\} = \arg\min \sum_{j=0, j\neq i}^{L} \left| H_{ij}^{(k)} - \frac{g_i^{(k)}}{\|x_i - x_j\|^{\alpha_i^{(k)}}} \right|_2^2$$

yields estimated parameters $\{\hat{g}_i^{(k)}, \hat{\alpha}_i^{(k)}\}$ for the ith transmitting device. The estimated audibility in linear units at the user location may therefore be represented as follows:

$$B_i^{(k)} = \frac{\hat{g}_i^{(k)}}{\|x_i - x_u\|^{\hat{\alpha}_i^{(k)}}}.$$

In some embodiments, $\hat{\alpha}_i^{(k)}$ may be constrained to a global room parameter $\hat{\alpha}^{(k)}$, and may, in some examples, be additionally constrained to lie within a specific range of values.

Figure 4:
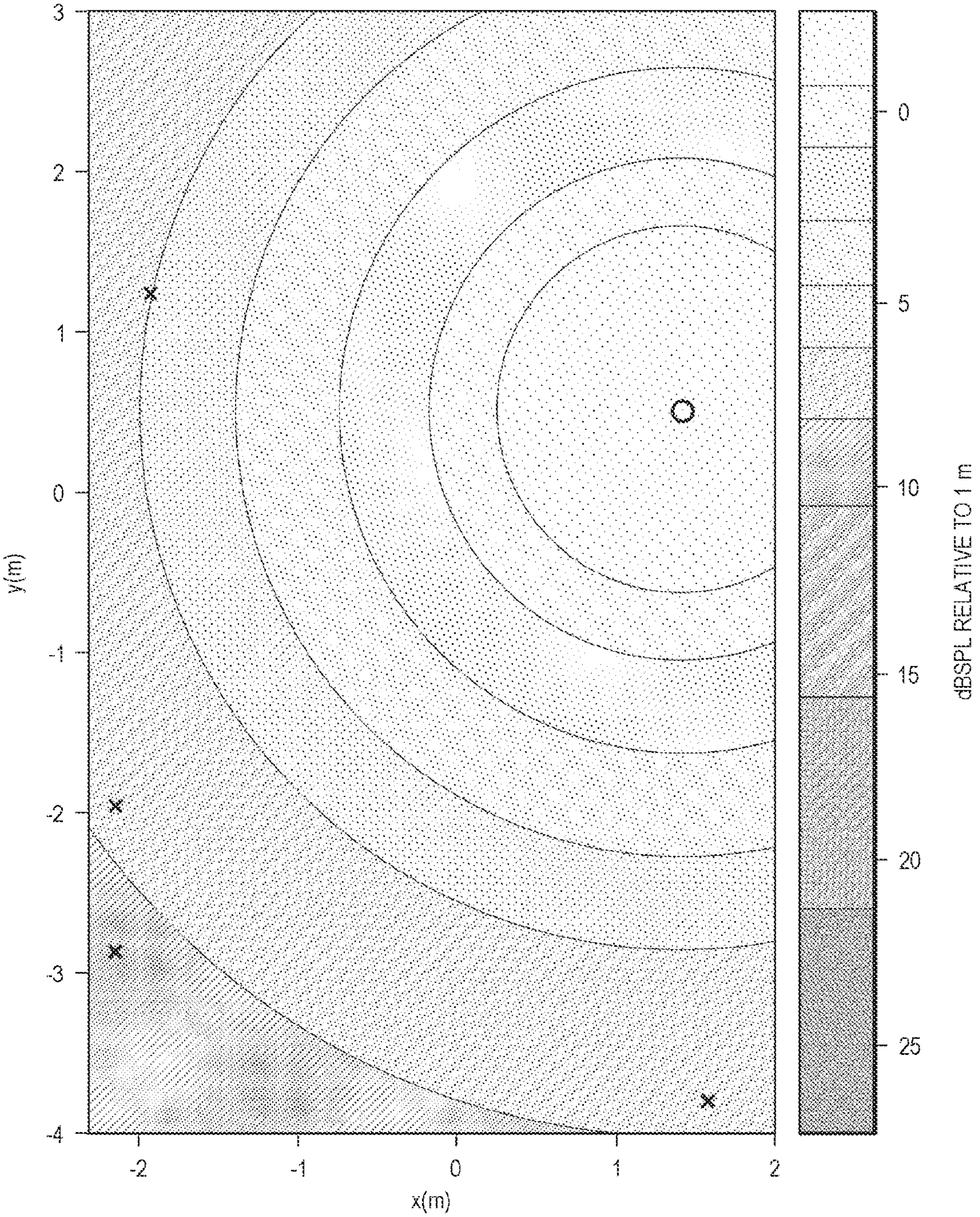
FIG. 4 shows an example of a heat map.

FIG. 4 shows an example of a heat map. In this example, the heat map 400 represents an estimated transfer function for one frequency band from a sound source (o) to any point in a room having the x and y dimensions indicated in FIG. 4. The estimated transfer function is based on the interpolation of measurements of the sound source by 4 receivers (x). The interpolated level is depicted by the heatmap 400 for any user location $x_u$ within the room.

In another example, the distance decay model may include a critical distance parameter such that the interpolant takes the following form:

$$g_i^{(k)} \sqrt{\frac{1}{\|x_i - x_j\|_2^2} + \frac{1}{(d_c^i)^2}}$$

In this example, $d_c^I$ represents a critical distance that may, in some examples, be solved as a global room parameter $d_c$ and/or may be constrained to lie within a fixed range of values.

Figure 5:
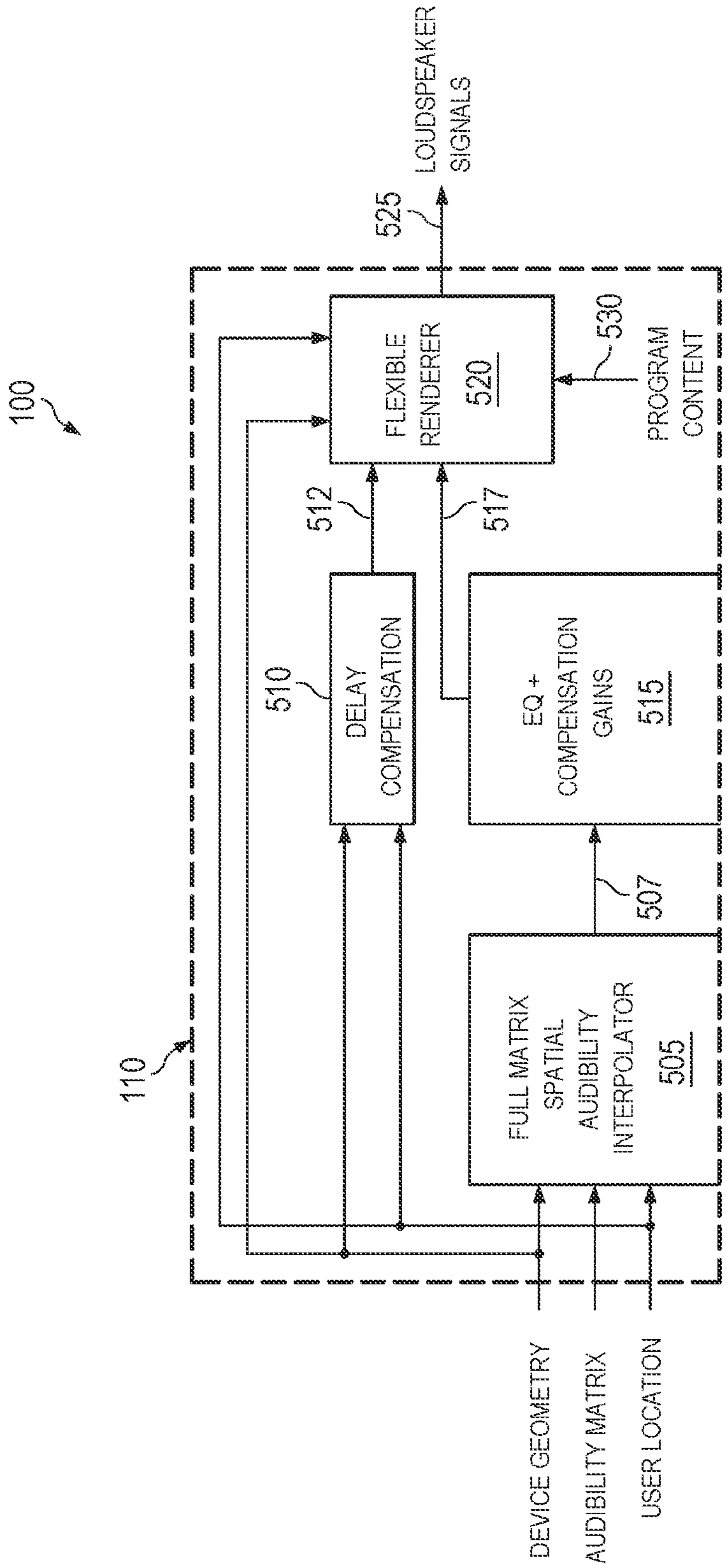
FIG. 5 is a block diagram that shows an example of one implementation.

FIG. 5 is a block diagram that shows an example of one implementation. As with other figures provided herein, the types, numbers and arrangements of elements shown in FIG. 5 are merely provided by way of example. Other implementations may include more, fewer and/or different types, numbers and/or arrangements of elements. In this example, a full matrix spatial audibility interpolator 505, a delay compensation block 510, an equalization and gain compensation block 515 and a flexible renderer block 520 are implemented by an instance of the control system 110 of the apparatus 100 that is described above with reference to FIG.

1. In some implementations, the apparatus 100 may be an orchestrating device for the audio environment. According to some examples, the apparatus 100 may be one of the audio devices of the audio environment. In some instances, the full matrix spatial audibility interpolator 505, the delay compensation block 510, the equalization and gain compensation block 515 and the flexible renderer block 520 may be implemented via instructions (e.g., software) stored on one or more non-transitory media.

In some examples, the full matrix spatial audibility interpolator 505 may be configured to calculate an estimated audibility at a lister's location as described above. According to this example, the equalization and gain compensation block 515 is configured to determine an equalization and compensation gain matrix 517 (shown as $G \in \mathbb{R}^{K \times L}$ in Table 1) based on the frequency bands of the interpolated audibility $B_i^{(k)}$ 507 received from the full matrix spatial audibility interpolator 505. The equalization and compensation gain matrix 517 may, in some instances, be determined using standardized techniques. For example, the estimated levels at the user location may be smoothed across frequency bands and equalization (EQ) gains may be calculated such that the result matches a target curve. In some implementations, a target curve may be spectrally flat. In other examples, a target curve may roll off gently towards high frequencies to avoid over-compensation. In some instances, the EQ frequency bands may then be mapped into a different set of frequency bands corresponding to the capabilities of a particular parametric equalizer. In some examples, the different set of frequency bands may be the 77 CQMF bands mentioned elsewhere herein. In other examples, the different set of frequency bands may include a different number of frequency bands, e.g., 20 critical bands or as few as two frequency bands (high and low). Some implementations of a flexible renderer may use 20 critical bands.

In this example, the processes of applying compensation gains and EQ are split out so that compensation gains provide rough overall level matching and EQ provides finer control in multiple bands. According to some alternative implementations, compensation gains and EQ may be implemented as a single process.

In this example, the flexible renderer block 520 is configured to render the audio data of the program content 530 according to corresponding spatial information (e.g., positional metadata) of the program content 530. The flexible renderer block 520 may be configured to implement CMAP, FV, a combination of CMAP and FV, or another type of flexible rendering, depending on the particular implementation. According to this example, the flexible renderer block 520 is configured to use the equalization and compensation gain matrix 517 in order to ensure that each loudspeaker is heard by the user at the same level with the same equalization. The loudspeaker signals 525 output by the flexible renderer block 520 may be provided to audio devices of an audio system.

According to this implementation, the delay compensation block 510 is configured to determine a delay compensation information 512 (which may in some examples be, or include, the delay compensation vector shown as $\tau \in \mathbb{R}^{L \times 1}$ in Table 1) according to audio device geometry information and user location information. The delay compensation information 512 is based on the time required for sound to travel the distances between the user location and the locations of each of the loudspeakers. According to this example, the flexible renderer block 520 is configured to apply the delay compensation information 512 to ensure that the time of arrival to the user of corresponding sounds played back from all loudspeakers is constant.

Figure 6:
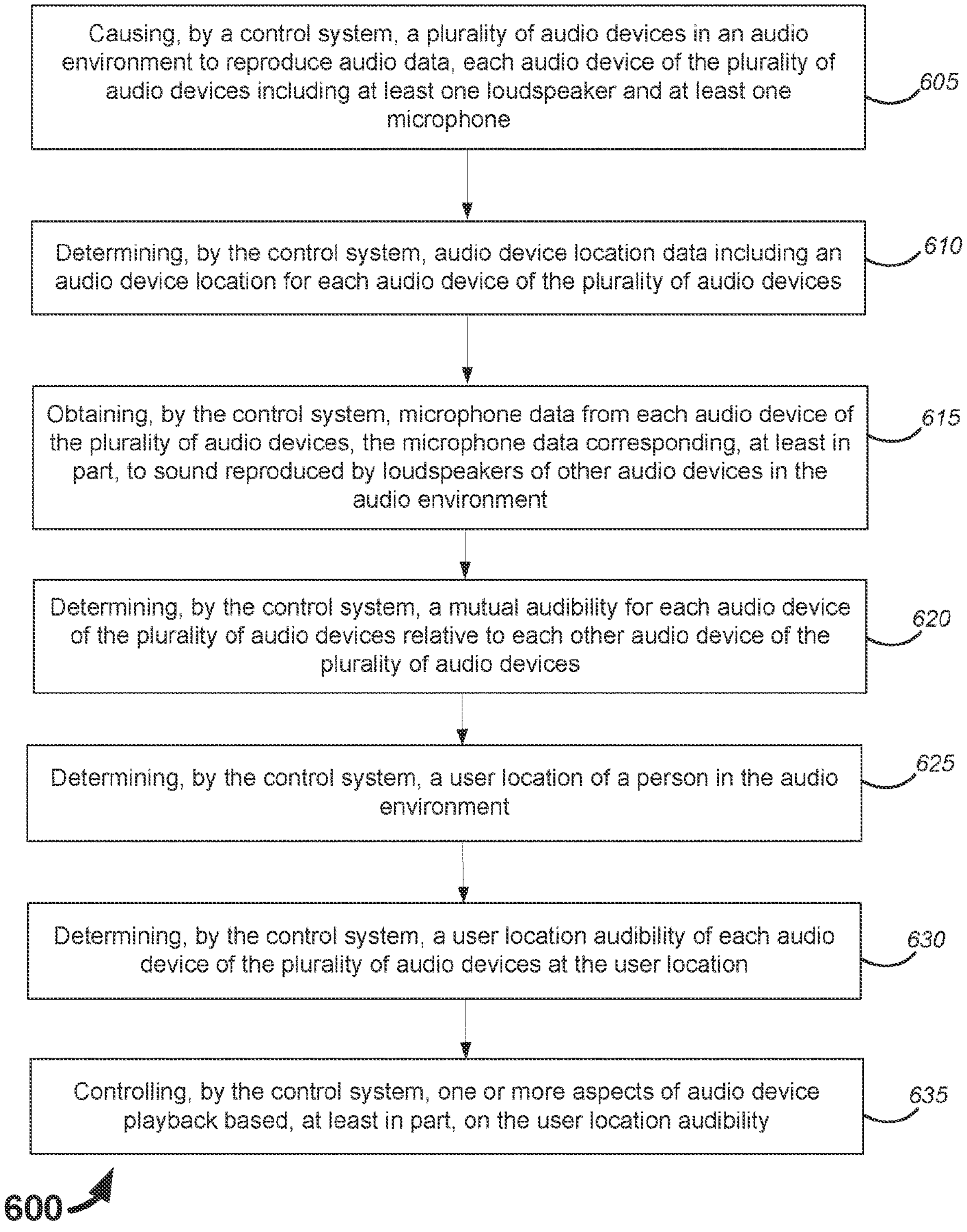
FIG. 6 is a flow diagram that outlines one example of a method that may be performed by an apparatus or system such as those shown in FIGS. 1, 2 and 5.

FIG. 6 is a flow diagram that outlines one example of a method that may be performed by an apparatus or system such as those shown in FIGS. 1, 2 and 5. The blocks of method 600, like other methods described herein, are not necessarily performed in the order indicated. Moreover, such methods may include more or fewer blocks than shown and/or described. The blocks of method 600 may be performed by one or more devices, which may be (or may include) a control system such as the control system 110 shown in FIGS. 1, 3 and 4, and described above, or one of the other disclosed control system examples. According to some examples, the blocks of method 600 may be implemented by one or more devices according to instructions (e.g., software) stored on one or more non-transitory media.

In this implementation, block 605 involves causing, by a control system, a plurality of audio devices in an audio environment to reproduce audio data. In this example, each audio device of the plurality of audio devices includes at least one loudspeaker and at least one microphone. However, in some such examples the audio environment may include at least one output-only audio device having at least one loudspeaker but no microphone. Alternatively, or additionally, in some such examples the audio environment may include one or more input-only audio devices having at least one microphone but no loudspeaker. Some examples of method 600 in such contexts are described below.

According to this example, block 610 involves determining, by the control system, audio device location data including an audio device location for each audio device of the plurality of audio devices. In some examples, block 610 may involve determining the audio device location data by reference to previously-obtained audio device location data that is stored in a memory (e.g., in the memory system 115 of FIG. 1). In some instances, block 610 may involve determining the audio device location data via an audio device auto-location process. The audio device auto-location process may involve performing one or more audio device auto-location methods, such as the DOA-based and/or TOA-based audio device auto-location methods referenced elsewhere herein.

According to this implementation, block 615 involves obtaining, by the control system, microphone data from each audio device of the plurality of audio devices. In this example, the microphone data corresponds, at least in part, to sound reproduced by loudspeakers of other audio devices in the audio environment.

In some examples, causing the plurality of audio devices to reproduce audio data may involve causing each audio device of the plurality of audio devices to play back audio when all other audio devices in the audio environment are not playing back audio. For example, referring to FIG. 2, one such process may involve: (a) causing the audio device 202 to emit a sound and receiving microphone data corresponding to the emitted sound from microphone arrays of the audio devices 203-205; then (b) causing the audio device 203 to emit a sound and receiving microphone data corresponding to the emitted sound from microphone arrays of the audio devices 202, 204 and 205; then (c) causing the audio device 204 to emit a sound and receiving microphone data corresponding to the emitted sound from microphone arrays of the audio devices 202, 203 and 205; then (d) causing the audio device 205 to emit a sound and receiving microphone data corresponding to the emitted sound from microphone arrays of the audio devices 202, 203 and 204.

The emitted sounds may or may not be the same, depending on the particular implementation.

Other examples of block 615 may involve obtaining the microphone data while content is being played back by each of the audio devices. Some such examples may involve spectral hole punching (also referred to herein as forming "gaps"). Accordingly, some such examples may involve causing, by the control system, each audio device of the plurality of audio devices to insert one or more frequency range gaps into audio data being reproduced by one or more loudspeakers of each audio device.

In this example, block 620 involves determining, by the control system, a mutual audibility for each audio device of the plurality of audio devices relative to each other audio device of the plurality of audio devices. In some implementations, block 620 may involve determining a mutual audibility matrix, e.g., as described above. In some examples, determining the mutual audibility matrix may involve a process of mapping decibels relative to full scale to decibels of sound pressure level. In some implementations, the mutual audibility matrix may include measured transfer functions between each audio device of the plurality of audio devices. In some examples, the mutual audibility matrix may include values for each frequency band of a plurality of frequency bands.

According to this implementation, block 625 involves determining, by the control system, a user location of a person in the audio environment. In some examples, determining the user location may be based, at least in part, on at least one of direction of arrival data or time of arrival data corresponding to one or more utterances of the person. Some detailed examples of determining a user location of a person in an audio environment are described below.

In this example, block 630 involves determining, by the control system, a user location audibility of each audio device of the plurality of audio devices at the user location. According to this implementation, block 635 involves controlling one or more aspects of audio device playback based, at least in part, on the user location audibility. In some examples, the one or more aspects of audio device playback may include leveling and/or equalization, e.g., as described above with reference to FIG. 5.

According to some examples, block 620 (or another block of method 600) may involve determining an interpolated mutual audibility matrix by applying an interpolant to measured audibility data. In some examples, determining the interpolated mutual audibility matrix may involve applying a decay law model that is based in part on a distance decay constant. In some examples, the distance decay constant may include a per-device parameter and/or an audio environment parameter. In some instances, the decay law model may be frequency band based. According to some examples, the decay law model may include a critical distance parameter.

In some examples, method 600 may involve estimating an output gain for each audio device of the plurality of audio devices according to values of the mutual audibility matrix and the decay law model. In some instances, estimating the output gain for each audio device may involve determining a least squares solution to a function of values of the mutual audibility matrix and the decay law model. In some examples, method 600 may involve determining values for the interpolated mutual audibility matrix according to a function of the output gain for each audio device, the user location and each audio device location. In some examples, the values for the interpolated mutual audibility matrix may correspond to the user location audibility of each audio device.

According to some examples, method 600 may involve equalizing frequency band values of the interpolated mutual audibility matrix. In some examples, method 600 may involve applying a delay compensation vector to the interpolated mutual audibility matrix.

As noted above, in some implementations the audio environment may include at least one output-only audio device having at least one loudspeaker but no microphone. In some such examples, method 600 may involve determining the audibility of the at least one output-only audio device at the audio device location of each audio device of the plurality of audio devices.

As noted above, in some implementations the audio environment may include one or more input-only audio devices having at least one microphone but no loudspeaker. In some such examples, method 600 may involve determining an audibility of each loudspeaker-equipped audio device in the audio environment at a location of each of the one or more input-only audio devices.

Point Noise Source Case Implementations

This section discloses implementations that correspond with FIG. 3B. As used in this section, a "point noise source" refers to a noise source for which the location $x_n$ is available but the source signal is not, one example of which is when the sound source 206 of FIG. 2 is a noise source. Instead of (or in addition to) determining a mutual audibility matrix that corresponds to the mutual audibility of each of a plurality of audio devices in the audio environment, implementations of the "point noise source case" involve determining the audibility of such a point source at each of a plurality of audio device locations. Some such examples involve determining a noise audibility matrix $A \in \mathbb{R}^{K=L}$ that measures the received level of such a point source at each of a plurality of audio device locations, not a transfer function as in the full matrix spatial audibility examples described above.

In some embodiments, the estimation of A may be made in real time, e.g., during a time at which audio is being played back in an audio environment. According to some implementations, the estimation of A may be part of a process of compensation for the noise of the point source (or other sound source of known location).

Figure 7:
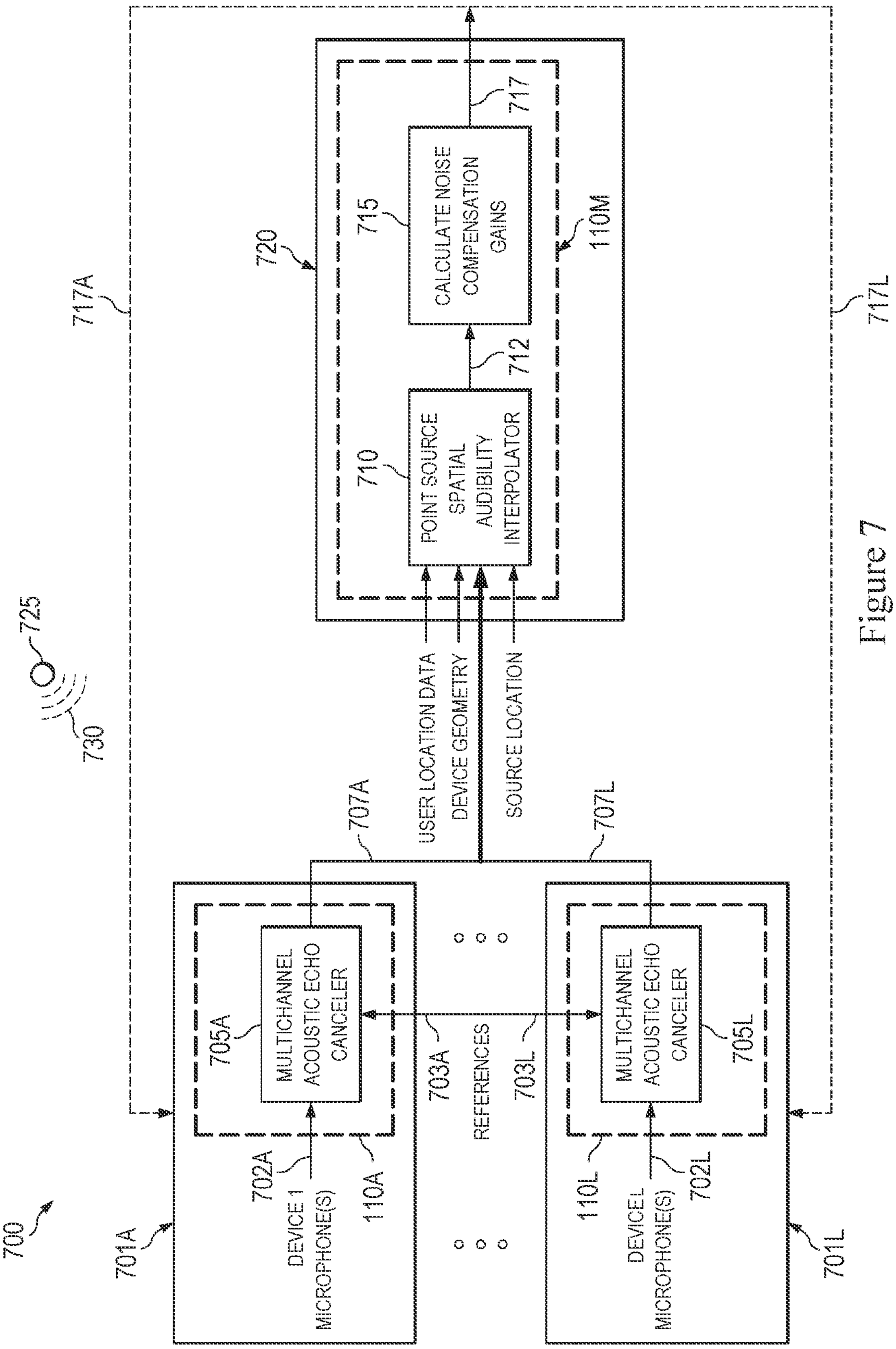
FIG. 7 is a block diagram that shows an example of a system according to another implementation.

FIG. 7 is a block diagram that shows an example of a system according to another implementation. As with other figures provided herein, the types, numbers and arrangements of elements shown in FIG. 7 are merely provided by way of example. Other implementations may include more, fewer and/or different types, numbers and/or arrangements of elements. According to this example, control systems 100A-110L correspond to audio devices 701A-701L (where L is two or more) and are instances of the control system 110 of the apparatus 100 that is described above with reference to FIG. 1. Here, the control systems 100A-110L are implementing multichannel acoustic echo cancellers 705A-705L.

In this example, a point source spatial audibility interpolator 710 and a noise compensation block 715 are implemented by the control system 110M of the apparatus 720, which is another instance of the apparatus 100 that is described above with reference to FIG. 1. In some examples, the apparatus 720 may be what is referred to herein as an orchestrating device or a smart home hub. However, in alternative examples the apparatus 720 may be an audio device. In some instances, the functionality of the apparatus 720 may be implemented by one of the audio devices 701A-701L. In some instances, the multichannel acoustic echo cancellers 705A-705L, the point source spatial audibility interpolator 710 and/or the noise compensation block 715 may be implemented via instructions (e.g., software) stored on one or more non-transitory media.

In this example, a sound source 725 is producing sound 730 in the audio environment. According to this example, the sound 730 will be regarded as noise. In this instance, the sound source 725 is not operating under the control of any of the control systems 110A-110M. In this example, the location of the sound source 725 is known by (in other words, provided to and/or stored in a memory accessible by) the control system 110M.

According to this example, the multichannel acoustic echo canceller 705A receives microphone signals 702A from one or more microphones of the audio device 701A and a local echo reference 703A that corresponds with audio being played back by the audio device 701A. Here, the multichannel acoustic echo canceller 705A is configured to produce the residual microphone signal 707A (which also may be referred to as an echo-canceled microphone signal) and to provide the residual microphone signal 707A to the apparatus 720. In this example, it is assumed that the residual microphone signal 707A corresponds mainly to the sound 730 received at the location of the audio device 701A.

Similarly, the multichannel acoustic echo canceller 705L receives microphone signals 702L from one or more microphones of the audio device 701L and a local echo reference 703L that corresponds with audio being played back by the audio device 701L. The multichannel acoustic echo canceller 705L is configured to output the residual microphone signal 707L to the apparatus 720. In this example, it is assumed that the residual microphone signal 707L corresponds mainly to the sound 730 received at the location of the audio device 701L. In some examples, the multichannel acoustic echo cancellers 705A-705L may be configured for echo cancellation in each of K frequency bands.

In this example, the point source spatial audibility interpolator 710 receives the residual microphone signals 707A-707L, as well as audio device geometry (location data for each of the audio devices 701A-701L) and source location data. According to this example, the point source spatial audibility interpolator 710 is configured for determining noise audibility information that indicates the received level of the sound 730 at each of the locations of the audio devices 701A-701L. In some examples, the noise audibility information may include noise audibility data for each of K frequency bands and may, in some instances, be the noise audibility matrix $A \in \mathbb{R}^{K \times L}$ referenced above.

In some implementations, the point source spatial audibility interpolator 710 (or another block of the control system 110M) may be configured to estimate, based on user location data and the received level of the sound 730 at each of the locations of the audio devices 701A-701L, a noise audibility information 712 that indicates the level of the sound 730 at a user location in the audio environment. In some instances, estimating the noise audibility information 712 may involve an interpolation process such as those described above, e.g., by applying a distance attenuation model to estimate the noise level vector $b \in \mathbb{R}^{K \times 1}$ at the user location.

According to this example, the noise compensation block 715 is configured to determine noise compensation gains 717 based on the estimated noise level 712 at the user location. In this example, the noise compensation gains 717 are multi-band noise compensation gains (e.g., the noise compensation gains $q \in \mathbb{R}^{K \times 1}$ that are referenced above), which may differ according to frequency band. For example, the noise compensation gains may be higher in frequency bands corresponding to higher estimated levels of the sound 730 at the user position. In some examples, the noise compensation gains 717 are provided to the audio devices 701A-701L, so that the audio devices 701A-701L may control playback of audio data in accordance with the noise compensation gains 717. As suggested by the dashed lines 717A and 717L, in some instances the noise compensation block 715 may configured to determine noise compensation gains that are specific to each of the audio devices 701A-701L.

Figure 8:
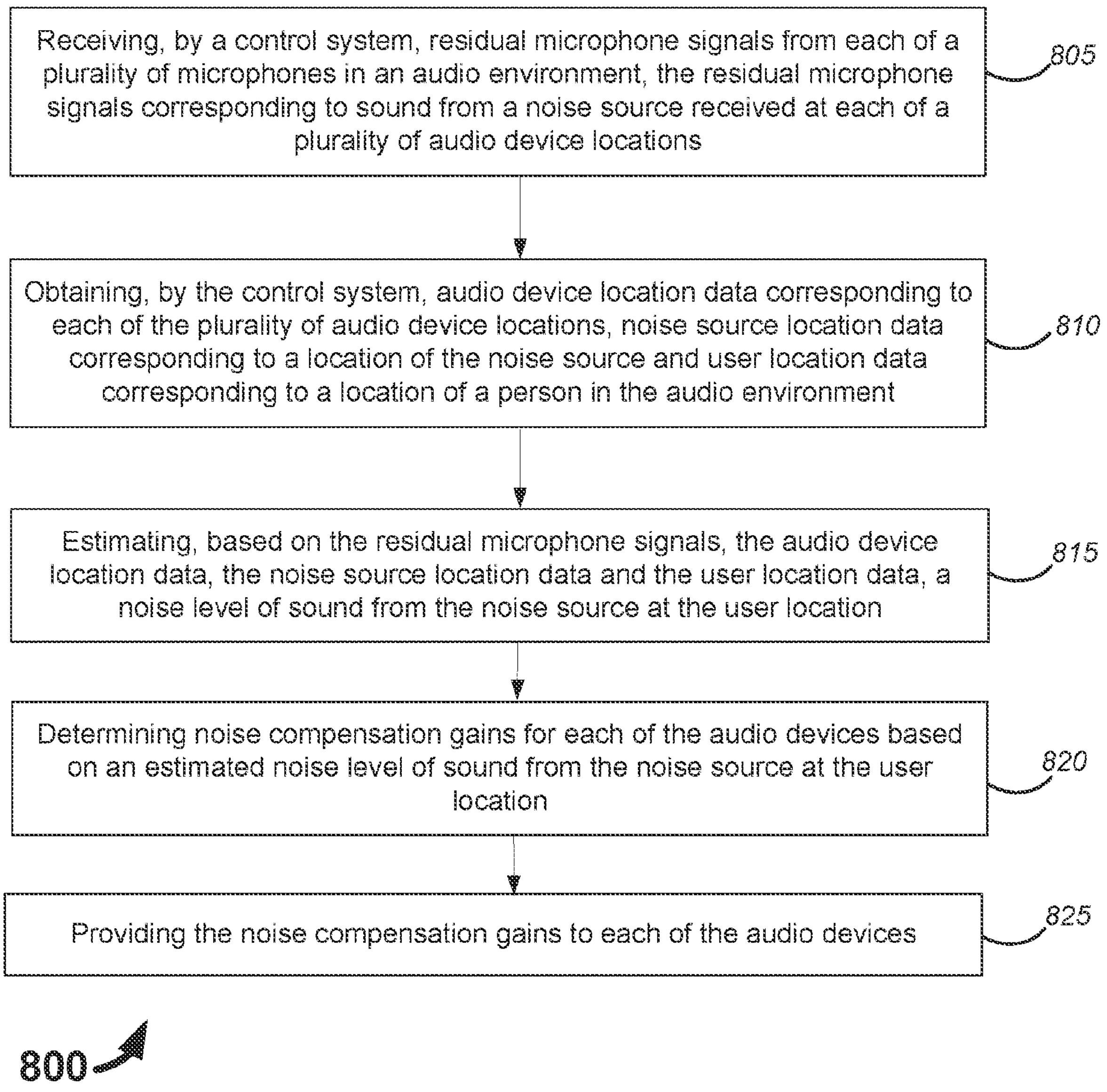
FIG. 8 is a flow diagram that outlines one example of a method that may be performed by an apparatus or system such as those shown in FIGS. 1, 2 and 7.

FIG. 8 is a flow diagram that outlines one example of a method that may be performed by an apparatus or system such as those shown in FIGS. 1, 2 and 7. The blocks of method 800, like other methods described herein, are not necessarily performed in the order indicated. Moreover, such methods may include more or fewer blocks than shown and/or described. The blocks of method 800 may be performed by one or more devices, which may be (or may include) a control system such as those shown in FIGS. 1, 3 and 7, and described above, or one of the other disclosed control system examples. According to some examples, the blocks of method 800 may be implemented by one or more devices according to instructions (e.g., software) stored on one or more non-transitory media.

In this implementation, block 805 involves receiving, by a control system, residual microphone signals from each of a plurality of microphones in an audio environment. In this example, the residual microphone signals correspond to sound from a noise source received at each of a plurality of audio device locations. In the example described above with reference to FIG. 7, block 805 involves the control system 110M receiving the residual microphone signals 707A-707L from the multichannel acoustic echo cancelers 705A-705L. However, in some alternative implementations, one or more of blocks 805-825 (and in some instances, all of blocks 805-825) may be performed by another control system, such as one of the audio device control systems 110A-110L.

According to this example, block 810 involves obtaining, by the control system, audio device location data corresponding to each of the plurality of audio device locations, noise source location data corresponding to a location of the noise source and user location data corresponding to a location of a person in the audio environment. In some examples, block 810 may involve determining the audio device location data, the noise source location data and/or the user location data by reference to previously-obtained audio device location data that is stored in a memory (e.g., in the memory system 115 of FIG. 1). In some instances, block 810 may involve determining the audio device location data, the noise source location data and/or the user location data via an auto-location process. The auto-location process may involve performing one or more auto-location methods, such as the auto-location methods referenced elsewhere herein.

According to this implementation, block 815 involves estimating, based on the residual microphone signals, the audio device location data, the noise source location data and the user location data, a noise level of sound from the noise source at the user location. In the example described above with reference to FIG. 7, block 815 may involve the point source spatial audibility interpolator 710 (or another block of the control system 110M) estimating, based on user location data and the received level of the sound 730 at each of the locations of the audio devices 701A-701L, a noise level 712 of the sound 730 at a user location in the audio environment. In some instances, block 815 may involve an interpolation process such as those described above, e.g., by applying a distance attenuation model to estimate the noise level vector $b\in\mathbb{R}^{K\times 1}$ at the user location.

In this example, block 820 involves determining noise compensation gains for each of the audio devices based on the estimated noise level of sound from the noise source at the user location. In the example described above with reference to FIG. 7, block 820 may involve the noise compensation block 715 determining the noise compensation gains 717 based on the estimated noise level 712 at the user location. In some examples, the noise compensation gains may be multi-band noise compensation gains (e.g., the noise compensation gains $q\in\mathbb{R}^{K\times 1}$ that are referenced above), which may differ according to the frequency band.

According to this implementation, block 825 involves providing the noise compensation gains to each of the audio devices. In the example described above with reference to FIG. 7, block 825 may involve the apparatus 720 providing the noise compensation gains 717A-717L to each of the audio devices 701A-701L.

Diffuse or Unlocated Noise Source Implementations

Locating a sound source, such as a noise source, may not always be possible, in particular when the sound source is not located in the same room or the sound source is highly occluded to the microphone array(s) detecting the sound. In such instances, estimating the noise level at a user location may be regarded as a sparse interpolation problem with a few known noise level values (e.g., one at each microphone or microphone array of each of a plurality of audio devices in the audio environment).

Such an interpolation may be expressed as a general function $f:\mathbb{R}^2\rightarrow\mathbb{R}$, which represents interpolating known points in 2D space (represented by the $\mathbb{R}^2$ term) to an interpolated scalar value (represented by $\mathbb{R}$). One example involves selection of subsets of three nodes (corresponding to microphones or microphone arrays of three audio devices in the audio environment) to form a triangle of nodes and solving for audibility within the triangle by bivariate linear interpolation. For any given node i, one can represent the received level in the kth band as $A_i^{(k)}=ax_i+by_i+c$. Solving for the unknowns, $$\begin{bmatrix} a \\ b \\ c \end{bmatrix} = \begin{bmatrix} x_1 & y_1 & 1 \\ x_2 & y_2 & 1 \\ x_3 & y_3 & 1 \end{bmatrix}^{-1} \begin{bmatrix} A_1^{(k)} \\ A_2^{(k)} \\ A_3^{(k)} \end{bmatrix}.$$

The interpolated audibility at any arbitrary point within the triangle becomes $$\hat{A}_i^{(k)}=ax+by+c.$$

Other examples may involve barycentric interpolation or cubic triangular interpolation, e.g., as described in Amidror, Isaac, "Scattered data interpolation methods for electronic imaging systems: a survey," in *Journal of Electronic Imaging* Vol. 11, No. 2, April 2002, pp. 157-176, which is hereby incorporated by reference. Such interpolation methods are applicable to the noise compensation methods described above with reference to FIGS. 7 and 8, e.g., by replacing the point source spatial audibility interpolator 710 of FIG. 7 with a naïve spatial interpolator implemented according to any of the interpolation methods described in this section and by omitting the process of obtaining noise source location data in block 810 of FIG. 8. The interpolation methods described in this section do not yield a spherical distance decay, but do provide plausible level interpolation within a listening area.

Figure 9:
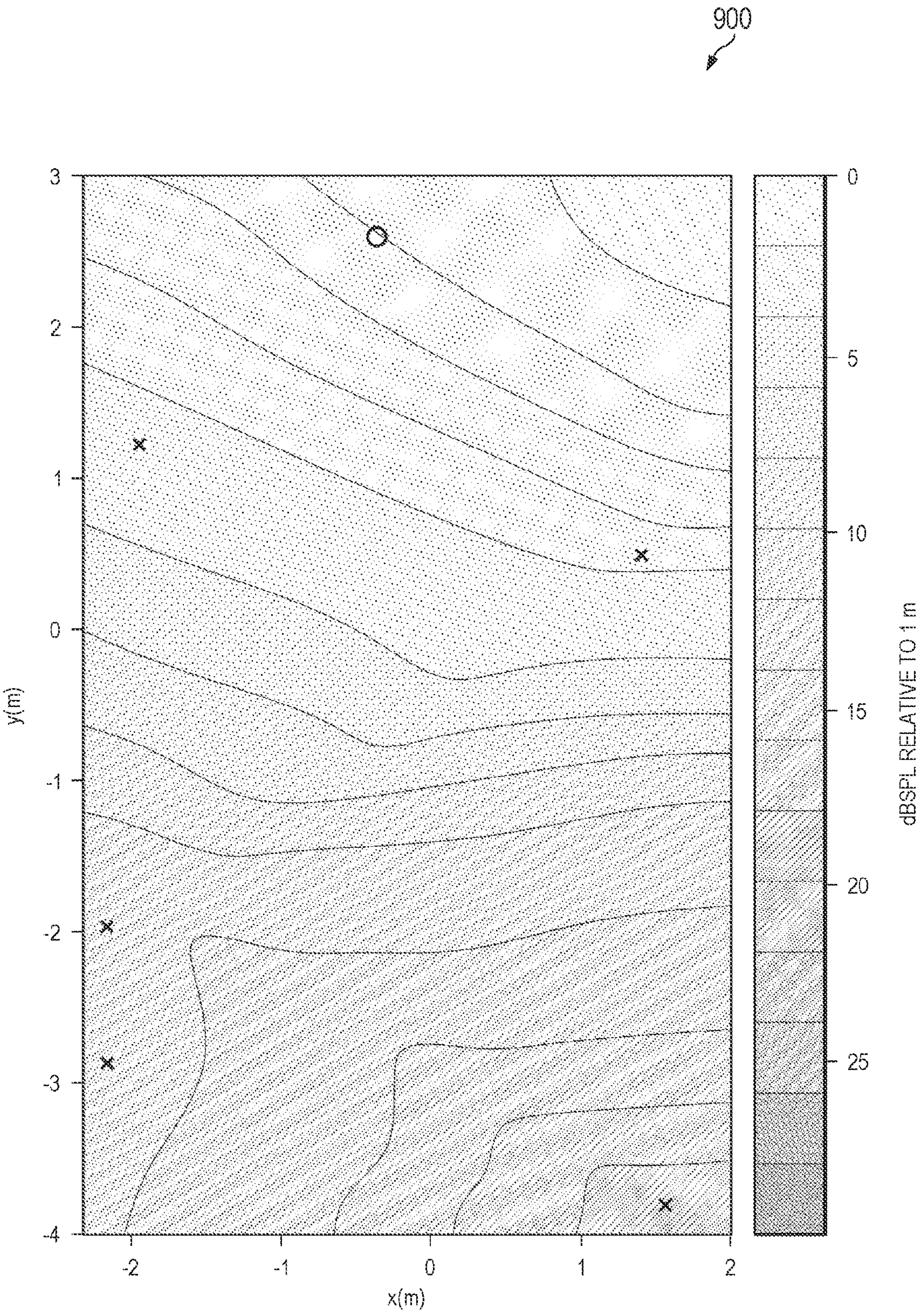
FIG. 9 shows another example of a heat map.

FIG. 9 shows another example of a heat map. In this example, the heat map 900 represents an estimated transfer function for one frequency band from a sound source (o) having an unknown location to any point in a room having the x and y dimensions indicated in FIG. 9. The estimated transfer function is based on the interpolation of measurements of the sound source by 5 receivers (x). The interpolated level is depicted by the heatmap 900 for any user location $x_u$ within the room.

Figure 10:
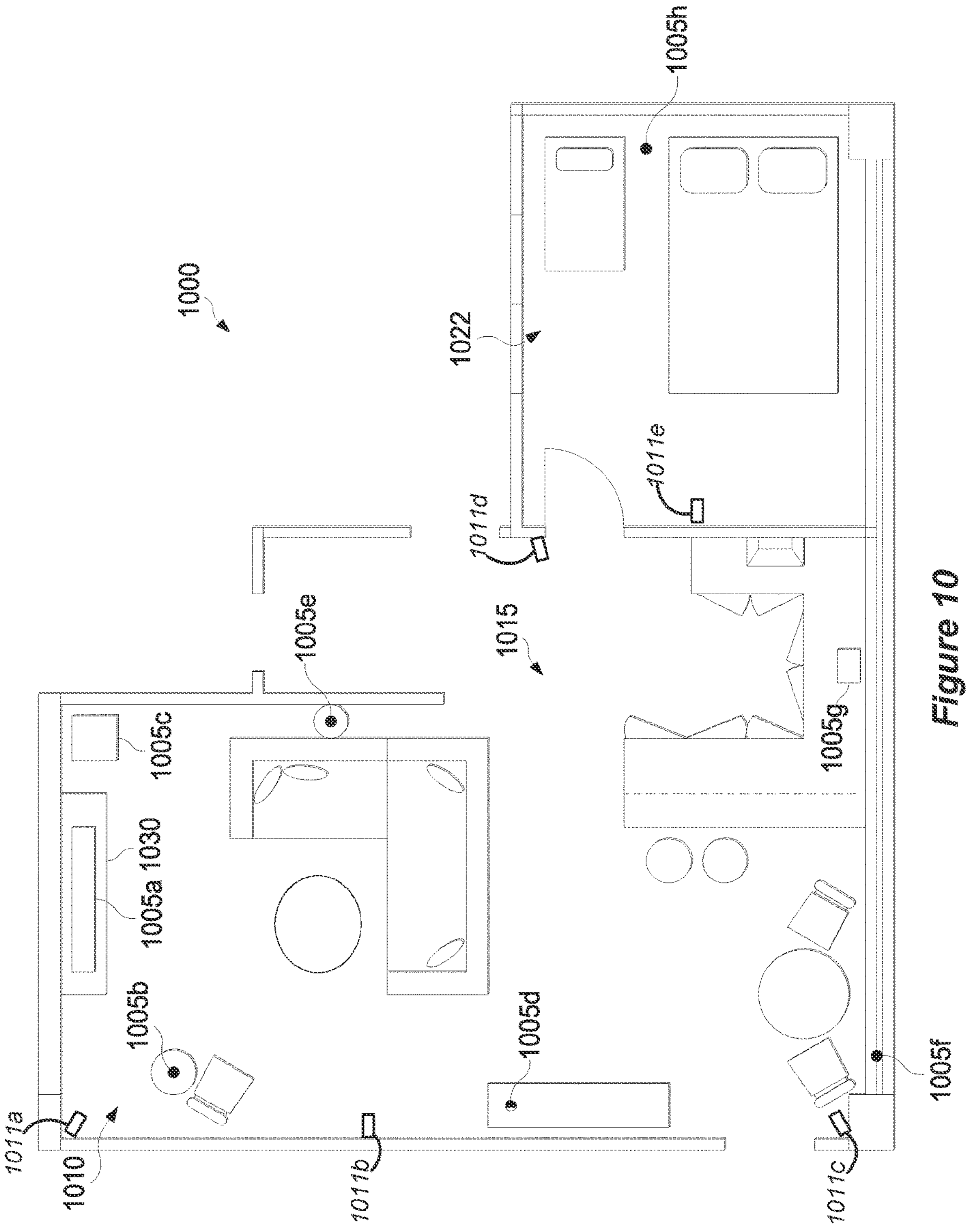
FIG. 10 shows an example of a floor plan of another audio environment, which is a living space in this instance.

FIG. 10 shows an example of a floor plan of another audio environment, which is a living space in this instance. As with other figures provided herein, the types and numbers of elements shown in FIG. 10 are merely provided by way of example. Other implementations may include more, fewer and/or different types and numbers of elements.

According to this example, the environment 1000 includes a living room 1010 at the upper left, a kitchen 1015 at the lower center, and a bedroom 1022 at the lower right. Boxes and circles distributed across the living space represent a set of loudspeakers 1005*a*-1005*h*, at least some of which may be smart speakers in some implementations, placed in locations convenient to the space, but not adhering to any standard prescribed layout (arbitrarily placed). In some examples, the television 1030 may be configured to implement one or more disclosed embodiments, at least in part. In this example, the environment 1000 includes cameras 1011*a*-1011*e*, which are distributed throughout the environment. In some implementations, one or more smart audio devices in the environment 1000 also may include one or more cameras. The one or more smart audio devices may be single purpose audio devices or virtual assistants. In some such examples, one or more cameras of the optional sensor system 130 may reside in or on the television 1030, in a mobile phone or in a smart speaker, such as one or more of the loudspeakers 1005*b*, 1005*d*, 1005*e* or 1005*h*. Although cameras 1011*a*-1011*e* are not shown in every depiction of the environment 1000 presented in this disclosure, each of the environments 1000 may nonetheless include one or more cameras in some implementations.

Automatic Localization of Audio Devices

The present assignee has produced several speaker localization techniques for cinema and home that are excellent solutions in the use cases for which they were designed. Some such methods are based on time-of-flight derived from impulse responses between a sound source and microphone(s) that are approximately co-located with each loudspeaker. While system latencies in the record and playback chains may also be estimated, sample synchrony between clocks is required along with the need for a known test stimulus from which to estimate impulse responses.

Recent examples of source localization in this context have relaxed constraints by requiring intra-device microphone synchrony but not requiring inter-device synchrony. Additionally, some such methods relinquish the need for passing audio between sensors by low-bandwidth message passing such as via detection of the time of arrival (TOA, also referred to as "time of flight") of a direct (non-reflected) sound or via detection of the dominant direction of arrival (DOA) of a direct sound. Each approach has some potential advantages and potential drawbacks. For example, some previously-deployed TOA methods can determine device geometry up to an unknown translation, rotation, and reflection about one of three axes. Rotations of individual devices are also unknown if there is just one microphone per device.

Some previously-deployed DOA methods can determine device geometry up to an unknown translation, rotation, and scale. While some such methods may produce satisfactory results under ideal conditions, the robustness of such methods to measurement error has not been demonstrated.

Some of the embodiments disclosed in this application allow for the localization of a collection of smart audio devices based on 1) the DOA between each pair of audio devices in an audio environment, and 2) the minimization of a non-linear optimization problem designed for input of data type 1). Other embodiments disclosed in the application allow for the localization of a collection of smart audio devices based on 1) the DOA between each pair of audio devices in the system, 2) the TOA between each pair of devices, and 3) the minimization of a non-linear optimization problem designed for input of data types 1) and 2).

Figure 11:
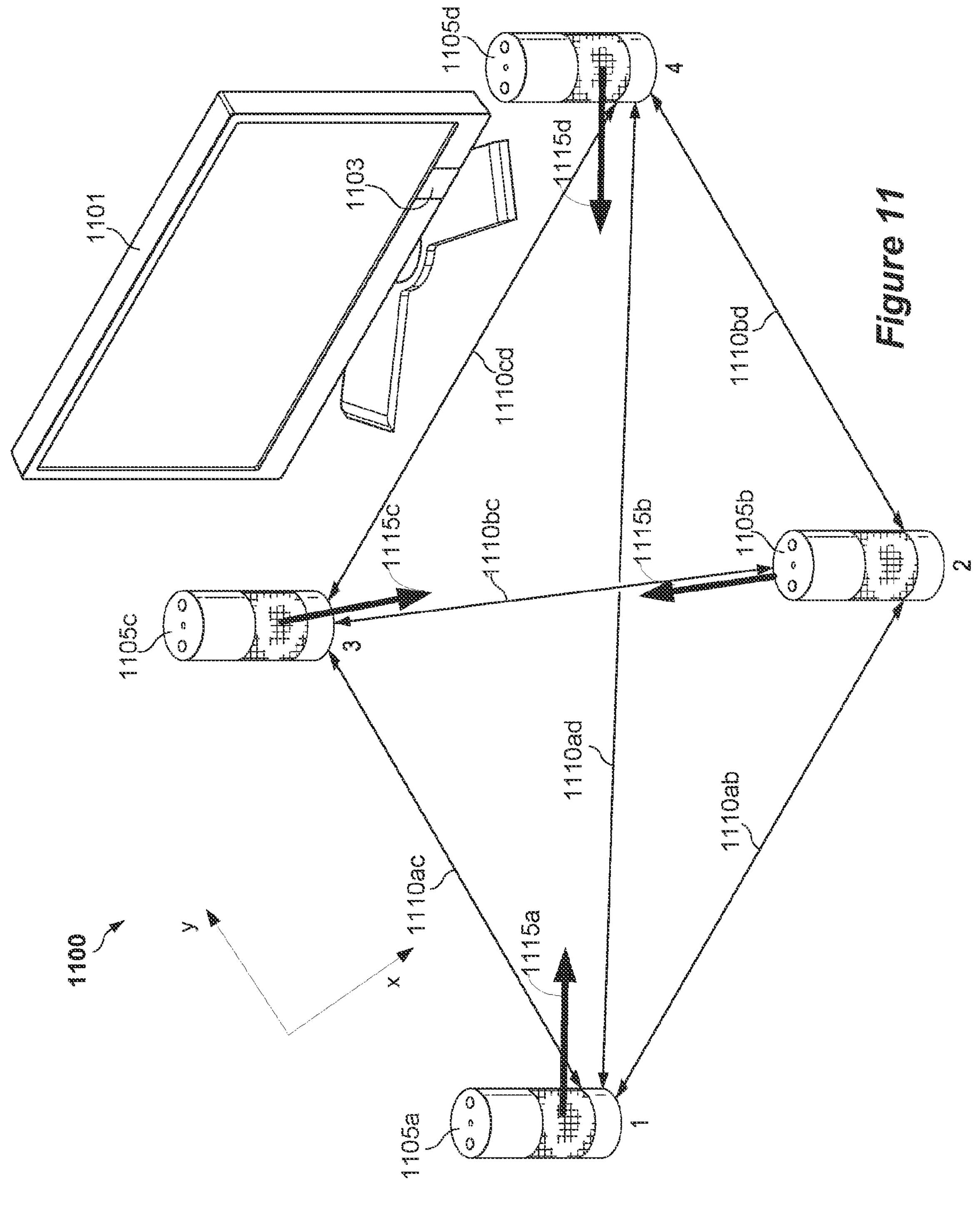
FIG. 11 shows an example of geometric relationships between four audio devices in an environment.

FIG. 11 shows an example of geometric relationships between four audio devices in an environment. In this example, the audio environment 1100 is a room that includes a television 1101 and audio devices 1105*a*, 1105*b*, 1105*c* and 1105*d*. According to this example, the audio devices 1105*a*-1105*d* are in locations 1 through 4, respectively, of the audio environment 1100. As with other examples disclosed herein, the types, numbers, locations and orientations of elements shown in FIG. 11 are merely made by way of example. Other implementations may have different types, numbers and arrangements of elements, e.g., more or fewer audio devices, audio devices in different locations, audio devices having different capabilities, etc.

In this implementation, each of the audio devices 1105*a*-1105*d* is a smart speaker that includes a microphone system and a speaker system that includes at least one speaker. In some implementations, each microphone system includes an array of at least three microphones. According to some implementations, the television 1101 may include a speaker system and/or a microphone system. In some such implementations, an automatic localization method may be used to automatically localize the television 1101, or a portion of the television 1101 (e.g., a television loudspeaker, a television transceiver, etc.), e.g., as described below with reference to the audio devices 1105*a*-1105*d*.

Some of the embodiments described in this disclosure allow for the automatic localization of a set of audio devices, such as the audio devices 1105*a*-1105*d* shown in FIG. 11, based on either the direction of arrival (DOA) between each pair of audio devices, the time of arrival (TOA) of the audio signals between each pair of devices, or both the DOA and the TOA of the audio signals between each pair of devices. In some instances, as in the example shown in FIG. 11, each of the audio devices is enabled with at least one driving unit and one microphone array, the microphone array being capable of providing the direction of arrival of an incoming sound. According to this example, the two-headed arrow 1110*ab* represents sound transmitted by the audio device 1105*a* and received by the audio device 1105*b*, as well as sound transmitted by the audio device 1105*b* and received by the audio device 1105*a*. Similarly, the two-headed arrows 1110*ac*, 1110*ad*, 1110*be*, 1110*bd*, and 1110*cd* represent sounds transmitted and received by audio devices 1105*a* and audio device 1105*c*, sounds transmitted and received by audio devices 1105*a* and audio device 1105*d*, sounds transmitted and received by audio devices 1105*b* and audio device 1105*c*, sounds transmitted and received by audio devices 1105*b* and audio device 1105*d*, and sounds transmitted and received by audio devices 1105*c* and audio device 1105*d*, respectively.

In this example, each of the audio devices 1105*a*-1105*d* has an orientation, represented by the arrows 1115*a*-1115*d*, which may be defined in various ways. For example, the orientation of an audio device having a single loudspeaker may correspond to a direction in which the single loudspeaker is facing. In some examples, the orientation of an audio device having multiple loudspeakers facing in different directions may be indicated by a direction in which one of the loudspeakers is facing. In other examples, the orientation of an audio device having multiple loudspeakers facing in different directions may be indicated by the direction of a vector corresponding to the sum of audio output in the different directions in which each of the multiple loudspeakers is facing. In the example shown in FIG. 11, the orientations of the arrows 1115*a*-1115*d* are defined with reference to a Cartesian coordinate system. In other examples, the orientations of the arrows 1115*a*-1115*d* may be defined with reference to another type of coordinate system, such as a spherical or cylindrical coordinate system.

In this example, the television 1101 includes an electromagnetic interface 1103 that is configured to receive electromagnetic waves. In some examples, the electromagnetic interface 1103 may be configured to transmit and receive electromagnetic waves. According to some implementations, at least two of the audio devices 1105*a*-1105*d* may include an antenna system configured as a transceiver. The antenna system may be configured to transmit and receive electromagnetic waves. In some examples, the antenna system includes an antenna array having at least three antennas. Some of the embodiments described in this disclosure allow for the automatic localization of a set of devices, such as the audio devices 1105*a*-1105*d* and/or the television 1101 shown in FIG. 11, based at least in part on the DOA of electromagnetic waves transmitted between devices. Accordingly, the two-headed arrows 1110*ab*, 1110*ac*, 1110*ad*, 1110*bc*, 1110*bd*, and 1110*cd* also may represent electromagnetic waves transmitted between the audio devices 1105*a*-1105*d*.

According to some examples, the antenna system of a device (such as an audio device) may be co-located with a loudspeaker of the device, e.g., adjacent to the loudspeaker. In some such examples, an antenna system orientation may correspond with a loudspeaker orientation. Alternatively, or additionally, the antenna system of a device may have a known or predetermined orientation with respect to one or more loudspeakers of the device.

In this example, the audio devices 1105*a*-1105*d* are configured for wireless communication with one another and with other devices. In some examples, the audio devices 1105*a*-1105*d* may include network interfaces that are configured for communication between the audio devices 1105*a*-1105*d* and other devices via the Internet. In some implementations, the automatic localization processes disclosed herein may be performed by a control system of one of the audio devices 1105*a*-1105*d*. In other examples, the automatic localization processes may be performed by another device of the audio environment 1100, such as what may sometimes be referred to as a smart home hub, that is configured for wireless communication with the audio devices 1105*a*-1105*d*. In other examples, the automatic localization processes may be performed, at least in part, by a device outside of the audio environment 1100, such as a server, e.g., based on information received from one or more of the audio devices 1105*a*-1105*d* and/or a smart home hub.

Figure 12:
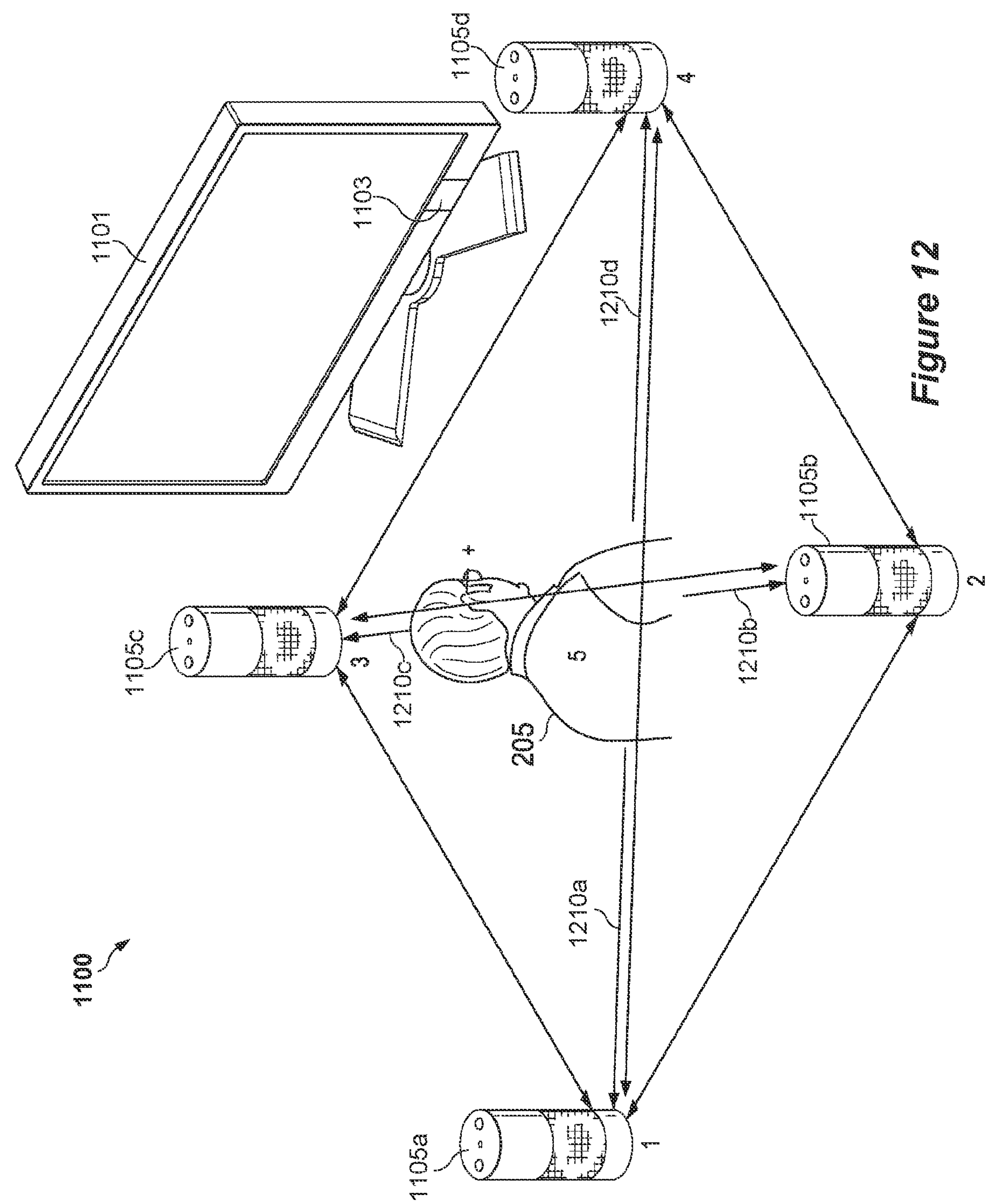
FIG. 12 shows an audio emitter located within the audio environment of FIG. 11.

FIG. 12 shows an audio emitter located within the audio environment of FIG. 11. Some implementations provide automatic localization of one or more audio emitters, such as the person 1205 of FIG. 12. In this example, the person 1205 is at location 5. Here, sound emitted by the person 1205 and received by the audio device 1105*a* is represented by the single-headed arrow 1210*a*. Similarly, sounds emitted by the person 1205 and received by the audio devices 1105*b*, 1105*c* and 1105*d* are represented by the single-headed arrows 1210*b*, 1210*c* and 1210*d*. Audio emitters can be localized based on either the DOA of the audio emitter sound as captured by the audio devices 1105*a*-1105*d* and/or the television 1101, based on the differences in TOA of the audio emitter sound as measured by the audio devices 1105*a*-1105*d* and/or the television 1101, or based on both the DOA and the differences in TOA.

Alternatively, or additionally, some implementations may provide automatic localization of one or more electromagnetic wave emitters. Some of the embodiments described in this disclosure allow for the automatic localization of one or more electromagnetic wave emitters, based at least in part on the DOA of electromagnetic waves transmitted by the one or more electromagnetic wave emitters. If an electromagnetic wave emitter were at location 5, electromagnetic waves emitted by the electromagnetic wave emitter and received by the audio devices 1105*a*, 1105*b*, 1105*c* and 1105*d* also may be represented by the single-headed arrows 1210*a*, 1210*b*, 1210*c* and 1210*c*.

Figure 13:
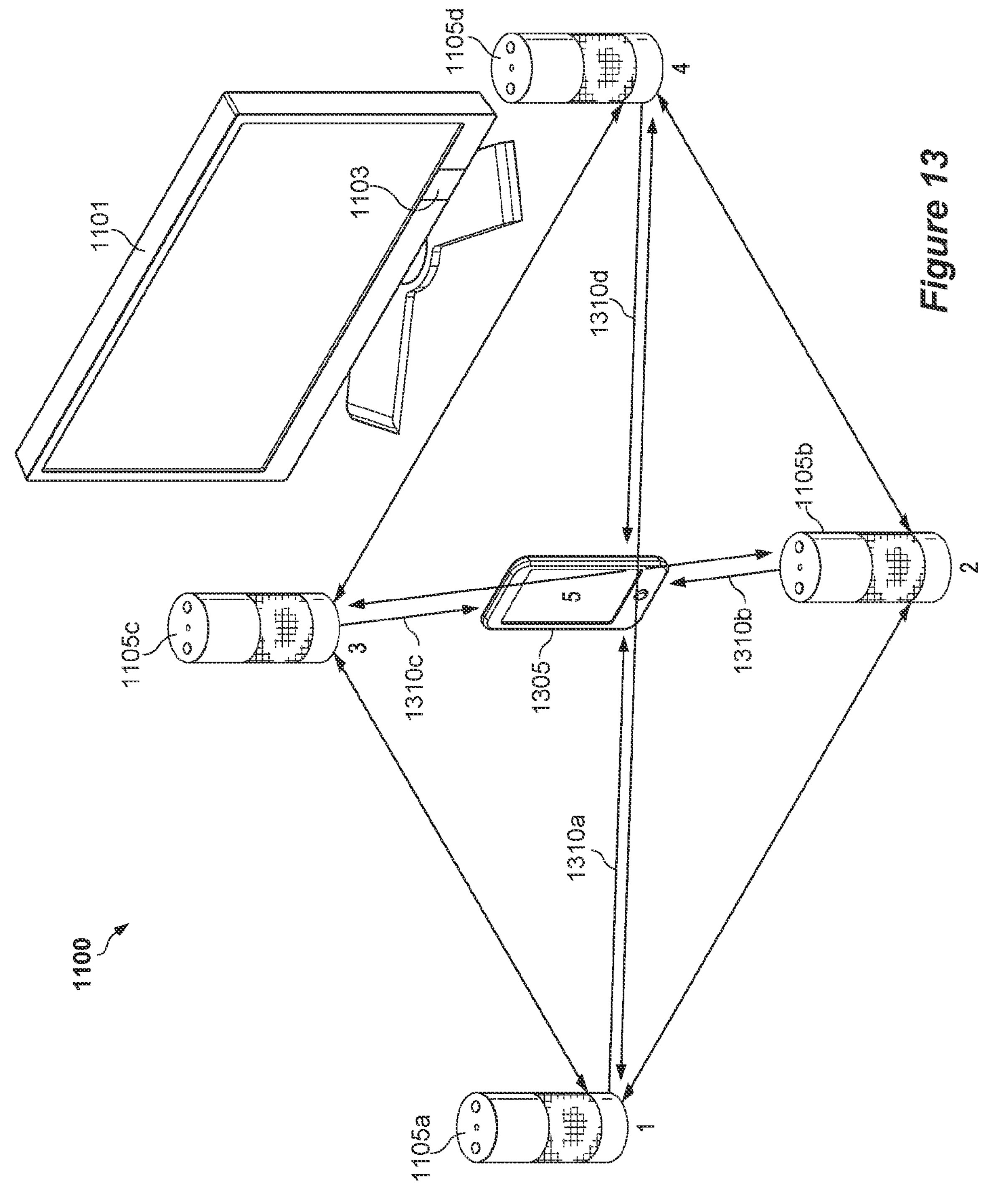
FIG. 13 shows an audio receiver located within the audio environment of FIG. 11.

FIG. 13 shows an audio receiver located within the audio environment of FIG. 11. In this example, the microphones of a smartphone 1305 are enabled, but the speakers of the smartphone 1305 are not currently emitting sound. Some embodiments provide automatic localization one or more passive audio receivers, such as the smartphone 1305 of FIG. 13 when the smartphone 1305 is not emitting sound. Here, sound emitted by the audio device 1105*a* and received by the smartphone 1305 is represented by the single-headed arrow 1310*a*. Similarly, sounds emitted by the audio devices 1105*b*, 1105*c* and 1105*d* and received by the smartphone 1305 are represented by the single-headed arrows 1310*b*, 1310*c* and 1310*d*.

If the audio receiver is equipped with a microphone array and is configured to determine the DOA of received sound, the audio receiver may be localized based, at least in part, on the DOA of sounds emitted by the audio devices 1105*a*-1105*d* and captured by the audio receiver. In some examples, the audio receiver may be localized based, at least in part, on the difference in TOA of the smart audio devices as captured by the audio receiver, regardless of whether the audio receiver is equipped with a microphone array. Yet other embodiments may allow for the automatic localization of a set of smart audio devices, one or more audio emitters, and one or more receivers, based on DOA only or DOA and TOA, by combining the methods described above.

Direction of Arrival Localization

Figure 14:
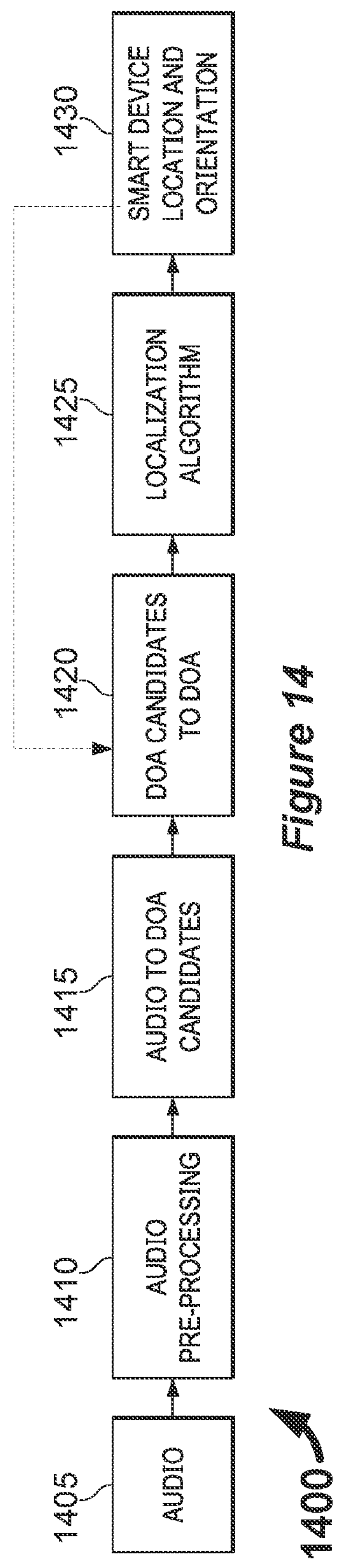
FIG. 14 is a flow diagram that outlines one example of a method that may be performed by a control system of an apparatus such as that shown in FIG. 1.

FIG. 14 is a flow diagram that outlines one example of a method that may be performed by a control system of an apparatus such as that shown in FIG. 1. The blocks of method 1400, like other methods described herein, are not necessarily performed in the order indicated. Moreover, such methods may include more or fewer blocks than shown and/or described.

Method 1400 is an example of an audio device localization process. In this example, method 1400 involves determining the location and orientation of two or more smart audio devices, each of which includes a loudspeaker system and an array of microphones. According to this example, method 1400 involves determining the location and orientation of the smart audio devices based at least in part on the audio emitted by every smart audio device and captured by every other smart audio device, according to DOA estimation. In this example, the initial blocks of method 1400 rely on the control system of each smart audio device to be able to extract the DOA from the input audio obtained by that smart audio device's microphone array, e.g., by using the time differences of arrival between individual microphone capsules of the microphone array.

In this example, block 1405 involves obtaining the audio emitted by every smart audio device of an audio environment and captured by every other smart audio device of the audio environment. In some such examples, block 1405 may involve causing each smart audio device to emit a sound, which in some instances may be a sound having a predetermined duration, frequency content, etc. This predetermined type of sound may be referred to herein as a structured source signal. In some implementations, the smart audio devices may be, or may include, the audio devices 1105*a*-1105*d* of FIG. 11.

In some such examples, block 1405 may involve a sequential process of causing a single smart audio device to emit a sound while the other smart audio devices "listen" for the sound. For example, referring to FIG. 11, block 1405 may involve: (a) causing the audio device 1105*a* to emit a sound and receiving microphone data corresponding to the emitted sound from microphone arrays of the audio devices 1105*b*-1105*d*; then (b) causing the audio device 1105*b* to emit a sound and receiving microphone data corresponding to the emitted sound from microphone arrays of the audio devices 1105*a*, 1105*c* and 1105*d*; then (c) causing the audio device 1105*c* to emit a sound and receiving microphone data corresponding to the emitted sound from microphone arrays of the audio devices 1105*a*, 1105*b* and 1105*d*; then (d) causing the audio device 1105*d* to emit a sound and receiving microphone data corresponding to the emitted sound from microphone arrays of the audio devices 1105*a*, 1105*b* and 1105*c*. The emitted sounds may or may not be the same, depending on the particular implementation.

In other examples, block 1405 may involve a simultaneous process of causing all smart audio devices to emit a sound while the other smart audio devices "listen" for the sound. For example, block 1405 may involve performing the following steps simultaneously: (1) causing the audio device 1105*a* to emit a first sound and receiving microphone data corresponding to the emitted first sound from microphone arrays of the audio devices 1105*b*-1105*d*; (2) causing the audio device 1105*b* to emit a second sound different from the first sound and receiving microphone data corresponding to the emitted second sound from microphone arrays of the audio devices 1105*a*, 1105*c* and 1105*d*; (3) causing the audio device 1105*c* to emit a third sound different from the first sound and the second sound, and receiving microphone data corresponding to the emitted third sound from microphone arrays of the audio devices 1105*a*, 1105*b* and 1105*d*; (4) causing the audio device 1105*d* to emit a fourth sound different from the first sound, the second sound and the third sound, and receiving microphone data corresponding to the emitted fourth sound from microphone arrays of the audio devices 1105*a*, 1105*b* and 1105*c*.

In some examples, block 1405 may be used to determine the mutual audibility of the audio devices in an audio environment. Some detailed examples are disclosed herein.

In this example, block 1410 involves a process of pre-processing the audio signals obtained via the microphones. Block 1410 may, for example, involve applying one or more filters, a noise or echo suppression process, etc. Some additional pre-processing examples are described below.

According to this example, block 1415 involves determining DOA candidates from the pre-processed audio signals resulting from block 1410. For example, if block 1405 involved emitting and receiving structured source signals, block 1415 may involve one or more deconvolution methods to yield impulse responses and/or "pseudo ranges," from which the time difference of arrival of dominant peaks can be used, in conjunction with the known microphone array geometry of the smart audio devices, to estimate DOA candidates.

However, not all implementations of method 1400 involve obtaining microphone signals based on the emission of predetermined sounds. Accordingly, some examples of block 1415 include "blind" methods that are applied to arbitrary audio signals, such as steered response power, receiver-side beamforming, or other similar methods, from which one or more DOAs may be extracted by peak-picking. Some examples are described below. It will be appreciated that while DOA data may be determined via blind methods or using structured source signals, in most instances TOA data may only be determined using structured source signals. Moreover, more accurate DOA information may generally be obtained using structured source signals.

According to this example, block 1420 involves selecting one DOA corresponding to the sound emitted by each of the other smart audio devices. In many instances, a microphone array may detect both direct arrivals and reflected sound that was transmitted by the same audio device. Block 1420 may involve selecting the audio signals that are most likely to correspond to directly transmitted sound. Some additional examples of determining DOA candidates and of selecting a DOA from two or more candidate DOAs are described below.

In this example, block 1425 involves receiving DOA information resulting from each smart audio device's implementation of block 1420 (in other words, receiving a set of DOAs corresponding to sound transmitted from every smart audio device to every other smart audio device in the audio environment) and performing a localization method (e.g., implementing a localization algorithm via a control system) based on the DOA information. In some disclosed implementations, block 1425 involves minimizing a cost function, possibly subject to some constraints and/or weights, e.g., as described below with reference to FIG. 15. In some such examples, the cost function receives as input data the DOA values from every smart audio device to every other smart device and returns as outputs the estimated location and the estimated orientation of each of the smart audio devices. In the example shown in FIG. 14, block 1430 represents the estimated smart audio device locations and the estimated smart audio device orientations produced in block 1425.

Figure 15:
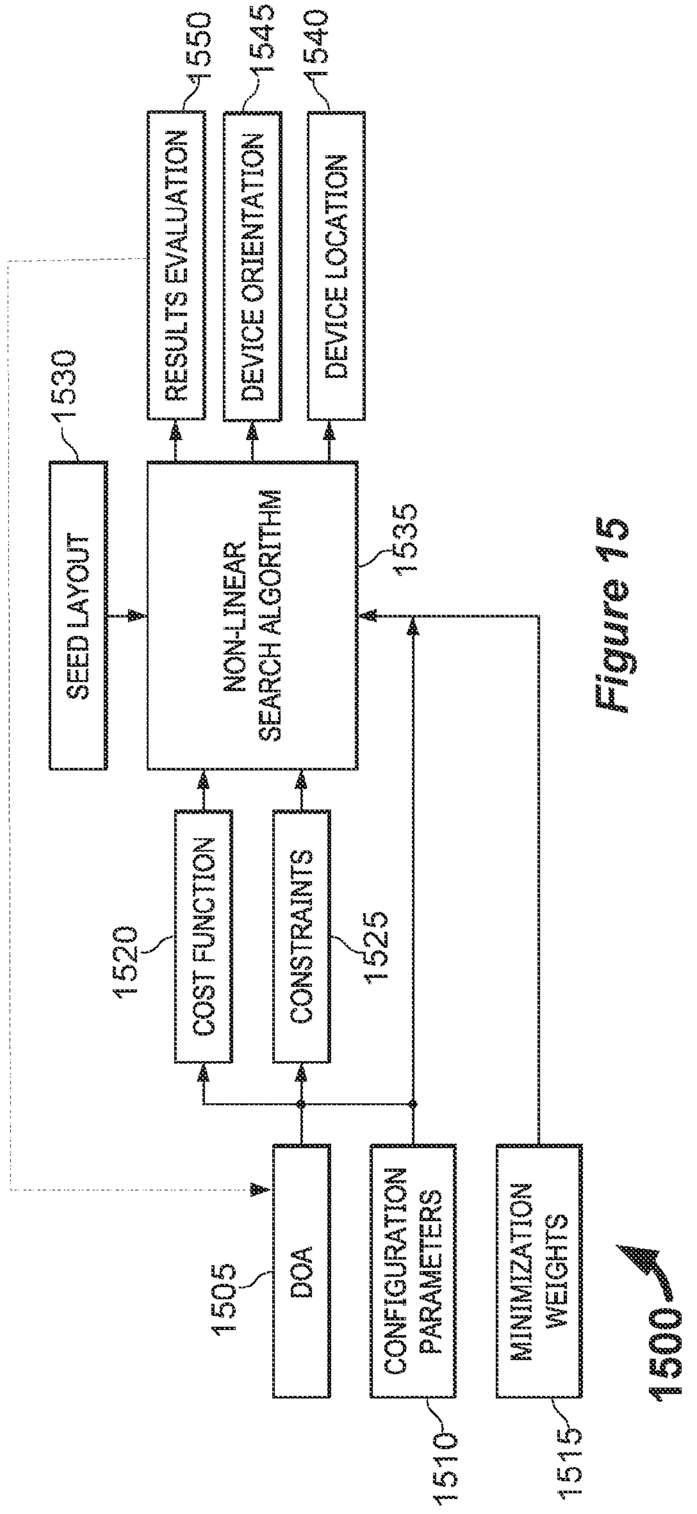
FIG. 15 is a flow diagram that outlines an example of a method for automatically estimating device locations and orientations based on DOA data.

FIG. 15 is a flow diagram that outlines another example of a method for automatically estimating device locations and orientations based on DOA data. Method 1500 may, for example, be performed by implementing a localization algorithm via a control system of an apparatus such as that shown in FIG. 1. The blocks of method 1500, like other methods described herein, are not necessarily performed in the order indicated. Moreover, such methods may include more or fewer blocks than shown and/or described.

According to this example, DOA data are obtained in block 1505. According to some implementations, block 1505 may involve obtaining acoustic DOA data, e.g., as described above with reference to blocks 1405-1420 of FIG. 14. Alternatively, or additionally, block 1505 may involve obtaining DOA data corresponding to electromagnetic waves that are transmitted by, and received by, each of a plurality of devices in an environment.

In this example, the localization algorithm receives as input the DOA data obtained in block 1505 from every smart device to every other smart device in an audio environment, along with any configuration parameters 1510 specified for the audio environment. In some examples, optional constraints 1525 may be applied to the DOA data. The configuration parameters 1510, minimization weights 1515, the optional constraints 1525 and the seed layout 1530 may, for example, be obtained from a memory by a control system that is executing software for implementing the cost function 1520 and the non-linear search algorithm 1535. The configuration parameters 1510 may, for example, include data corresponding to maximum room dimensions, loudspeaker layout constraints, external input to set a global translation (e.g., 2 parameters), a global rotation (1 parameter), and a global scale (1 parameter), etc.

According to this example, the configuration parameters 1510 are provided to the cost function 1520 and to the non-linear search algorithm 1535. In some examples, the configuration parameters 1510 are provided to optional constraints 1525. In this example, the cost function 1520 takes into account the differences between the measured DOAs and the DOAs estimated by an optimizer's localization solution.

In some embodiments, the optional constraints 1525 impose restrictions on the possible audio device location and/or orientation, such as imposing a condition that audio devices are a minimum distance from each other. Alternatively, or additionally, the optional constraints 1525 may impose restrictions on dummy minimization variables introduced by convenience, e.g., as described below.

In this example, minimization weights 1515 are also provided to the non-linear search algorithm 1535. Some examples are described below.

According to some implementations, the non-linear search algorithm 1535 is an algorithm that can find local solutions to a continuous optimization problem of the form:

$$\min C(x)$$

$$x \in C^n$$

such that $$g_L \le g(x) \le g_U$$

and $$x_L \le x \le x_U$$

In the foregoing expressions, C(x): $R^n$->R represent the cost function 1520, and g(x): $R^n$->$R^m$ represent constraint functions corresponding to the optional constraints 1525. In these examples, the vectors $g_L$ and $g_U$ represent the lower and upper bounds on the constraints, and the vectors $x_L$ and $x_U$ represent the bounds on the variables x.

The non-linear search algorithm 1535 may vary according to the particular implementation. Examples of the non-linear search algorithm 1535 include gradient descent methods, the Broyden-Fletcher-Goldfarb-Shanno (BFGS) method, interior point optimization (IPOPT) methods, etc. While some of the non-linear search algorithms require only the values of the cost functions and the constraints, some other methods also may require the first derivatives (gradients, Jacobians) of the cost function and constraints, and some other methods also may require the second derivatives (Hessians) of the same functions. If the derivatives are required, they can be provided explicitly, or they can be computed automatically using automatic or numerical differentiation techniques.

Some non-linear search algorithms need seed point information to start the minimization, as suggested by the seed layout 1530 that is provided to the non-linear search algorithm 1535 in FIG. 15. In some examples, the seed point information may be provided as a layout consisting of the same number of smart audio devices (in other words, the same number as the actual number of smart audio devices for which DOA data are obtained) with corresponding locations and orientations. The locations and orientations may be arbitrary, and need not be the actual or approximate locations and orientations of the smart audio devices. In some examples, the seed point information may indicate smart audio device locations that are along an axis or another arbitrary line of the audio environment, smart audio device locations that are along a circle, a rectangle or other geometric shape within the audio environment, etc. In some examples, the seed point information may indicate arbitrary smart audio device orientations, which may be predetermined smart audio device orientations or random smart audio device orientations.

In some embodiments, the cost function 1520 can be formulated in terms of complex plane variables as follows:

$$C_{DOA}(x, z) = \sum_{n=1}^{N} \sum_{\substack{m=1 \\ m \neq n}}^{N} w_{nm}^{DOA} \left| Z_{nm} - z_n^* \left( \frac{x_m - x_n}{|x_m - x_n|} \right) \right|^2,$$

wherein the star indicates complex conjugation, the bar indicates absolute value, and where:

- $Z_{nm}=\exp(i\ DOA_{nm})$ represents the complex plane value giving the direction of arrival of smart device m as measured from device n, with i representing the imaginary unit;
- $x_n=x_{nx}+ix_{ny}$ represents the complex plane value encoding the x and y positions of the smart device n;
- $z_n=\exp(i\alpha_n)$ represents the complex value encoding the angle $\alpha_n$ of orientation of the smart device n;
- $w_{nm}^{DOA}$ represents the weight given to the $DOA_{nm}$ measurement;
- N represents the number of smart audio devices for which DOA data are obtained; and
- $x=(x_1, \ldots, x_N)$ and $z=(z_1, \ldots, z_N)$ represent vectors of the complex positions and complex orientations, respectively, of all Nsmart audio devices.

According to this example, the outcomes of the minimization are device location data 1540 indicating the 2D position of the smart devices, $x_k$ (representing 2 real unknowns per device) and device orientation data 1545 indicating the orientation vector of the smart devices $z_k$ (representing 2 additional real variables per device). From the orientation vector, only the angle of orientation of the smart device $\alpha_k$ is relevant for the problem (1 real unknown per device). Therefore, in this example there are 3 relevant unknowns per smart device.

In some examples, results evaluation block 1550 involves computing the residual of the cost function at the outcome position and orientations. A relatively lower residual indicates relatively more precise device localization values. According to some implementations, the results evaluation block 1550 may involve a feedback process. For example, some such examples may implement a feedback process that involves comparing the residual of a given DOA candidate combination with another DOA candidate combination, e.g., as explained in the DOA robustness measures discussion below.

As noted above, in some implementations block 1505 may involve obtaining acoustic DOA data as described above with reference to blocks 1405-1420 of FIG. 14, which involve determining DOA candidates and selecting DOA candidates. Accordingly, FIG. 15 includes a dashed line from the results evaluation block 1550 to block 1505, to represent one flow of an optional feedback process. Moreover, FIG. 14 includes a dashed line from block 1430 (which may involve results evaluation in some examples) to DOA candidate selection block 1420, to represent a flow of another optional feedback process.

In some embodiments, the non-linear search algorithm 1535 may not accept complex-valued variables. In such cases, every complex-valued variable can be replaced by a pair of real variables.

In some implementations, there may be additional prior information regarding the availability or reliability of each DOA measurement. In some such examples, loudspeakers may be localized using only a subset of all the possible DOA elements. The missing DOA elements may, for example, be masked with a corresponding zero weight in the cost function. In some such examples, the weights $w_{nm}$ may be either be zero or one, e.g., zero for those measurements which are either missing or considered not sufficiently reliable and one for the reliable measurements. In some other embodiments, the weights $w_{nm}$ may have a continuous value from zero to one, as a function of the reliability of the DOA measurement. In those embodiments in which no prior information is available, the weights $w_{nm}$ may simply be set to one.

In some implementations, the conditions $|z_k|=1$ (one condition for every smart audio device) may be added as constraints to ensure the normalization of the vector indicating the orientation of the smart audio device. In other examples, these additional constraints may not be needed, and the vector indicating the orientation of the smart audio device may be left unnormalized. Other implementations may add as constraints conditions on the proximity of the smart audio devices, e.g., indicating that $|x_n-x_m|\geq D$, where D is the minimum distance between smart audio devices.

The minimization of the cost function above does not fully determine the absolute position and orientation of the smart audio devices. According to this example, the cost function remains invariant under a global rotation (1 independent parameter), a global translation (2 independent parameters), and a global rescaling (1 independent parameter), affecting simultaneously all the smart devices locations and orientations. This global rotation, translation, and rescaling cannot be determined from the minimization of the cost function. Different layouts related by the symmetry transformations are totally indistinguishable in this framework and are said to belong to the same equivalence class. Therefore, the configuration parameters should provide criteria to allow uniquely defining a smart audio device layout representing an entire equivalence class. In some embodiments, it may be advantageous to select criteria so that this smart audio device layout defines a reference frame that is close to the reference frame of a listener near a reference listening position. Examples of such criteria are provided below. In some other examples, the criteria may be purely mathematical and disconnected from a realistic reference frame.

The symmetry disambiguation criteria may include a reference position, fixing the global translation symmetry (e.g., smart audio device 1 should be at the origin of coordinates); a reference orientation, fixing the two-dimensional rotation symmetry (e.g., smart device 1 should be oriented toward an area of the audio environment designated as the front, such as where the television 1101 is located in FIGS. 11-13); and a reference distance, fixing the global scaling symmetry (e.g., smart device 2 should be at a unit distance from smart device 1). In total, there are 4 parameters that cannot be determined from the minimization problem in this example and that should be provided as an external input. Therefore, in this example there are 3N−4 unknowns that can be determined from the minimization problem.

As described above, in some examples, in addition to the set of smart audio devices, there may be one or more passive audio receivers, equipped with a microphone array, and/or one or more audio emitters. In such cases the localization process may use a technique to determine the smart audio device location and orientation, emitter location, and passive receiver location and orientation, from the audio emitted by every smart audio device and every emitter and captured by every other smart audio device and every passive receiver, based on DOA estimation.

In some such examples, the localization process may proceed in a similar manner as described above. In some instances, the localization process may be based on the same cost function described above, which is shown below for the reader's convenience:

$$C_{DOA}(x, z) = \sum_{n=1}^{N}\sum_{\substack{m=1\\ m\neq n}}^{N} w_{nm}^{DOA}\left|Z_{nm} - z_n^*\left(\frac{x_m - x_n}{|x_m - x_n|}\right)\right|^2$$

However, if the localization process involves passive audio receivers and/or audio emitters that are not audio receivers, the variables of the foregoing equation need to be interpreted in a slightly different way. Now N represents the total number of devices, including $N_{smart}$ smart audio devices, $N_{rec}$ passive audio receivers and $N_{emit}$ emitters, so that $N=N_{smart}+N_{rec}+N_{emit}$. In some examples, the weights $w_{nm}^{DOA}$ may have a sparse structure to mask out missing data due to passive receivers or emitter-only devices (or other audio sources without receivers, such as human beings), so that $w_{nm}^{DOA}=0$ for all m if device n is an audio emitter without a receiver, and $w_{nm}^{DOA}=0$ for all n if device m is an audio receiver. For both smart audio devices and passive receivers both the position and angle can be determined, whereas for audio emitters only the position can be obtained. The total number of unknowns is $3N_{smart}+3N_{rec}+2N_{emit}-4$.

Combined Time of Arrival and Direction of Arrival Localization

In the following discussion, the differences between the above-described DOA-based localization processes and the combined DOA and TOA localization of this section will be emphasized. Those details that are not explicitly given may be assumed to be the same as those in the above-described DOA-based localization processes.

Figure 16:
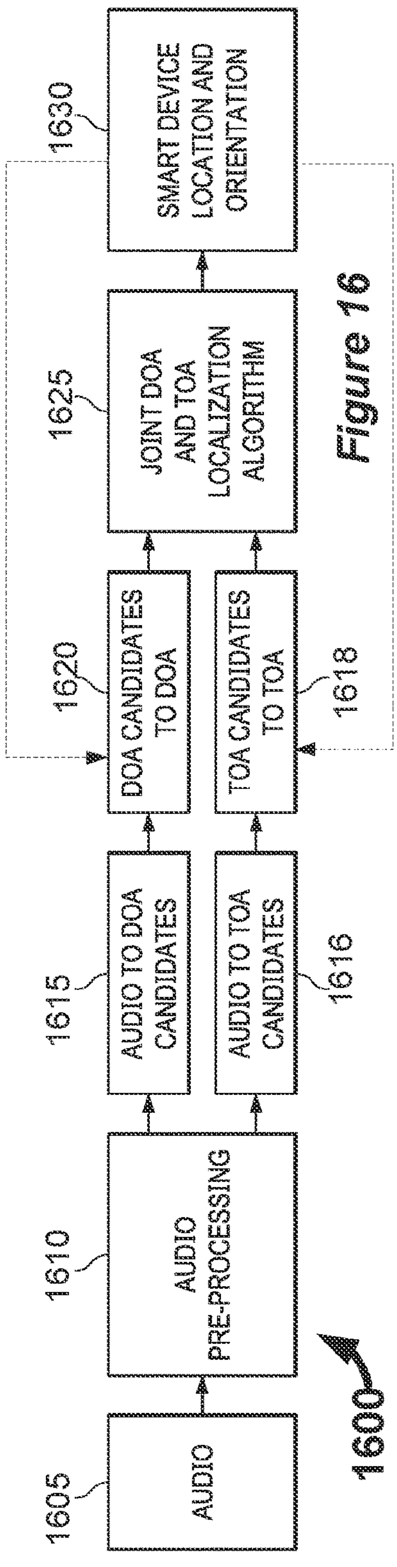
FIG. 16 is a flow diagram that outlines one example of a method for automatically estimating device locations and orientations based on DOA data and TOA data.

FIG. 16 is a flow diagram that outlines one example of a method for automatically estimating device locations and orientations based on DOA data and TOA data. Method 1600 may, for example, be performed by implementing a localization algorithm via a control system of an apparatus such as that shown in FIG. 1. The blocks of method 1600, like other methods described herein, are not necessarily performed in the order indicated. Moreover, such methods may include more or fewer blocks than shown and/or described.

According to this example, DOA data are obtained in blocks 1605-1620. According to some implementations, blocks 1605-1620 may involve obtaining acoustic DOA data from a plurality of smart audio devices, e.g., as described above with reference to blocks 1405-1420 of FIG. 14. In some alternative implementations, blocks 1605-1620 may involve obtaining DOA data corresponding to electromagnetic waves that are transmitted by, and received by, each of a plurality of devices in an environment.

In this example, however, block 1605 also involves obtaining TOA data. According to this example, the TOA data includes the measured TOA of audio emitted by, and received by, every smart audio device in the audio environment (e.g., every pair of smart audio devices in the audio environment). In some embodiments that involve emitting structured source signals, the audio used to extract the TOA data may be the same as was used to extract the DOA data. In other embodiments, the audio used to extract the TOA data may be different from that used to extract the DOA data.

According to this example, block 1616 involves detecting TOA candidates in the audio data and block 1618 involves selecting a single TOA for each smart audio device pair from among the TOA candidates. Some examples are described below.

Various techniques may be used to obtain the TOA data. One method is to use a room calibration audio sequence, such as a sweep (e.g., a logarithmic sine tone) or a Maximum Length Sequence (MLS). Optionally, either aforementioned sequence may be used with band-limiting to the close ultrasonic audio frequency range (e.g., 18 kHz to 24 kHz). In this audio frequency range most standard audio equipment is able to emit and record sound, but such a signal cannot be perceived by humans because it lies beyond the normal human hearing capabilities. Some alternative implementations may involve recovering TOA elements from a hidden signal in a primary audio signal, such as a Direct Sequence Spread Spectrum signal.

Given a set of DOA data from every smart audio device to every other smart audio device, and the set of TOA data from every pair of smart audio devices, the localization method 1625 of FIG. 16 may be based on minimizing a certain cost function, possibly subject to some constraints. In this example, the localization method 1625 of FIG. 16 receives as input data the above-described DOA and TOA values, and outputs the estimated location data and orientation data 630 corresponding to the smart audio devices. In some examples, the localization method 1625 also may output the playback and recording latencies of the smart audio devices, e.g., up to some global symmetries that cannot be determined from the minimization problem. Some examples are described below.

Figure 17:
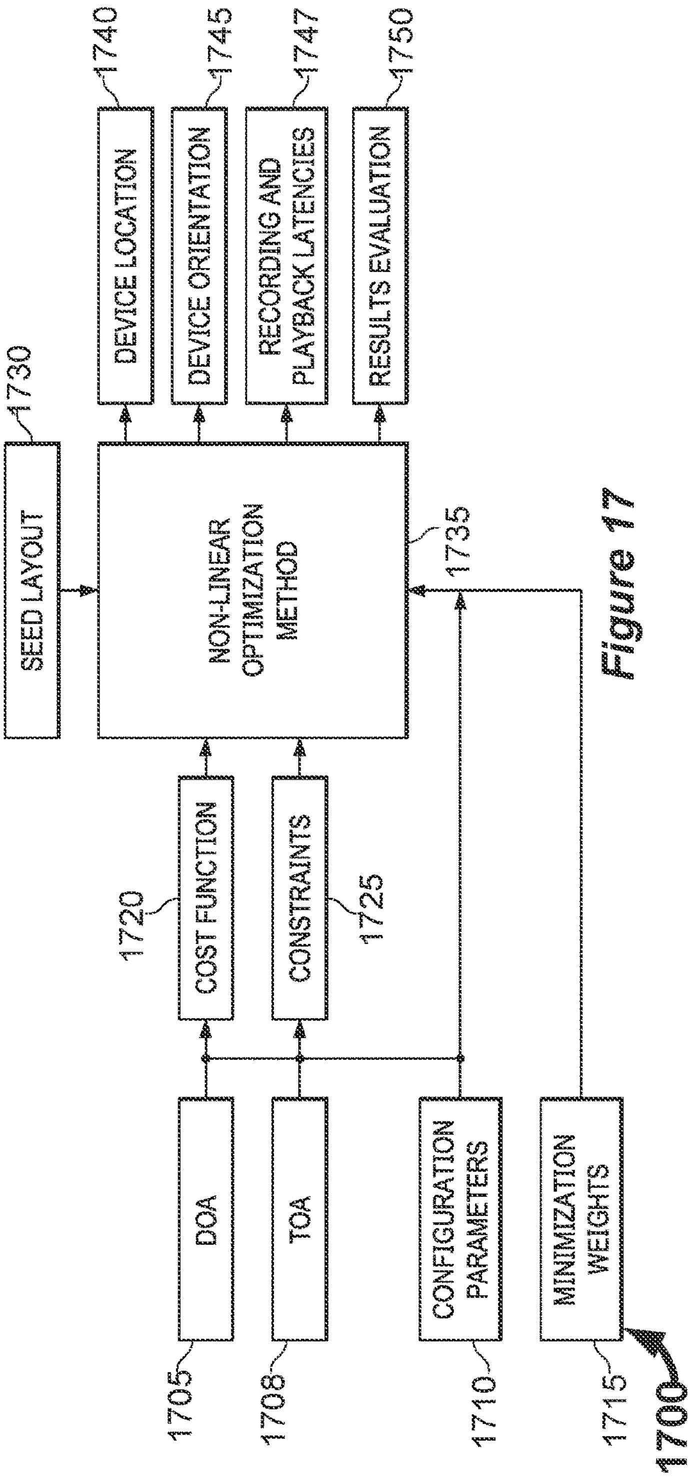
FIG. 17 is a flow diagram that outlines another example of a method for automatically estimating device locations and orientations based on DOA data and TOA data.

FIG. 17 is a flow diagram that outlines another example of a method for automatically estimating device locations and orientations based on DOA data and TOA data. Method 1700 may, for example, be performed by implementing a localization algorithm via a control system of an apparatus such as that shown in FIG. 1. The blocks of method 1700, like other methods described herein, are not necessarily performed in the order indicated. Moreover, such methods may include more or fewer blocks than shown and/or described.

Except as described below, in some examples blocks 1705, 1710, 1715, 1720, 1725, 1730, 1735, 1740, 1745 and 1750 may be as described above with reference to blocks 1505, 1510, 1515, 1520, 1525, 1530, 1535, 1540, 1545 and 1550 of FIG. 15. However, in this example the cost function 1720 and the non-linear optimization method 1735 are modified, with respect to the cost function 1520 and the non-linear optimization method 1535 of FIG. 15, so as to operate on both DOA data and TOA data. The TOA data of block 1708 may, in some examples, be obtained as described above with reference to FIG. 16. Another difference, as compared to the process of FIG. 15, is that in this example the non-linear optimization method 1735 also outputs recording and playback latency data 1747 corresponding to the smart audio devices, e.g., as described below. Accordingly, in some implementations, the results evaluation block 1750 may involve evaluating both DOA data and/or TOA data. In some such examples, the operations of block 1750 may include a feedback process involving the DOA data and/or TOA data. For example, some such examples may implement a feedback process that involves comparing the residual of a given TOA/DOA candidate combination with another TOA/DOA candidate combination, e.g., as explained in the TOA/DOA robustness measures discussion below.

In some examples, results evaluation block 1750 involves computing the residual of the cost function at the outcome position and orientations. A relatively lower residual normally indicates relatively more precise device localization values. According to some implementations, the results evaluation block 1750 may involve a feedback process. For example, some such examples may implement a feedback process that involves comparing the residual of a given TOA/DOA candidate combination with another TOA/DOA candidate combination, e.g., as explained in the TOA and DOA robustness measures discussion below.

Accordingly, FIG. 16 includes dashed lines from block 630 (which may involve results evaluation in some examples) to DOA candidate selection block 1620 and TOA candidate selection block 1618, to represent a flow of an optional feedback process. In some implementations block 1705 may involve obtaining acoustic DOA data as described above with reference to blocks 1605-1620 of FIG. 16, which involve determining DOA candidates and selecting DOA candidates. In some examples block 1708 may involve obtaining acoustic TOA data as described above with reference to blocks 1605-1618 of FIG. 16, which involve determining TOA candidates and selecting TOA candidates. Although not shown in FIG. 17, some optional feedback processes may involve reverting from the results evaluation block 1750 to block 1705 and/or block 1708.

According to this example, the localization algorithm proceeds by minimizing a cost function, possibly subject to some constraints, and can be described as follows. In this example, the localization algorithm receives as input the DOA data 1705 and the TOA data 1708, along with configuration parameters 1710 specified for the listening environment and possibly some optional constraints 1725. In this example, the cost function takes into account the differences between the measured DOA and the estimated DOA, and the differences between the measured TOA and the estimated TOA. In some embodiments, the constraints 1725 impose restrictions on the possible device location, orientation, and/or latencies, such as imposing a condition that audio devices are a minimum distance from each other and/or imposing a condition that some device latencies should be zero.

In some implementations, the cost function can be formulated as follows:

$$C(x,z,\ell,k)=W_{DOA}C_{DOA}(x,z)+W_{TOA}C_{TOA}(x,\ell,k)$$

In the foregoing equation, $\ell=(\ell_1, \ldots, \ell_N)$ and $k=(k_1, \ldots, k_N)$ are represent vectors of playback and recording devices for every device, respectively, and where $W_{DOA}$ and $W_{TOA}$ represent the global weights (also known as prefactors) of the DOA and TOA minimization parts, respectively, reflecting the relative importance of each one of the two terms. In some such examples, the TOA cost function can be formulated as:

$$C_{TOA}(x,\ell,k)=\sum_{n=1}^{N}\sum_{m=1}^{N}w_{nm}^{TOA}(cTOA_{nm}-c\ell_m+ck_n-|x_m-x_n|)_{,}^{2}$$

where $TOA_{nm}$ represents the measured time of arrival of signal travelling from smart device m to smart device n;

$w_{nm}^{TOA}$ represents the weight given to the $TOA_{nm}$ measurement; and c represents the speed of sound.

There are up to 5 real unknowns per every smart audio device: the device positions $x_n$ (2 real unknowns per device), the device orientations $\alpha_n$ (1 real unknown per device) and the recording and playback latencies $\ell_n$ and $k_n$ (2 additional unknowns per device). From these, only device positions and latencies are relevant for the TOA part of the cost function. The number of effective unknowns can be reduced in some implementations if there are a priori known restrictions or links between the latencies.

In some examples, there may be additional prior information, e.g., regarding the availability or reliability of each TOA measurement. In some of these examples, the weights $w_{nm}^{TOA}$ can either be zero or one, e.g., zero for those measurements which are not available (or considered not sufficiently reliable) and one for the reliable measurements. This way, device localization may be estimated with only a subset of all possible DOA and/or TOA elements. In some other implementations, the weights may have a continuous value from zero to one, e.g., as a function of the reliability of the TOA measurement. In some examples, in which no prior reliability information is available, the weights may simply be set to one.

According to some implementations, one or more additional constraints may be placed on the possible values of the latencies and/or the relation of the different latencies among themselves.

In some examples, the position of the audio devices may be measured in standard units of length, such as meters, and the latencies and times of arrival may be indicated in standard units of time, such as seconds. However, it is often the case that non-linear optimization methods work better when the scale of variation of the different variables used in the minimization process is of the same order. Therefore, some implementations may involve rescaling the position measurements so that the range of variation of the smart device positions ranges between −1 and 1, and rescaling the latencies and times of arrival so that these values range between −1 and 1 as well.

The minimization of the cost function above does not fully determine the absolute position and orientation of the smart audio devices or the latencies. The TOA information gives an absolute distance scale, meaning that the cost function is no longer invariant under a scale transformation, but still remains invariant under a global rotation and a global translation. Additionally, the latencies are subject to an additional global symmetry: the cost function remains invariant if the same global quantity is added simultaneously to all the playback and recording latencies. These global transformations cannot be determined from the minimization of the cost function. Similarly, the configuration parameters should provide a criterion to allowing to uniquely define a device layout representing an entire equivalence class.

In some examples, the symmetry disambiguation criteria may include the following: a reference position, fixing the global translation symmetry (e.g., smart device 1 should be at the origin of coordinates); a reference orientation, fixing the two-dimensional rotation symmetry (e.g., smart device 1 should be oriented toward the front); and a reference latency (e.g., recording latency for device 1 should be zero). In total, in this example there are 4 parameters that cannot be determined from the minimization problem and that should be provided as an external input. Therefore, there are 5N−4 unknowns that can be determined from the minimization problem.

In some implementations, besides the set of smart audio devices, there may be one or more passive audio receivers, which may not be equipped with a functioning microphone array, and/or one or more audio emitters. The inclusion of latencies as minimization variables allows some disclosed methods to localize receivers and emitters for which emission and reception times are not precisely known. In some such implementations, the TOA cost function described above may be implemented. This cost function is shown again below for the reader's convenience:

$$C_{TOA}(x, \ell, k) = \sum_{n=1}^{N}\sum_{m=1}^{N} w_{nm}^{TOA}(cTOA_{nm} - c\ell_m + ck_n - |x_m - x_n|)^2$$

As described above with reference to the DOA cost function, the cost function variables need to be interpreted in a slightly different way if the cost function is used for localization estimates involving passive receivers and/or emitters. Now N represents the total number of devices, including $N_{smart}$ smart audio devices, $N_{rec}$ passive audio receivers and $N_{emit}$ emitters, so that $N=N_{smart}+N_{rec}+N_{emit}$. The weights $w_{nm}^{DOA}$ may have a sparse structure to mask out missing data due to passive receivers or emitters-only, e.g., so that $w_{nm}^{DOA}=0$ for all m if device n is an audio emitter, and $w_{nm}^{DOA}=0$ for all n if device m is an audio receiver. According to some implementations, for smart audio devices positions, orientations, and recording and playback latencies must be determined; for passive receivers, positions, orientations, and recording latencies must be determined; and for audio emitters, positions and playback latencies must be determined. According to some such examples, the total number of unknowns is therefore $5N_{smart}+4N_{rec}+3N_{emit}-4$.

Disambiguation of Global Translation and Rotation

Solutions to both DOA-only and combined TOA and DOA problems are subject to a global translation and rotation ambiguity. In some examples, the translation ambiguity can be resolved by treating an emitter-only source as a listener and translating all devices such that the listener lies at the origin.

Rotation ambiguities can be resolved by placing additional constraints on the solution. For example, some multi-loudspeaker environments may include television (TV) loudspeakers and a couch positioned for TV viewing. After locating the loudspeakers in the environment, some methods may involve finding a vector joining the listener to the TV viewing direction. Some such methods may then involve having the TV emit a sound from its loudspeakers and/or prompting the user to walk up to the TV and locating the user's speech. Some implementations may involve rendering an audio object that pans around the environment. A user may provide user input (e.g., saying "Stop") indicating when the audio object is in one or more predetermined positions within the environment, such as the front of the environment, at a TV location of the environment, etc. Some implementations involve a cellphone app equipped with an inertial measurement unit that prompts the user to point the cellphone in two defined directions: the first in the direction of a particular device, for example the device with lit LEDs, the second in the user's desired viewing direction, such as the front of the environment, at a TV location of the environment, etc. Some detailed disambiguation examples will now be described with reference to FIGS. 18A-18D.

Figure 18A:
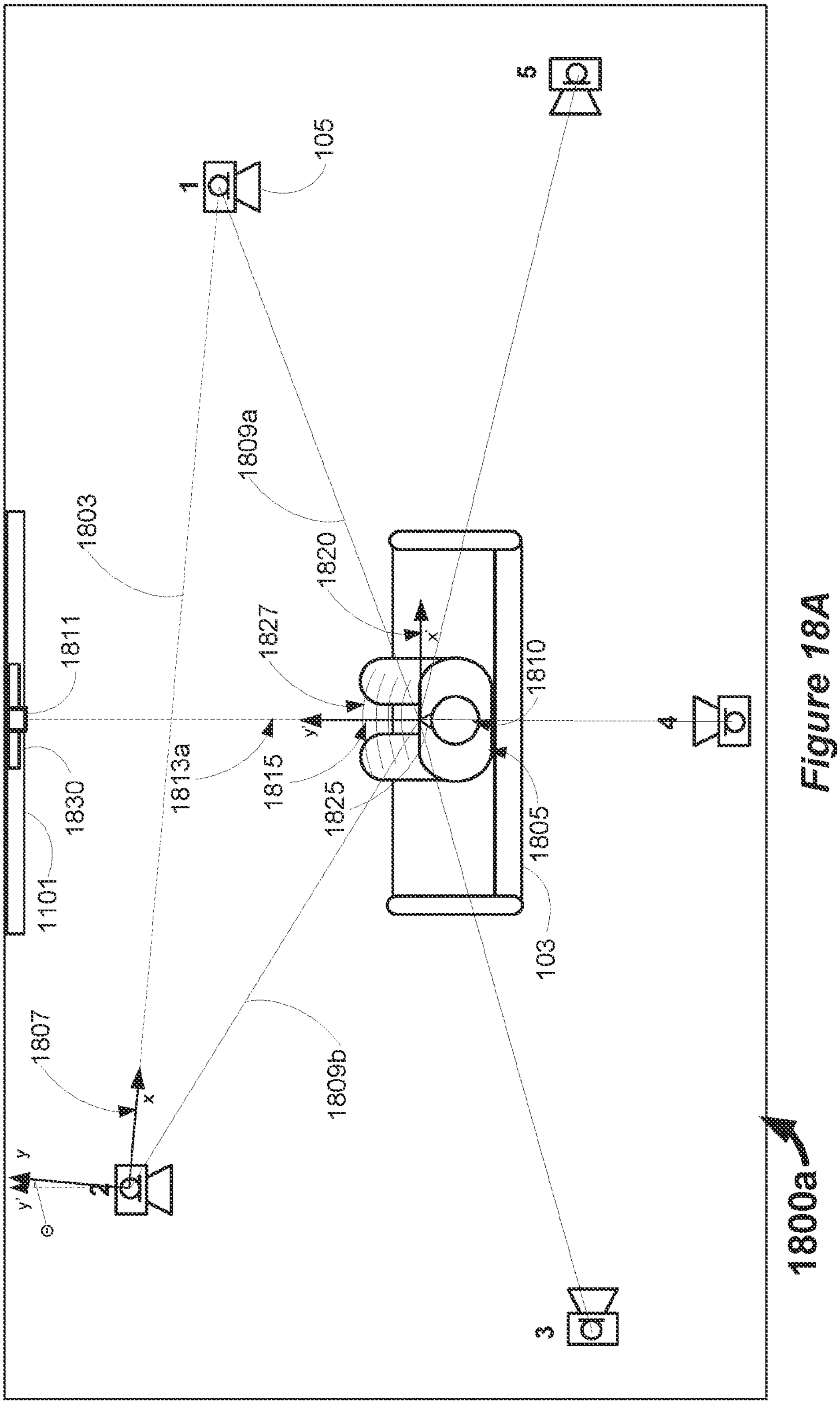
FIG. 18A shows an example of an audio environment.

FIG. 18A shows an example of an audio environment. According to some examples, the audio device location data output by one of the disclosed localization methods may include an estimate of an audio device location for each of audio devices 1-5, with reference to the audio device coordinate system 1807. In this implementation, the audio device coordinate system 1807 is a Cartesian coordinate system having the location of the microphone of audio device 2 as its origin. Here, the x axis of the audio device coordinate system 1807 corresponds with a line 1803 between the location of the microphone of audio device 2 and the location of the microphone of audio device 1.

In this example, this example, the listener location is determined by prompting the listener 1805 who is shown seated on the couch 1103 (e.g., via an audio prompt from one or more loudspeakers in the environment 1800*a*) to make one or more utterances 1827 and estimating the listener location according to time-of-arrival (TOA) data. The TOA data corresponds to microphone data obtained by a plurality of microphones in the environment. In this example, the microphone data corresponds with detections of the one or more utterances 1827 by the microphones of at least some (e.g., 3, 4 or all 5) of the audio devices 1-5.

Alternatively, or additionally, the listener location may be estimated according to DOA data provided by the microphones of at least some (e.g., 2, 3, 4 or all 5) of the audio devices 1-5. According to some such examples, the listener location may be determined according to the intersection of lines 1809*a*, 1809*b*, etc., corresponding to the DOA data.

According to this example, the listener location corresponds with the origin of the listener coordinate system 1820. In this example, the listener angular orientation data is indicated by the y' axis of the listener coordinate system 1820, which corresponds with a line 1813*a* between the listener's head 1810 (and/or the listener's nose 1825) and the sound bar 1830 of the television 1101. In the example shown in FIG. 18A, the line 1813*a* is parallel to the y' axis. Therefore, the angle ⊖ represents the angle between the y axis and the y' axis. Accordingly, although the origin of the audio device coordinate system 1807 is shown to correspond with audio device 2 in FIG. 18A, some implementations involve co-locating the origin of the audio device coordinate system 1807 with the origin of the listener coordinate system 1820 prior to the rotation by the angle ⊖ of audio device coordinates around the origin of the listener coordinate system 1820. This co-location may be performed by a coordinate transformation from the audio device coordinate system 1807 to the listener coordinate system 1820.

The location of the sound bar 1830 and/or the television 1101 may, in some examples, be determined by causing the sound bar to emit a sound and estimating the sound bar's location according to DOA and/or TOA data, which may correspond detections of the sound by the microphones of at least some (e.g., 3, 4 or all 5) of the audio devices 1-5. Alternatively, or additionally, the location of the sound bar 1830 and/or the television 1101 may be determined by prompting the user to walk up to the TV and locating the user's speech by DOA and/or TOA data, which may correspond detections of the sound by the microphones of at least some (e.g., 3, 4 or all 5) of the audio devices 1-5. Some such methods may involve applying a cost function, e.g., as described above. Some such methods may involve triangulation. Such examples may be beneficial in situations wherein the sound bar 1830 and/or the television 1101 has no associated microphone.

In some other examples wherein the sound bar 1830 and/or the television 1101 does have an associated microphone, the location of the sound bar 1830 and/or the television 1101 may be determined according to TOA and/or DOA methods, such as the methods disclosed herein. According to some such methods, the microphone may be co-located with the sound bar 1830.

According to some implementations, the sound bar 1830 and/or the television 1101 may have an associated camera 1811. A control system may be configured to capture an image of the listener's head 1810 (and/or the listener's nose 1825). In some such examples, the control system may be configured to determine a line 1813*a* between the listener's head 1810 (and/or the listener's nose 1825) and the camera 1811. The listener angular orientation data may correspond with the line 1813*a*. Alternatively, or additionally, the control system may be configured to determine an angle ⊖ between the line 1813*a* and the y axis of the audio device coordinate system.

Figure 18B:
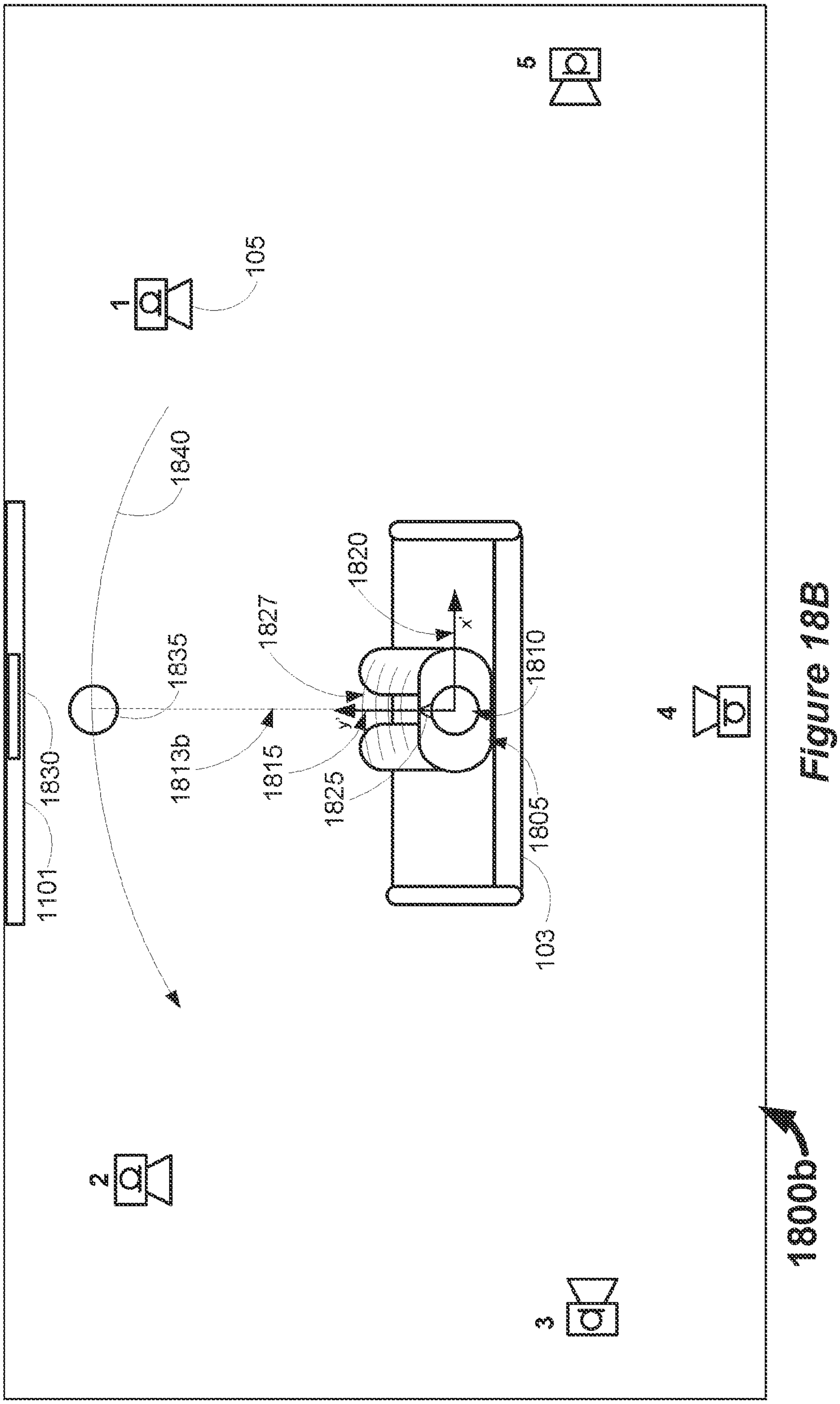
FIG. 18B shows an additional example of determining listener angular orientation data.

FIG. 18B shows an additional example of determining listener angular orientation data. According to this example, the listener location has already been determined. Here, a control system is controlling loudspeakers of the environment 1800*b* to render the audio object 1835 to a variety of locations within the environment 1800*b*. In some such examples, the control system may cause the loudspeakers to render the audio object 1835 such that the audio object 1835 seems to rotate around the listener 1805, e.g., by rendering the audio object 1835 such that the audio object 1835 seems to rotate around the origin of the listener coordinate system 1820. In this example, the curved arrow 1840 shows a portion of the trajectory of the audio object 1835 as it rotates around the listener 1805.

According to some such examples, the listener 1805 may provide user input (e.g., saying "Stop") indicating when the audio object 1835 is in the direction that the listener 1805 is facing. In some such examples, the control system may be configured to determine a line 1813*b* between the listener location and the location of the audio object 1835. In this example, the line 1813*b* corresponds with the y' axis of the listener coordinate system, which indicates the direction that the listener 1805 is facing. In alternative implementations, the listener 1805 may provide user input indicating when the audio object 1835 is in the front of the environment, at a TV location of the environment, at an audio device location, etc.

Figure 18C:
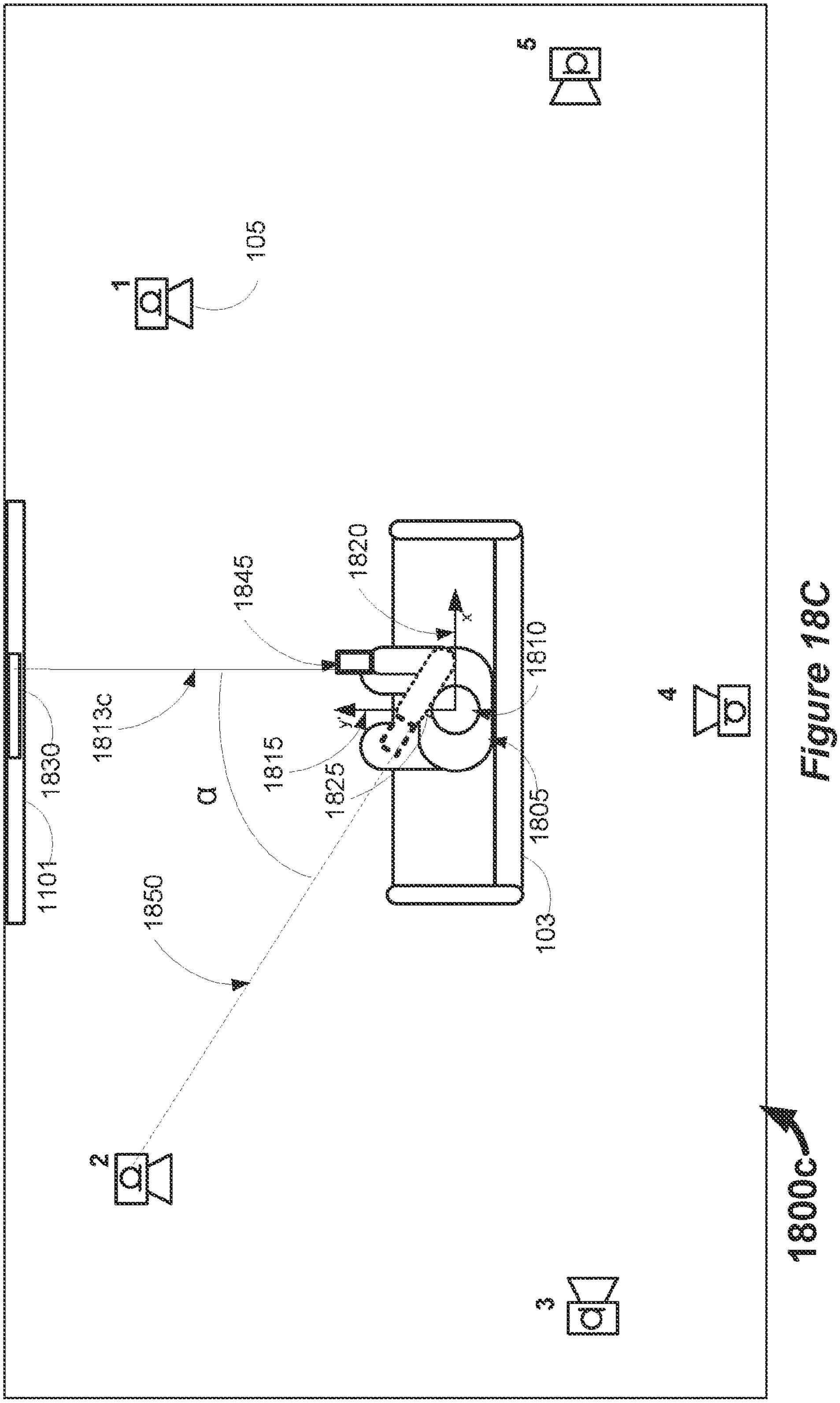
FIG. 18C shows an additional example of determining listener angular orientation data.

FIG. 18C shows an additional example of determining listener angular orientation data. According to this example, the listener location has already been determined. Here, the listener 1805 is using a handheld device 1845 to provide input regarding a viewing direction of the listener 1805, by pointing the handheld device 1845 towards the television 1101 or the soundbar 1830. The dashed outline of the handheld device 1845 and the listener's arm indicate that at a time prior to the time at which the listener 1805 was pointing the handheld device 1845 towards the television 1101 or the soundbar 1830, the listener 1805 was pointing the handheld device 1845 towards audio device 2 in this example. In other examples, the listener 1805 may have pointed the handheld device 1845 towards another audio device, such as audio device 1. According to this example, the handheld device 1845 is configured to determine an angle α between audio device 2 and the television 1101 or the soundbar 1830, which approximates the angle between audio device 2 and the viewing direction of the listener 1805.

The handheld device 1845 may, in some examples, be a cellular telephone that includes an inertial sensor system and a wireless interface configured for communicating with a control system that is controlling the audio devices of the environment 1800*c*. In some examples, the handheld device 1845 may be running an application or "app" that is configured to control the handheld device 1845 to perform the necessary functionality, e.g., by providing user prompts (e.g., via a graphical user interface), by receiving input indicating that the handheld device 1845 is pointing in a desired direction, by saving the corresponding inertial sensor data and/or transmitting the corresponding inertial sensor data to the control system that is controlling the audio devices of the environment 1800*c*, etc.

According to this example, a control system (which may be a control system of the handheld device 1845, a control system of a smart audio device of the environment 1800*c* or a control system that is controlling the audio devices of the environment 1800*c*) is configured to determine the orientation of lines 1813*c* and 1850 according to the inertial sensor data, e.g., according to gyroscope data. In this example, the line 1813*c* is parallel to the axis y' and may be used to determine the listener angular orientation. According to some examples, a control system may determine an appropriate rotation for the audio device coordinates around the origin of the listener coordinate system 1820 according to the angle α between audio device 2 and the viewing direction of the listener 1805.

Figure 18D:
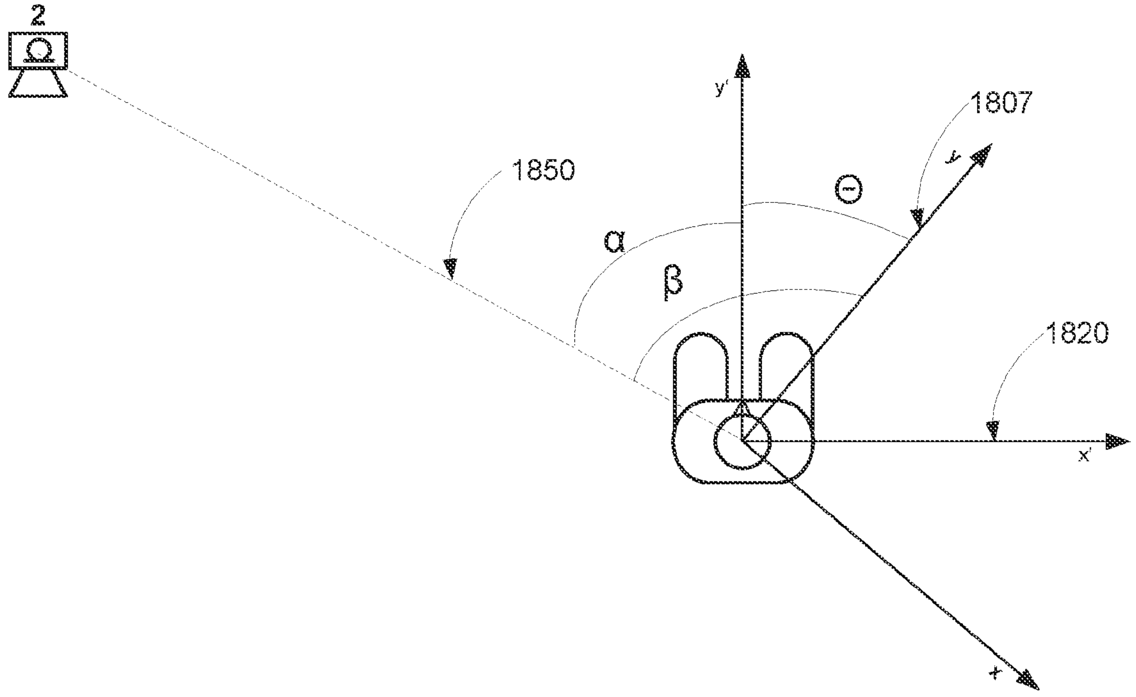
FIG. 18D shows one example of determine an appropriate rotation for the audio device coordinates in accordance with the method described with reference to FIG. 18C.

FIG. 18D shows one example of determine an appropriate rotation for the audio device coordinates in accordance with the method described with reference to FIG. 18C. In this example, the origin of the audio device coordinate system 1807 is co-located with the origin of the listener coordinate system 1820. Co-locating the origins of the audio device coordinate system 1807 and the listener coordinate system 1820 is made possible after the listener location is determined. Co-locating the origins of the audio device coordinate system 1807 and the listener coordinate system 1820 may involve transforming the audio device locations from the audio device coordinate system 1807 to the listener coordinate system 1820. The angle α has been determined as described above with reference to FIG. 18C. Accordingly, the angle α corresponds with the desired orientation of the audio device 2 in the listener coordinate system 1820. In this example, the angle β corresponds with the orientation of the audio device 2 in the audio device coordinate system 1807. The angle ⊖, which is β-α in this example, indicates the necessary rotation to align the y axis of the of the audio device coordinate system 1807 with the y' axis of the listener coordinate system 1820.

DOA Robustness Measures

As noted above with reference to FIG. 14, in some examples using "blind" methods that are applied to arbitrary signals including steered response power, beamforming, or other similar methods, robustness measures may be added to improve accuracy and stability. Some implementations include time integration of beamformer steered response to filter out transients and detect only the persistent peaks, as well as to average out random errors and fluctuations in those persistent DOAs. Other examples may use only limited frequency bands as input, which can be tuned to room or signal types for better performance.

For examples using 'supervised' methods that involve the use of structured source signals and deconvolution methods to yield impulse responses, preprocessing measures can be implemented to enhance the accuracy and prominence of DOA peaks. In some examples, such preprocessing may include truncation with an amplitude window of some temporal width starting at the onset of the impulse response on each microphone channel. Such examples may incorporate an impulse response onset detector such that each channel onset can be found independently.

In some examples based on either 'blind' or 'supervised' methods as described above, still further processing may be added to improve DOA accuracy. It is important to note that DOA selection based on peak detection (e.g., during Steered-Response Power (SRP) or impulse response analysis) is sensitive to environmental acoustics that can give rise to the capture of non-primary path signals due to reflections and device occlusions that will dampen both receive and transmit energy. These occurrences can degrade the accuracy of device pair DOAs and introduce errors in the optimizer's localization solution. It is therefore prudent to regard all peaks within predetermined thresholds as candidates for ground truth DOAs. One example of a predetermined threshold is a requirement that a peak be larger than the mean Steered-Response Power (SRP). For all detected peaks, prominence thresholding and removing candidates below the mean signal level have proven to be simple yet effective initial filtering techniques. As used herein, "prominence" is a measure of how large a local peak is compared to its adjacent local minima, which is different from thresholding only based on power. One example of a prominence threshold is a requirement that the difference in power between a peak and its adjacent local minima be at or above a threshold value. Retention of viable candidates improves the chances that a device pair will contain a usable DOA in their set (within an acceptable error tolerance from the ground truth), though there is the chance that it will not contain a usable DOA in cases where the signal is corrupted by strong reflections/occlusions. In some examples, a selection algorithm may be implemented in order to do one of the following: 1) select the best usable DOA candidate per device pair; 2) make a determination that none of the candidates are usable and therefore null that pair's optimization contribution with the cost function weighting matrix; or 3) select a best inferred candidate but apply a non-binary weighting to the DOA contribution in cases where it is difficult to disambiguate the amount of error the best candidate carries.

After an initial optimization with the best inferred candidates, in some examples the localization solution may be used to compute the residual cost contribution of each DOA. An outlier analysis of the residual costs can provide evidence of DOA pairs that are most heavily impacting the localization solution, with extreme outliers flagging those DOAs to be potentially incorrect or sub-optimal. A recursive run of optimizations for outlying DOA pairs based on the residual cost contributions with the remaining candidates and with a weighting applied to that device pair's contribution may then be used for candidate handling according to one of the aforementioned three options. This is one example of a feedback process such as described above with reference to FIGS. 14-17. According to some implementations, repeated optimizations and handling decisions may be carried out until all detected candidates are evaluated and the residual cost contributions of the selected DOAs are balanced.

A drawback of candidate selection based on optimizer evaluations is that it is computationally intensive and sensitive to candidate traversal order. An alternative technique with less computational weight involves determining all permutations of candidates in the set and running a triangle alignment method for device localization on these candidates. Relevant triangle alignment methods are disclosed in U.S. Provisional Patent Application No. 62/992,068, filed on Mar. 19, 2020 and entitled "Audio Device Auto-Location," which is hereby incorporated by reference for all purposes. The localization results can then be evaluated by computing the total and residual costs the results yield with respect to the DOA candidates used in the triangulation. Decision logic to parse these metrics can be used to determine the best candidates and their respective weighting to be supplied to the non-linear optimization problem. In cases where the list of candidates is large, therefore yielding high permutation counts, filtering and intelligent traversal through the permutation list may be applied.

TOA Robustness Measures

As described above with reference to FIG. 16, the use of multiple candidate TOA solutions adds robustness over systems that utilize single or minimal TOA values, and ensures that errors have a minimal impact on finding the optimal speaker layout. Having obtained an impulse response of the system, in some examples each one of the TOA matrix elements can be recovered by searching for the peak corresponding to the direct sound. In ideal conditions (e.g., no noise, no obstructions in the direct path between source and receiver and speakers pointing directly to the microphones) this peak can be easily identified as the largest peak in the impulse response. However, in presence of noise, obstructions, or misalignment of speakers and microphones, the peak corresponding to the direct sound does not necessarily correspond to the largest value. Moreover, in such conditions the peak corresponding to the direct sound can be difficult to isolate from other reflections and/or noise. The direct sound identification can, in some instances, be a challenging process. An incorrect identification of the direct sound will degrade (and in some instances may completely spoil) the automatic localization process. Thus, in cases wherein there is the potential for error in the direct sound identification process, it can be effective to consider multiple candidates for the direct sound. In some such instances, the peak selection process may include two parts: (1) a direct sound search algorithm, which looks for suitable peak candidates, and (2) a peak candidate evaluation process to increase the probability to pick the correct TOA matrix elements.

In some implementations, the process of searching for direct sound candidate peaks may include a method to identify relevant candidates for the direct sound. Some such methods may be based on the following steps: (1) identify one first reference peak (e.g., the maximum of the absolute value of the impulse response (IR)), the "first peak;" (2) evaluate the level of noise around (before and after) this first peak; (3) search for alternative peaks before (and in some cases after) the first peak that are above the noise level; (4) rank the peaks found according to their probability of corresponding the correct TOA; and optionally (5) group close peaks (to reduce the number of candidates).

Once direct sound candidate peaks are identified, some implementations may involve a multiple peak evaluation step. As a result of the direct sound candidate peak search, in some examples there will be one or more candidate values for each TOA matrix element ranked according their estimated probability. Multiple TOA matrices can be formed by selecting among the different candidate values. In order to assess the likelihood of a given TOA matrix, a minimization process (such as the minimization process described above) may be implemented. This process can generate the residuals of the minimization, which are a good estimates of the internal coherence of the TOA and DOA matrices. A perfect noiseless TOA matrix will lead to zero residuals, whereas a TOA matrix with incorrect matrix elements will lead to large residuals. In some implementations, the method will look for the set of candidate TOA matrix elements that creates the TOA matrix with the smallest residuals. This is one example of an evaluation process described above with reference to FIGS. 16 and 17, which may involve results evaluation block 1750. In one example, the evaluation process may involve performing the following steps: (1) choose an initial TOA matrix; (2) evaluate the initial matrix with the residuals of the minimization process; (3) change one matrix element of the TOA matrix from the list of TOA candidates; (4) re-evaluate the matrix with the residuals of the minimization process; (5) if the residuals are smaller accept the change, otherwise do not accept it; and (6) iterate over steps 3 to 5. In some examples, the evaluation process may stop when all TOA candidates have been evaluated or when a predefined maximum number of iterations has been reached.

Localization Method Example

Figure 19A:
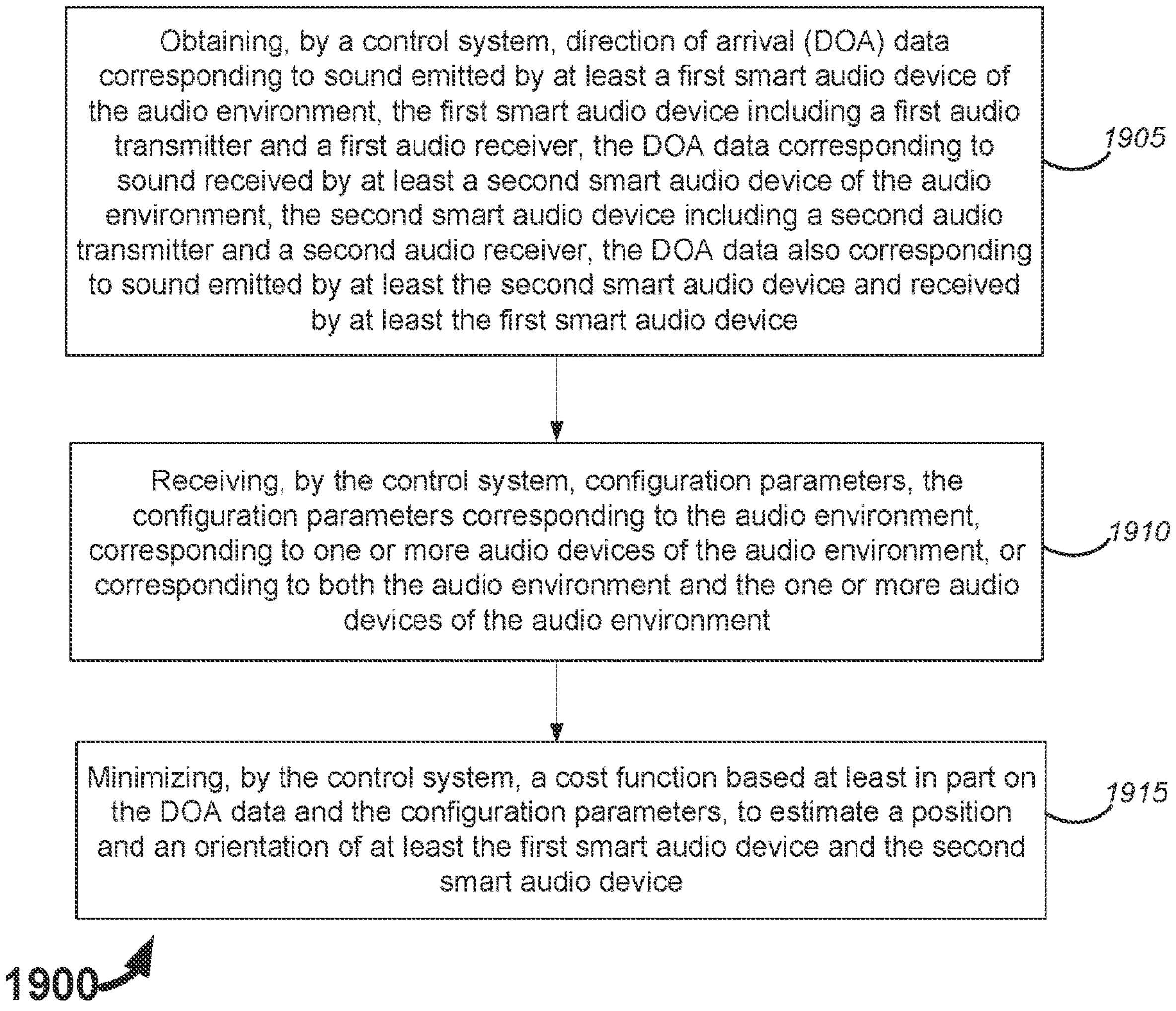
FIG. 19 is a flow diagram that outlines one example of a localization method.

FIG. 19 is a flow diagram that outlines one example of a localization method. The blocks of method 1900, like other methods described herein, are not necessarily performed in the order indicated. Moreover, such methods may include more or fewer blocks than shown and/or described. In this implementation, method 1900 involves estimating the locations and orientations of audio devices in an environment. The blocks of method 1900 may be performed by one or more devices, which may be (or may include) the apparatus 100 shown in FIG. 1.

In this example, block 1905 obtaining, by a control system, direction of arrival (DOA) data corresponding to sound emitted by at least a first smart audio device of the audio environment. The control system may, for example, be the control system 110 that is described above with reference to FIG. 1. According to this example, the first smart audio device includes a first audio transmitter and a first audio receiver and the DOA data corresponds to sound received by at least a second smart audio device of the audio environment. Here, the second smart audio device includes a second audio transmitter and a second audio receiver. In this example, the DOA data also corresponds to sound emitted by at least the second smart audio device and received by at least the first smart audio device. In some examples, the first and second smart audio devices may be two of the audio devices 1105*a*-1105*d* shown in FIG. 11.

The DOA data may be obtained in various ways, depending on the particular implementation. In some instances, determining the DOA data may involve one or more of the DOA-related methods that are described above with reference to FIG. 14 and/or in the "DOA Robustness Measures" section. Some implementations may involve obtaining, by the control system, one or more elements of the DOA data using a beamforming method, a steered powered response method, a time difference of arrival method and/or a structured signal method.

According to this example, block 1910 involves receiving, by the control system, configuration parameters. In this implementation, the configuration parameters correspond to the audio environment itself, to one or more audio devices of the audio environment, or to both the audio environment and the one or more audio devices of the audio environment. According to some examples, the configuration parameters may indicate a number of audio devices in the audio environment, one or more dimensions of the audio environment, one or more constraints on audio device location or orientation and/or disambiguation data for at least one of rotation, translation or scaling. In some examples, the configuration parameters may include playback latency data, recording latency data and/or data for disambiguating latency symmetry.

In this example, block 1915 involves minimizing, by the control system, a cost function based at least in part on the DOA data and the configuration parameters, to estimate a position and an orientation of at least the first smart audio device and the second smart audio device.

According to some examples, the DOA data also may correspond to sound emitted by third through $N^{th}$ smart audio devices of the audio environment, where N corresponds to a total number of smart audio devices of the audio environment. In such examples, the DOA data also may correspond to sound received by each of the first through $N^{th}$ smart audio devices from all other smart audio devices of the audio environment. In such instances, minimizing the cost function may involve estimating a position and an orientation of the third through $N^{th}$ smart audio devices.

In some examples, the DOA data also may correspond to sound received by one or more passive audio receivers of the audio environment. Each of the one or more passive audio receivers may include a microphone array, but may lack an audio emitter. Minimizing the cost function may also provide an estimated location and orientation of each of the one or more passive audio receivers. According to some examples, the DOA data also may correspond to sound emitted by one or more audio emitters of the audio environment. Each of the one or more audio emitters may include at least one sound-emitting transducer but may lack a microphone array. Minimizing the cost function also may provide an estimated location of each of the one or more audio emitters.

In some examples, method 1900 may involve receiving, by the control system, a seed layout for the cost function. The seed layout may, for example, specify a correct number of audio transmitters and receivers in the audio environment and an arbitrary location and orientation for each of the audio transmitters and receivers in the audio environment.

According to some examples, method 1900 may involve receiving, by the control system, a weight factor associated with one or more elements of the DOA data. The weight factor may, for example, indicate the availability and/or the reliability of the one or more elements of the DOA data.

In some examples, method 1900 may involve receiving, by the control system, time of arrival (TOA) data corresponding to sound emitted by at least one audio device of the audio environment and received by at least one other audio device of the audio environment. In some such examples, the cost function may be based, at least in part, on the TOA data. Some such implementations may involve estimating at least one playback latency and/or at least one recording latency. According to some such examples, the cost function may operate with a rescaled position, a rescaled latency and/or a resealed time of arrival.

In some examples, the cost function may include a first term depending on the DOA data only and second term depending on the TOA data only. In some such examples, the first term may include a first weight factor and the second term may include a second weight factor. According to some such examples, one or more TOA elements of the second term may have a TOA element weight factor indicating the availability or reliability of each of the one or more TOA elements.

Figure 20:
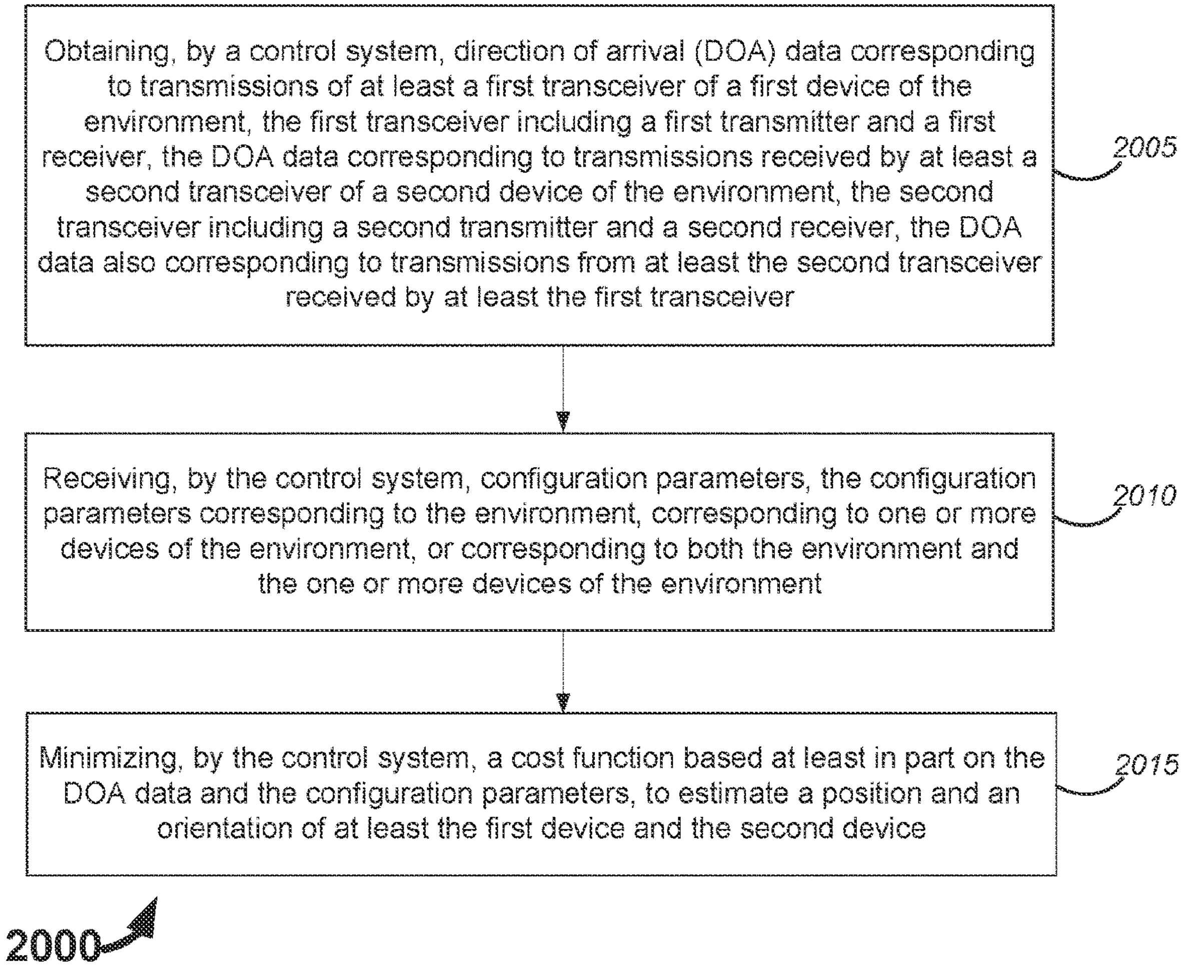
FIG. 20 is a flow diagram that outlines another example of a localization method.

FIG. 20 is a flow diagram that outlines another example of a localization method. The blocks of method 2000, like other methods described herein, are not necessarily performed in the order indicated. Moreover, such methods may include more or fewer blocks than shown and/or described. In this implementation, method 2000 involves estimating the locations and orientations of devices in an environment. The blocks of method 2000 may be performed by one or more devices, which may be (or may include) the apparatus 100 shown in FIG. 1.

In this example, block 2005 obtaining, by a control system, direction of arrival (DOA) data corresponding to transmissions of at least a first transceiver of a first device of the environment. The control system may, for example, be the control system 110 that is described above with reference to FIG. 1. According to this example, the first transceiver includes a first transmitter and a first receiver and the DOA data corresponds to transmissions received by at least a second transceiver of a second device of the environment, the second transceiver also including a second transmitter and a second receiver. In this example, the DOA data also corresponds to transmissions from at least the second transceiver received by at least the first transceiver. According to some examples, the first transceiver and the second transceiver may be configured for transmitting and receiving electromagnetic waves. In some examples, the first and second smart audio devices may be two of the audio devices 1105*a*-1105*d* shown in FIG. 11.

The DOA data may be obtained in various ways, depending on the particular implementation. In some instances, determining the DOA data may involve one or more of the DOA-related methods that are described above with reference to FIG. 14 and/or in the "DOA Robustness Measures" section. Some implementations may involve obtaining, by the control system, one or more elements of the DOA data using a beamforming method, a steered powered response method, a time difference of arrival method and/or a structured signal method.

According to this example, block 2010 involves receiving, by the control system, configuration parameters. In this implementation, the configuration parameters correspond to the environment itself, to one or more devices of the audio environment, or to both the environment and the one or more devices of the audio environment. According to some examples, the configuration parameters may indicate a number of audio devices in the environment, one or more dimensions of the environment, one or more constraints on device location or orientation and/or disambiguation data for at least one of rotation, translation or scaling. In some examples, the configuration parameters may include playback latency data, recording latency data and/or data for disambiguating latency symmetry.

In this example, block 2015 involves minimizing, by the control system, a cost function based at least in part on the DOA data and the configuration parameters, to estimate a position and an orientation of at least the first device and the second device.

According to some implementations, the DOA data also may correspond to transmissions emitted by third through $N^{th}$ transceivers of third through $N^{th}$ devices of the environment, where N corresponds to a total number of transceivers of the environment and where the DOA data also corresponds to transmissions received by each of the first through $N^{th}$ transceivers from all other transceivers of the environment. In some such implementations, minimizing the cost function also may involve estimating a position and an orientation of the third through $N^{th}$ transceivers.

In some examples, the first device and the second device may be smart audio devices and the environment may be an audio environment. In some such examples, the first transmitter and the second transmitter may be audio transmitters. In some such examples, the first receiver and the second receiver may be audio receivers. According to some such examples, the DOA data also may correspond to sound emitted by third through $N^{th}$ smart audio devices of the audio environment, where N corresponds to a total number of smart audio devices of the audio environment. In such examples, the DOA data also may correspond to sound received by each of the first through $N^{th}$ smart audio devices from all other smart audio devices of the audio environment. In such instances, minimizing the cost function may involve estimating a position and an orientation of the third through $N^{th}$ smart audio devices. Alternatively, or additionally, in some examples the DOA data may correspond to electromagnetic waves emitted and received by devices in the environment.

In some examples, the DOA data also may correspond to sound received by one or more passive receivers of the environment. Each of the one or more passive receivers may include a receiver array, but may lack a transmitter. Minimizing the cost function may also provide an estimated location and orientation of each of the one or more passive receivers. According to some examples, the DOA data also may correspond to transmissions from one or more transmitters of the environment. In some such examples, each of the one or more transmitters may lack a receiver array. Minimizing the cost function also may provide an estimated location of each of the one or more transmitters.

In some examples, method 2000 may involve receiving, by the control system, a seed layout for the cost function. The seed layout may, for example, specify a correct number of transmitters and receivers in the audio environment and an arbitrary location and orientation for each of the transmitters and receivers in the audio environment.

According to some examples, method 2000 may involve receiving, by the control system, a weight factor associated with one or more elements of the DOA data. The weight factor may, for example, indicate the availability and/or the reliability of the one or more elements of the DOA data.

In some examples, method 2000 may involve receiving, by the control system, time of arrival (TOA) data corresponding to sound emitted by at least one audio device of the audio environment and received by at least one other audio device of the audio environment. In some such examples, the cost function may be based, at least in part, on the TOA data. Some such implementations may involve estimating at least one playback latency and/or at least one recording latency. According to some such examples, the cost function may operate with a rescaled position, a rescaled latency and/or a rescaled time of arrival.

In some examples, the cost function may include a first term depending on the DOA data only and second term depending on the TOA data only. In some such examples, the first term may include a first weight factor and the second term may include a second weight factor. According to some such examples, one or more TOA elements of the second term may have a TOA element weight factor indicating the availability or reliability of each of the one or more TOA elements.

Figure 21A:
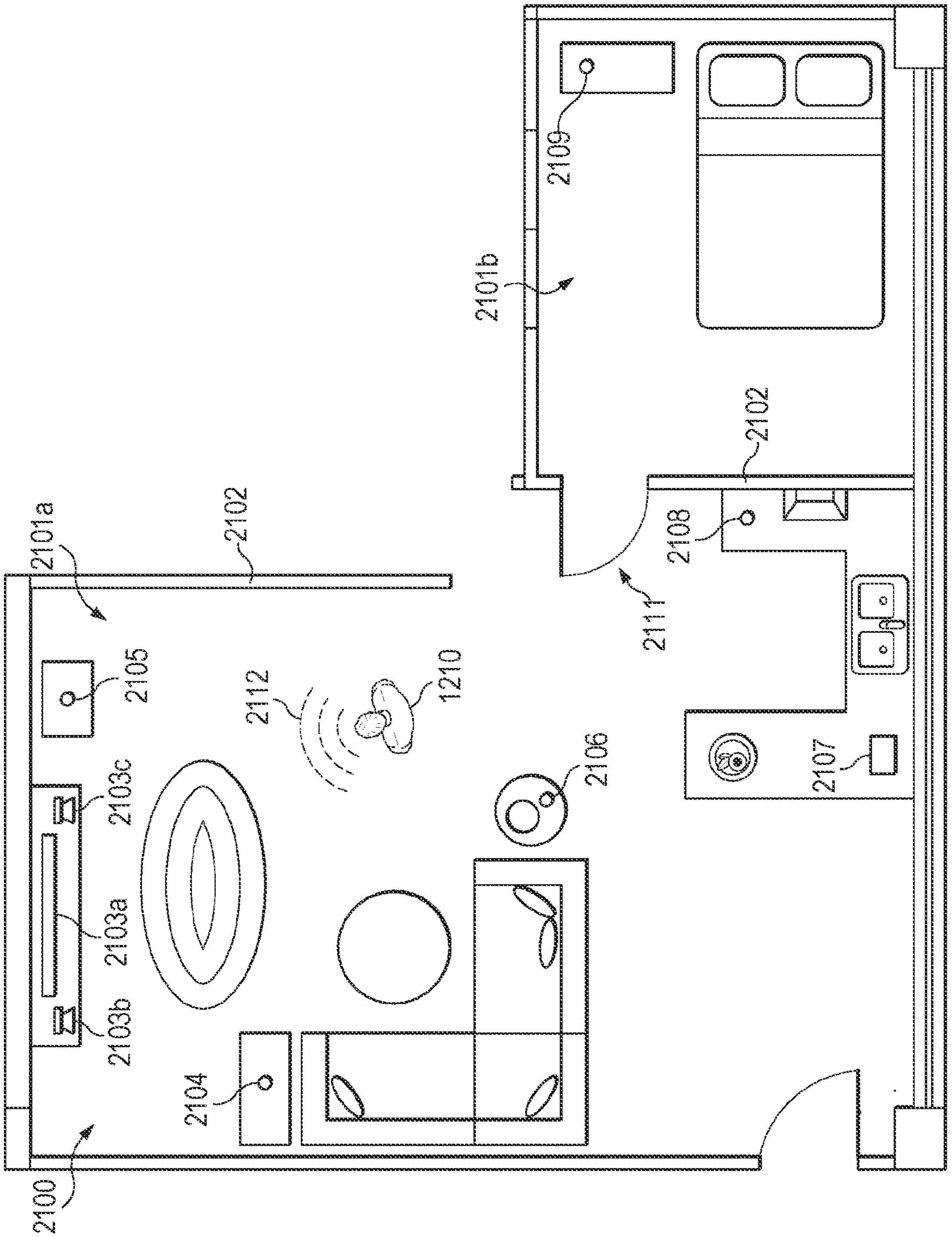
FIG. 21A shows an example of an audio environment.

FIG. 21A shows an example of an audio environment. As with other figures provided herein, the types and numbers of elements shown in FIG. 21A are merely provided by way of example. Other implementations may include more, fewer and/or different types and numbers of elements.

According to this example, the audio environment 2100 includes a main living space 2101*a* and a room 2101*b* that is adjacent to the main living space 2101*a*. Here, a wall 2102 and a door 2111 separates the main living space 2101*a* from the room 2101*b*. In this example, the amount of acoustic separation between the main living space 2101*a* and the room 2101*b* depends on whether the door 2111 is open or closed, and if open, the degree to which the door 211 is open.

At the time corresponding to FIG. 21A, a smart television (TV) 2103*a* is located within the audio environment 2100. According to this example, the smart TV 2103*a* includes a left loudspeaker 2103*b* and a right loudspeaker 2103*c*.

In this example, smart audio devices 2104, 2105, 2106, 2107, 2108 and 2109 are also located within the audio environment 2100 at the time corresponding to FIG. 21A. According to this example, each of the smart audio devices 2104-2109 includes at least one microphone and at least one loudspeaker. However, in this instance the smart audio devices 2104-2109 include loudspeakers of various sizes and having various capabilities.

According to this example, at least one acoustic event is occurring in the audio environment 2100. In this example, one acoustic event is caused by the talking person 1210, who is uttering a voice command 2112.

In this example, another acoustic event is caused, at least in part, by the variable element 2103. Here, the variable element 2103 is a door of the audio environment 2100. According to this example, as the door 2103 opens, sounds 2105 from outside the environment may be perceived more clearly inside the audio environment 2100. Moreover, the changing angle of the door 2103 changes some of the echo paths within the audio environment 2100. According to this example, element 2104 represents a variable element of the impulse response of the audio environment 2100 caused by varying positions of the door 2103.

Forced Gap Examples

As noted above, in some implementations one or more "gaps" (also referred to herein as "forced gaps" or "parameterized forced gaps") may be inserted in one or more frequency ranges of audio playback signals of a content stream to produce modified audio playback signals. The modified audio playback signals may be reproduced or "played back" in the audio environment. In some such implementations, N gaps may be inserted into N frequency ranges of the audio playback signals during N time intervals. According to some such implementations, M audio devices may orchestrate their gaps in time and frequency, thereby allowing an accurate detection of the far-field (respective to each device) in the gap frequencies and time intervals.

Figure 21B:
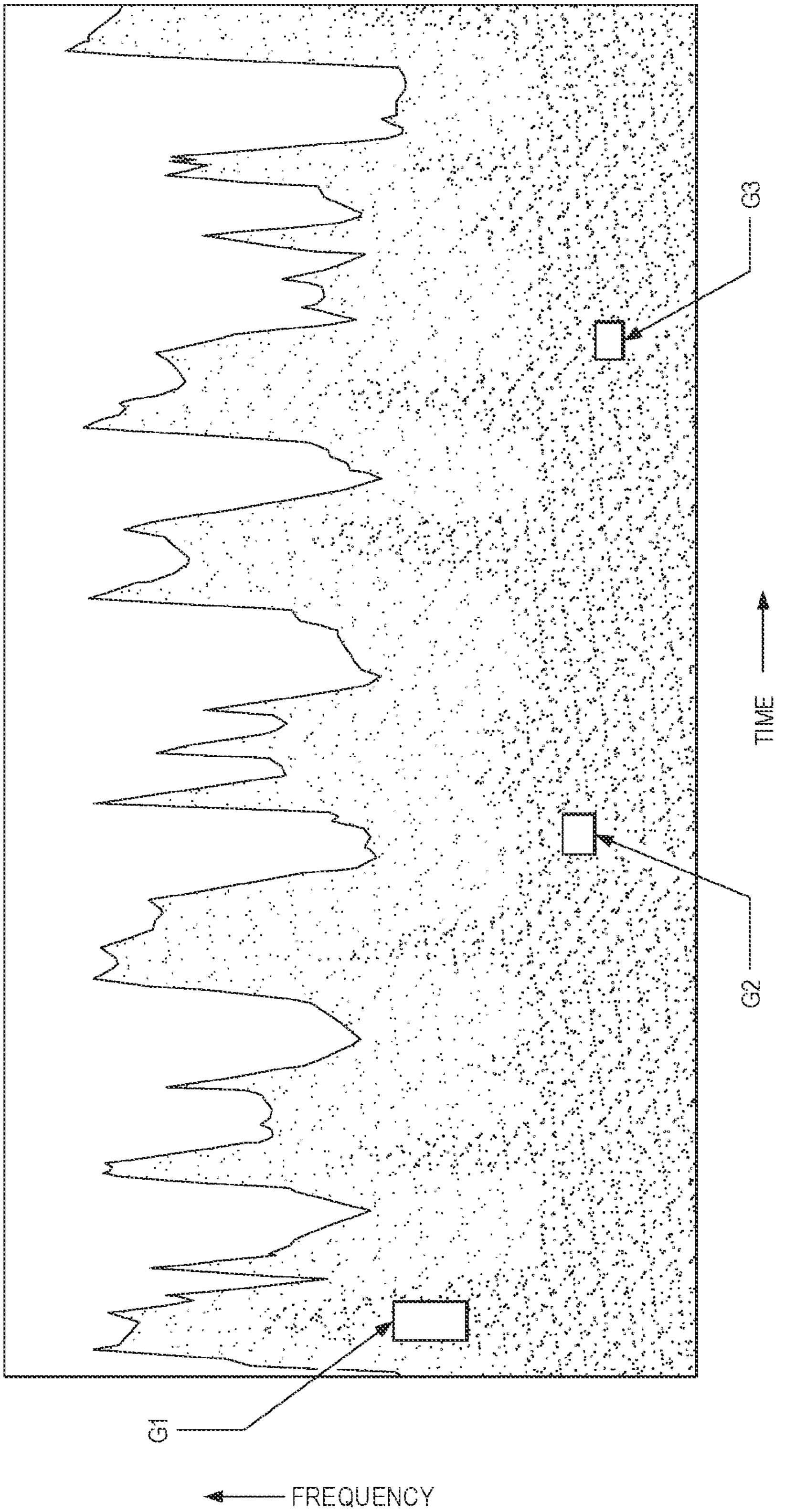
FIG. 21B is an example of a spectrogram of modified audio playback signal.

In some examples, a sequence of forced gaps is inserted in a playback signal, each forced gap in a different frequency band (or set of bands) of the playback signal, to allow a pervasive listener to monitor non-playback sound which occurs "in" each forced gap in the sense that it occurs during the time interval in which the gap occurs and in the frequency band(s) in which the gap is inserted. FIG. 21B is an example of a spectrogram of modified audio playback signal. In this example, the modified audio playback signal was created by inserting gaps into an audio playback signal according to one example. More specifically, to generate the spectrogram of FIG. 21B, a disclosed method was performed on an audio playback signal to introduce forced gaps (e.g., gaps G1, G2, and G3 shown in FIG. 21B) in frequency bands thereof, thereby generating the modified audio playback signal. In the spectrogram shown in FIG. 21B, position along the horizontal axis indicates time and position along the vertical axis indicates frequency of the content of the modified audio playback signal at an instant of time. The density of dots in each small region (each such region centered at a point having a vertical and horizontal coordinate in this example) indicates energy of the content of the modified audio playback signal at the corresponding frequency and instant of time: denser regions indicate content having greater energy and less dense regions indicate content having lower energy. Thus, the gap G1 occurs at a time (in other words, during a time interval) earlier than the time at which (in other words, during a time interval in which) gap G2 or G3 occurs, and gap G1 has been inserted in a higher frequency band than the frequency band in which gap G2 or G3 has been inserted.

Introduction of a forced gap into a playback signal in accordance some disclosed methods is distinct from simplex device operation in which a device pauses a playback stream of content (e.g., in order to better hear the user and the user's environment). Introduction of forced gaps into a playback signal in accordance with some disclosed methods may be optimized to significantly reduce (or eliminate) the perceptibility of artifacts resulting from the introduced gaps during playback, preferably so that the forced gaps have no or minimal perceptible impact for the user, but so that the output signal of a microphone in the playback environment is indicative of the forced gaps (e.g., so the gaps can be exploited to implement a pervasive listening method). By using forced gaps which have been introduced in accordance with some disclosed methods, a pervasive listening system may monitor non-playback sound (e.g., sound indicative of background activity and/or noise in the playback environment) even without the use of an acoustic echo canceller.

Figure 22A:
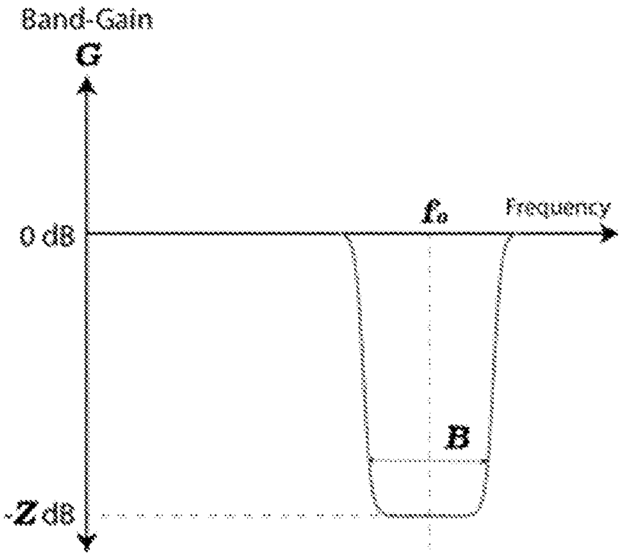
FIG. 22A is a graph that shows an example of a gap in the frequency domain.
Figure 22B:
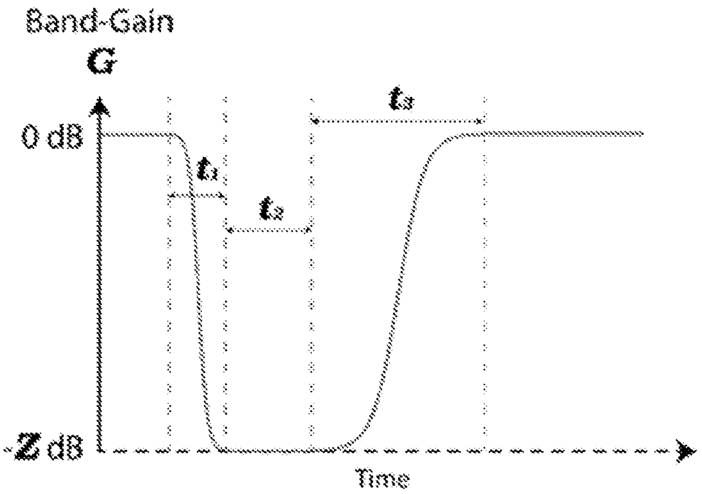
FIG. 22B is a graph that shows an example of a gap in the time domain.

With reference to FIGS. 22A and 22B, we next describe an example of a parameterized forced gap which may be inserted in a frequency band of an audio playback signal, and criteria for selection of the parameters of such a forced gap. FIG. 22A is a graph that shows an example of a gap in the frequency domain. FIG. 22B is a graph that shows an example of a gap in the time domain. In these examples, the parameterized forced gap is an attenuation of playback content using a band attenuation, G, whose profiles over both time and frequency resemble the profiles shown in FIGS. 22A and 22B. Here, the gap is forced by applying attenuation G to a playback signal over a range ("band") of frequencies defined by a center frequency $f_0$ (indicated in FIG. 22A) and bandwidth B (also indicated in FIG. 22A), with the attenuation varying as a function of time at each frequency in the frequency band (for example, in each frequency bin within the frequency band) with a profile resembling that shown in FIG. 22B. The maximum value of the attenuation G (as a function of frequency across the band) may be controlled to increase from 0 dB (at the lowest frequency of the band) to a maximum attenuation (suppression depth) Z at the center frequency $f_0$ (as indicated in FIG. 22A), and to decrease (with increasing frequency above the center frequency) to 0 dB (at the highest frequency of the band).

In this example, the graph of FIG. 22A indicates a profile of the band attenuation G, as a function of frequency (i.e., frequency bin), applied to frequency components of an audio signal to force a gap in audio content of the signal in the band. The audio signal may be a playback signal (e.g., a channel of a multi-channel playback signal), and the audio content may be playback content.

According to this example, the graph of FIG. 22B shows a profile of the band attenuation G, as a function of time, applied to the frequency component at center frequency $f_0$, to force the gap indicated in FIG. 22A in audio content of the signal in the band. For each other frequency component in the band, the band gain as a function of time may have a similar profile to that shown in FIG. 22B, but the suppression depth Z of FIG. 22B may be replaced by an interpolated suppression depth kZ, where k is a factor which ranges from 0 to 1 (as a function of frequency) in this example, so that kZ has the profile shown in FIG. 22A. In some examples, for each frequency component, the attenuation G may also be interpolated (e.g., as a function of time) from 0 dB to the suppression depth kZ (e.g., with k=1, as indicated in FIG. 22B, at the center frequency), e.g., to reduce musical artifacts resulting from introduction of the gap. Three regions (time intervals), t1, t2, and t3, of this latter interpolation are shown in FIG. 22B.

Thus, when a gap forcing operation occurs for a particular frequency band (e.g., the band centered at center frequency, $f_0$, shown in FIG. 22A), in this example the attenuation G applied to each frequency component in the band (e.g., to each bin within the band) follows a trajectory as shown in FIG. 22B. Starting at 0 dB, it drops to a depth −kZ dB in t1 seconds, remains there for t2 seconds, and finally rises back to 0 dB in t3 seconds. In some implementations, the total time t1+t2+t3 may be selected with consideration of the time-resolution of whatever frequency transform is being used to analyze the microphone feed, as well as a reasonable duration of time that is not too intrusive for the user. Some examples of t1, t2 and t3 for single-device implementations are shown in Table 2, below.

Some disclosed methods involve inserting forced gaps in accordance with a predetermined, fixed banding structure that covers the full frequency spectrum of the audio playback signal, and includes $B_{count}$ bands (where $B_{count}$ is a number, e.g., $B_{count}$=49). To force a gap in any of the bands, a band attenuation is applied in the band in such examples. Specifically, for the jth band, an attenuation, Gj, may be applied over the frequency region defined by the band.

Table 2, below, shows example values for parameters t1, t2, t3, the depth Z, for each band, and an example of the number of bands, $B_{count}$, for single-device implementations.

TABLE 2

| Parameter | Default | Minimum | Maximum | Units | Purpose |
|---|---|---|---|---|---|
| $B_{count}$ | 49 | 20 | 128 | — | Number of discrete groupings of frequency bins, referred to as "bands" |
| Z | −12 | −12 | −18 | dB | Maximum attenuation applied in the forced gap in a band. |
| t1 | 8 | 5 | 15 | Milliseconds | Time to ramp gain down to −Z dB at the center frequency of a band once a forced gap is triggered. |
| t2 | 80 | 40 | 120 | Milliseconds | Time to apply attenuation −Z dB after t1 seconds. |
| t3 | 8 | 5 | 15 | Milliseconds | Time to ramp gain up to 0 dB after t1 + t2 elapses. |

In determining the number of bands and the width of each band, a trade-off exists between perceptual impact and usefulness of the gaps: narrower bands with gaps are better in that they typically have less perceptual impact, whereas wider bands with gaps are better for implementing noise estimation (and other pervasive listening methods) and reducing the time ("convergence" time) required to converge to a new noise estimate (or other value monitored by pervasive listening), in all frequency bands of a full frequency spectrum, e.g., in response to a change in background noise or playback environment status). If only a limited number of gaps can be forced at once, it will take a longer time to force gaps sequentially in a large number of small bands than to force gaps sequentially in a smaller number of larger bands, resulting in a relatively longer convergence time. Larger bands (with gaps) provide a lot of information about the background noise (or other value monitored by pervasive listening) at once, but generally have a larger perceptual impact.

In early work by the present inventors, gaps were posed in a single-device context, where the echo impact is mainly (or entirely) nearfield. Nearfield echo is largely impacted by the direct path of audio from the speakers to the microphones. This property is true of almost all compact duplex audio devices, (such as smart audio devices) with the exceptions being devices with larger enclosures and significant acoustic decoupling. By introducing short, perceptually masked gaps in the playback, such as those shown in Table 2, an audio device may obtain glimpses of the acoustic space in which the audio device is deployed through the audio device's own echo.

However, when other audio devices are also playing content in the same audio environment, the present inventors have discovered that the gaps of a single audio device become less useful due to far-field echo corruption. Far-field echo corruption frequently lowers the performance of the local echo cancellation, significantly worsening the overall system performance. Far-field echo corruption is difficult to remove for various reasons. One reason is that obtaining a reference signal may require increased network bandwidth and added complexity for additional delay estimation. Moreover, estimating the far-field impulse response is more difficult as noise conditions are increased and the response is longer (more reverberant and spread out in time). In addition, far-field echo corruption is usually correlated with the near-field echo and other far-field echo sources, further challenging the far-field impulse response estimation.

The present inventors have discovered that if multiple audio devices in an audio environment orchestrate their gaps in time and frequency, a clearer perception of the far-field (relative to each audio device) may be obtained when the multiple audio devices reproduce the modified audio playback signals. The present inventors have also discovered that if a target audio device plays back unmodified audio playback signals when the multiple audio devices reproduce the modified audio playback signals, the relative audibility and position of the target device can be estimated from the perspective of each of the multiple audio devices, even whilst media content is being played.

Moreover, and perhaps counter-intuitively, the present inventors have discovered that breaking the guidelines that were formerly used for single-device implementations (e.g., keeping the gaps open for a longer period of time than indicated in Table 2) leads to implementations suitable for multiple devices making co-operative measurements via orchestrated gaps.

For example, in some orchestrated gap implementations, t2 may be longer than indicated in Table 2, in order to accommodate the various acoustic path lengths (acoustic delays) between multiple distributed devices in an audio environment, which may be on the order of meters (as opposed to a fixed microphone-speaker acoustic path length on a single device, which may be tens of centimeters apart at most). In some examples, the default t2 value may be, e.g., 25 milliseconds greater than the 80 millisecond value indicated in Table 2, in order to allow for up to 8 meters of separation between orchestrated audio devices. In some orchestrated gap implementations, the default t2 value may be longer than the 80 millisecond value indicated in Table 2 for another reason: in orchestrated gap implementations, t2 is preferably longer in order to accommodate timing misalignment of the orchestrated audio devices, in order to ensure that an adequate amount of time passes during which all orchestrated audio devices have reached the value of Z attenuation. In some examples, an additional 5 milliseconds may be added to the default value of t2 to accommodate timing mis-alignment. Therefore, in some orchestrated gap implementations, the default value of t2 may be 110 milliseconds, with a minimum value of 70 milliseconds and a maximum value of 150 milliseconds.

In some orchestrated gap implementations, t1 and/or t3 also may be different from the values indicated in Table 2. In some examples, t1 and/or t3 may be adjusted as a result of a listener not being able to perceive the different times that the devices go into or come out of their attenuation period due to timing issues and physical distance discrepancies. At least in part because of spatial masking (resulting from multiple devices playing back audio from different locations), the ability of a listener to perceive the different times at which orchestrated audio devices go into or come out of their attenuation period would tend to be less than in a single-device scenario. Therefore, in some orchestrated gap implementations the minimum values of t1 and t3 may be reduced and the maximum values of t1 and t3 may be increased, as compared to the single-device examples shown in Table 2. According to some such examples, the minimum values of t1 and t3 may be reduced to 2, 3 or 4 milliseconds and the maximum values of t1 and t3 may be increased to 20, 25 or 30 milliseconds.

Examples of Measurements Using Orchestrated Gaps

Figure 22C:
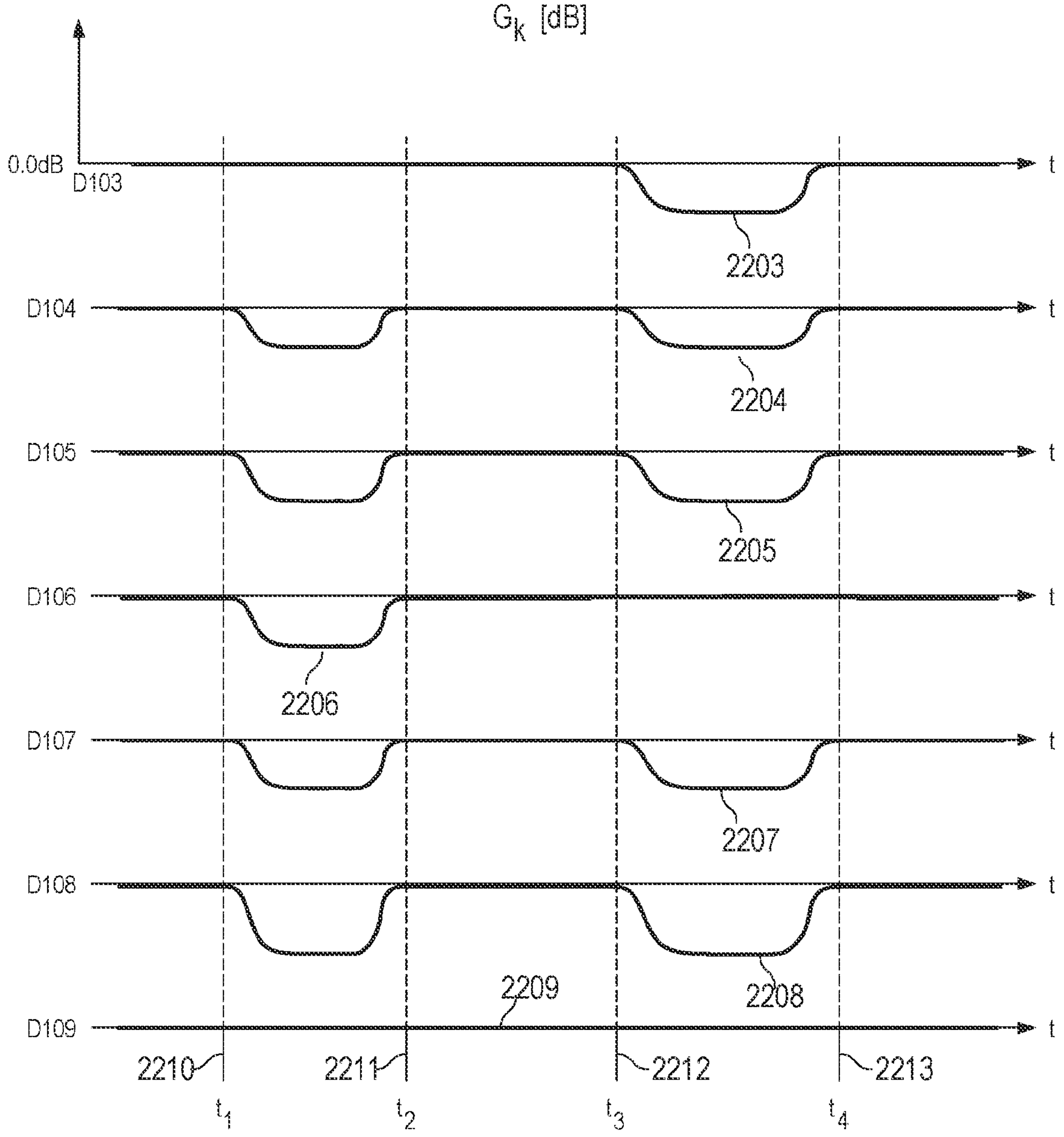
FIG. 22C shows an example of modified audio playback signals including orchestrated gaps for multiple audio devices of an audio environment.

FIG. 22C shows an example of modified audio playback signals including orchestrated gaps for multiple audio devices of an audio environment. In this implementation, multiple smart devices of an audio environment orchestrate gaps in order to estimate the relative audibility of one another. In this example, one measurement session corresponding to one gap is made during a time interval, and the measurement session includes only the devices in the main living space 2100*a* of FIG. 21A. According to this example, previous audibility data has shown that smart audio device 2109, which is located in the room 2101*b*, has already been classified as barely audible to the other audio devices and has been placed in a separate zone.

In the examples shown in FIG. 22C, the orchestrated gaps are attenuations of playback content using a band attenuation $G_k$, wherein k represents a center frequency of a frequency band being measured. The elements shown in FIG. 22C are as follows:

Graph 2203 is a plot of $G_k$ in dB for smart audio device 2103 of FIG. 21A;

Graph 2204 is a plot of $G_k$ in dB for smart audio device 2104 in FIG. 21A;

Graph 2205 is a plot of $G_k$ in dB for smart audio device 2105 in FIG. 21A;

Graph 2206 is a plot of $G_k$ in dB for smart audio device 2106 in FIG. 21A;

Graph 2207 is a plot of $G_k$ in dB for smart audio device 2107 in FIG. 21A;

Graph 2208 is a plot of $G_k$ in dB for smart audio device 2108 in FIG. 21A; and Graph 2209 is a plot of $G_k$ in dB for smart audio device 2109 in FIG. 21A.

As used herein, the term "session" (also referred to herein as a "measurement session") refers to a time period during which measurements of a frequency range are performed. During a measurement session, a set of frequencies with associated bandwidths, as well as a set of participating audio devices, may be specified.

One audio device may optionally be nominated as a "target" audio device for a measurement session. If a target audio device is involved in the measurement session, according to some examples the target audio device will be permitted to ignore the forced gaps and will play unmodified audio playback signals during the measurement session. According to some such examples, the other participating audio devices will listen to the target device playback sound, including the target device playback sound in the frequency range being measured.

As used herein, the term "audibility" refers to the degree to which a device can hear another device's speaker output. Some examples of audibility are provided below.

According to the example shown in FIG. 22C, at time t1, an orchestrating device initiates a measurement session with smart audio device 2103 being the target audio device, selecting one or more bin center frequencies to be measured, including a frequency k. The orchestrating device may, in some examples, be a smart audio device acting as the leader (e.g., determined as described below with reference to FIG. 4) In other examples, the orchestrating device may be another orchestrating device, such as a smart home hub. This measurement session runs from time t1 until time t2. The other participating smart audio devices, smart audio devices 2104-2108, will apply a gap in their output and will reproduce modified audio playback signals, whilst the smart audio device 2103 will play unmodified audio playback signals.

The subset of smart audio devices of the audio environment 2100 that are reproducing modified audio playback signals including orchestrated gaps (smart audio devices 2104-2108) is one example of what may be referred to as M audio devices. According to this example, the smart audio device 2109 will also play unmodified audio playback signals. Therefore, the smart audio device 2109 is not one of the M audio devices. However, because the smart audio device 2109 is not audible to the other the smart audio devices of the audio environment, the smart audio device 2109 is not a target audio device in this example, despite the fact that the smart audio device 2109 and the target audio device (the smart audio device 2103 in this example) will both play back unmodified audio playback signals.

It is desirable that the orchestrated gaps should have a low perceptual impact (e.g., a negligible perceptual impact) to listeners in the audio environment during the measurement session. Therefore, in some examples gap parameters may be selected to minimize perceptual impact. Some examples are described below with reference to FIGS. 23B-3J.

During this time (the measurement session from time t1 until time t2), the smart audio devices 2104-2108 will receive reference audio bins from the target audio device (the smart audio device 2103) for the time-frequency data for this measurement session. In this example, the reference audio bins correspond to playback signals that the smart audio device 2103 uses as a local reference for echo cancellation. The smart audio device 2103 has access to these reference audio bins for the purposes of audibility measurement as well as echo cancellation.

According to this example, at time t2 the first measurement session ends and the orchestrating device initiates a new measurement session, this time choosing one or more bin center frequencies that do not include frequency k. In the example shown in FIG. 22C, no gaps are applied for frequency k during the period t2 to t3, so the graphs show unity gain for all devices. In some such examples, the orchestrating device may cause a series of gaps to be inserted into each of a plurality of frequency ranges for a sequence of measurement sessions for bin center frequencies that do not include frequency k. For example, the orchestrating device may cause second through $N^{th}$ gaps to be inserted into second through $N^{th}$ frequency ranges of the audio playback signals during second through $N^{th}$ time intervals, for the purpose of second through $N^{th}$ subsequent measurement sessions while the smart audio device 2103 remains the target audio device.

In some such examples, the orchestrating device may then select another target audio device, e.g., the smart audio device 2104. The orchestrating device may instruct the smart audio device 2103 to be one of the M smart audio devices that are playing back modified audio playback signals with orchestrated gaps. The orchestrating device may instruct the new target audio device to reproduce unmodified audio playback signals. According to some such examples, after the orchestrating device has caused N measurement sessions to take place for the new target audio device, the orchestrating device may select another target audio device. In some such examples, the orchestrating device may continue to cause measurement sessions to take place until measurement sessions have been performed for each of the participating audio devices in an audio environment.

In the example shown in FIG. 22C, a different type of measurement session takes place between times t3 and t4. According to this example, at time t3, in response to user input (e.g., a voice command to a smart audio device that is acting as the orchestrating device), the orchestrating device initiates a new session in order to fully calibrate the loudspeaker setup of the audio environment 2100. In general, a user may be relatively more tolerant of orchestrated gaps that have a relatively higher perceptual impact during a "set-up" or "recalibration" measurement session such as takes place between times t3 and t4. Therefore, in this example a large contiguous set of frequencies are selected for measurement, including k. According to this example, the smart audio device 2106 is selected as the first target audio device during this measurement session. Accordingly, during the first phase of the measurement session from time t3 to t4, all of the smart audio devices aside from the smart audio device 2106 will apply gaps.

Gap Bandwidth

Figure 23A:
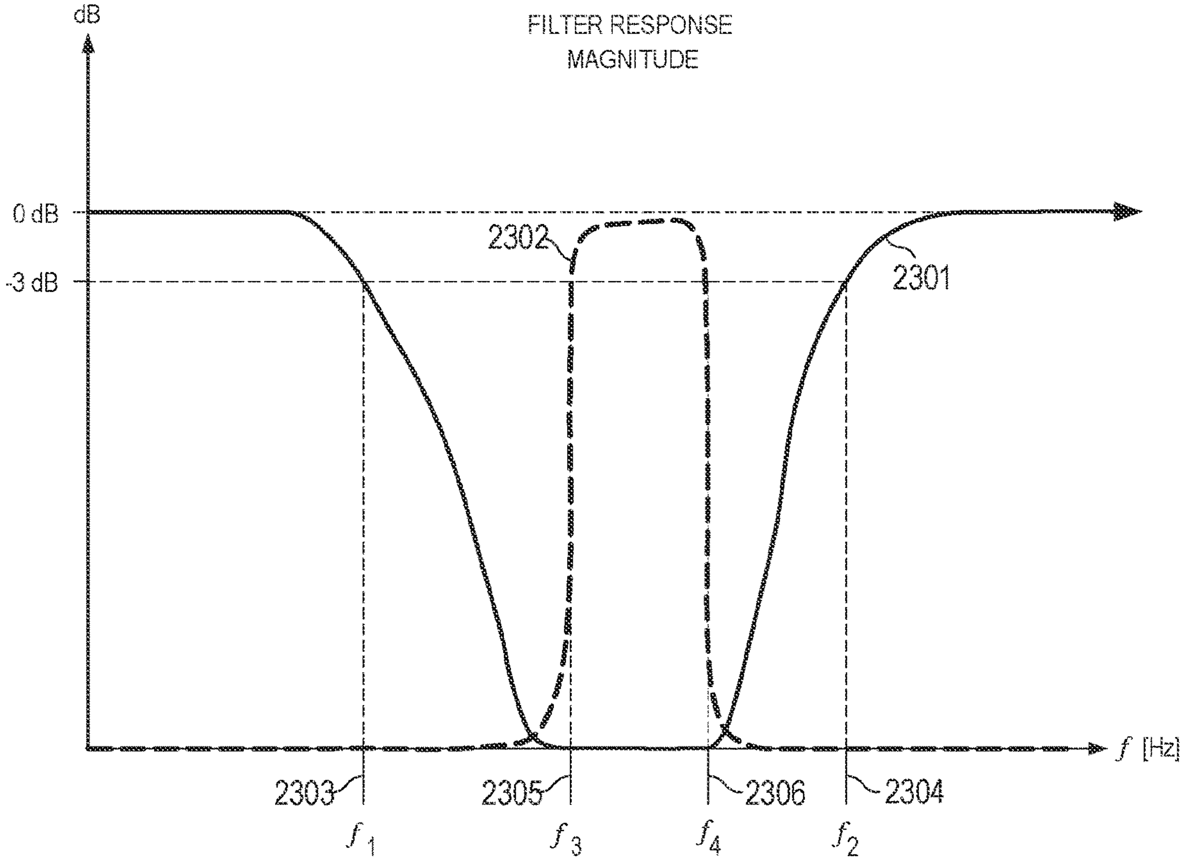
FIG. 23A is a graph that shows examples of a filter response used for creating a gap and a filter response used to measure a frequency region of a microphone signal used during a measurement session.

FIG. 23A is a graph that shows examples of a filter response used for creating a gap and a filter response used to measure a frequency region of a microphone signal used during a measurement session. According to this example, the elements of FIG. 23A are as follows:

- Element 2301 represents the magnitude response of the filter used to create the gap in the output signal;
- Element 2302 represents the magnitude response of the filter used to measure the frequency region corresponding to the gap caused by element 2301;
- Elements 2303 and 2304 represent the −3 dB points of 2301, at frequencies f1 and f2; and
- Elements 2305 and 2306 represent the −3 dB points of 2302, at frequencies f3 and f4.

The bandwidth of the gap response 2301 (BW_gap) may be found by taking the difference between the −3 dB points 2303 and 2304: BW_gap=f2−f1 and BW_measure (the bandwidth of the measurement response 2302)=f4−f3.

According to one example, the quality of the measurement may be expressed as follows:

$$\text{quality} = \frac{BW_{gap}}{BW_{measure}} = \frac{f_2 - f_1}{f_4 - f_3}$$

Because the bandwidth of the measurement response is usually fixed, one can adjust the quality of the measurement by increasing the bandwidth of the gap filter response (e.g., widen the bandwidth). However, the bandwidth of the introduced gap is proportional to its perceptibility. Therefore, the bandwidth of the gap filter response should generally be determined in view of both the quality of the measurement and the perceptibility of the gap. Some examples of quality values are shown in Table 3:

TABLE 3

| Parameter | Default | Minimum | Maximum | Units | Purpose |
|---|---|---|---|---|---|
| quality | 2 | 1.5 | 3 | — | Measures the confidence measurements made through forced gaps |

Although Table 3 indicates "minimum" and "maximum" values, those values are only for this example. Other implementations may involve lower quality values than 1.5 and/or higher quality values than 3.

Gap Allocation Strategies

Gaps may be defined by the following:

- An underlying division of the frequency spectrum, with center frequencies and measurement bandwidths;
- An aggregation of these smallest measurement bandwidths in a structure referred to as "banding";
- A duration in time, attenuation depth, and the inclusion of one or more contiguous frequencies that conform to the agreed upon division of the frequency spectrum; and Other temporal behavior such as ramping the attenuation depth at the beginning and end of a gap.

According to some implementations, gaps may be selected according to a strategy that will aim to measure and observe as much of the audible spectrum in as short as time as possible, whilst meeting the applicable perceptibility constraints.

FIGS. 23B, 23C, 23D, 23E, 23F, 23G, 23H, 23I and 23J are graphs that show examples of gap allocation strategies. In these examples, time is represented by distance along the horizontal axis and frequency is represented by distance along the vertical axis. These graphs provide examples to illustrate the patterns produced by various gap allocation strategies, and how long they take to measure the complete audio spectrum. In these examples, each orchestrated gap measurement session is 10 seconds in length. As with other disclosed implementations, these graphs are merely provided by way of example. Other implementations may include more, fewer and/or different types, numbers and/or sequences of elements. For example, in other implementations each orchestrated gap measurement session may be longer or shorter than 10 seconds. In these examples, unshaded regions 2310 of the time/frequency space represented in FIGS. 23B-23J (which may be referred to herein as "tiles") represent a gap at the indicated time-frequency period (of 10 seconds). Moderately-shaded regions 2315 represent frequency tiles that have been measured at least once. Lightly-shaded regions 2320 have yet to be measured.

Assuming the task at hand requires that the participating audio devices insert orchestrated gaps for "listening through to the room" (e.g., to evaluate the noise, echo, etc., in the audio environment), then the measurement session completion times will be as they are indicated in FIGS. 23B-23J. If the task requires that each audio device is made the target in turn, and listened to by the other audio devices, then the times need to be multiplied by the number of audio devices participating in the process. For example, if each audio device is made the target in turn, the three minutes and twenty seconds (3 m20 s) shown as the measurement session completion time in FIG. 23B would mean that a system of 7 audio devices would be completely mapped after 7*3 m20 s=23 m20 s. When cycling through frequencies/bands, and multiple gaps are forced at once, in these examples the gaps will be spaced as far apart in frequency as possible for efficiency when covering the spectrum.

Figure 23B:
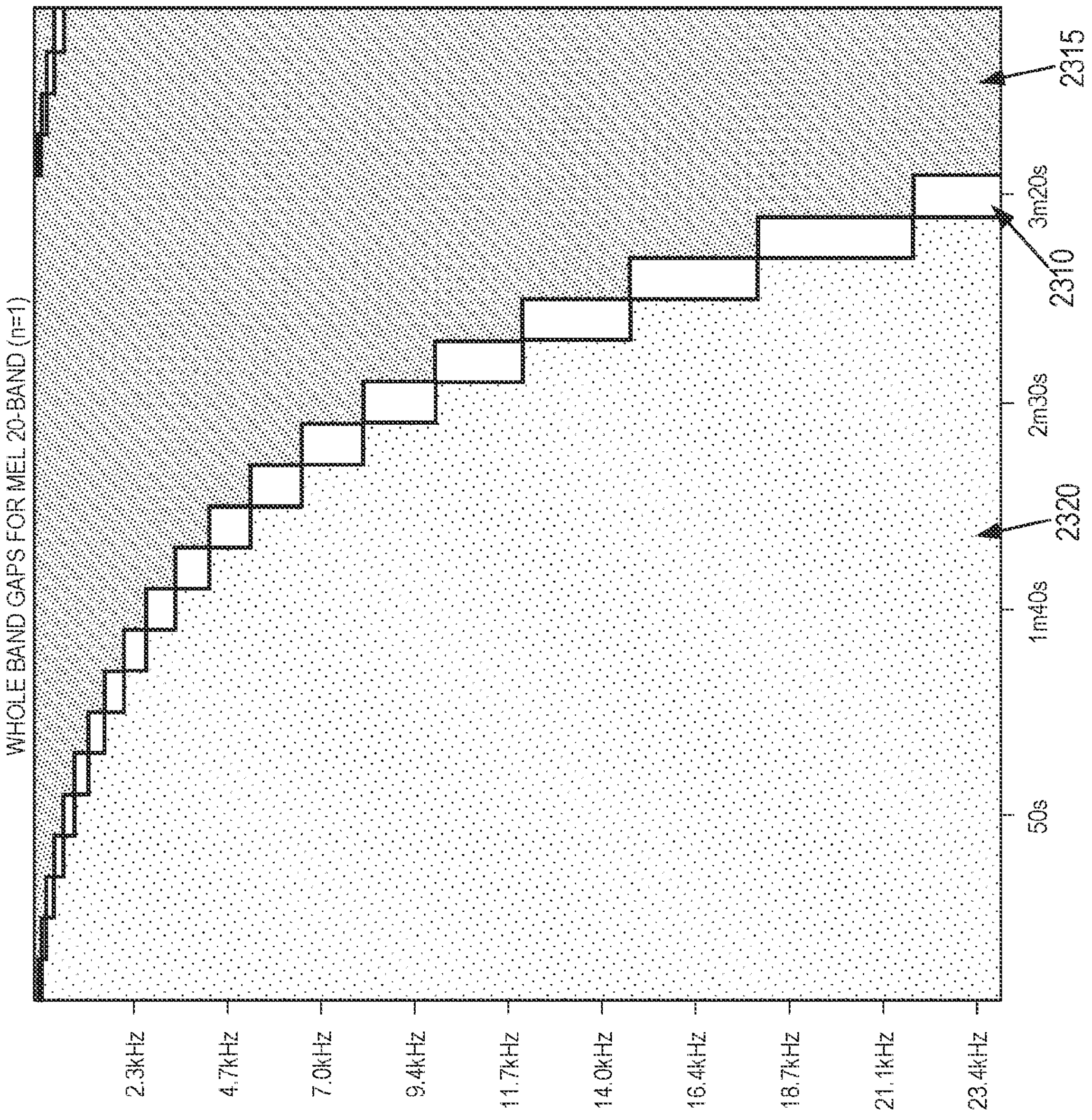
FIGS. 23B, 23C, 23D, 23E, 23F, 23G, 23H, 23I and 23J are graphs that show examples of gap allocation strategies.
Figure 23C:
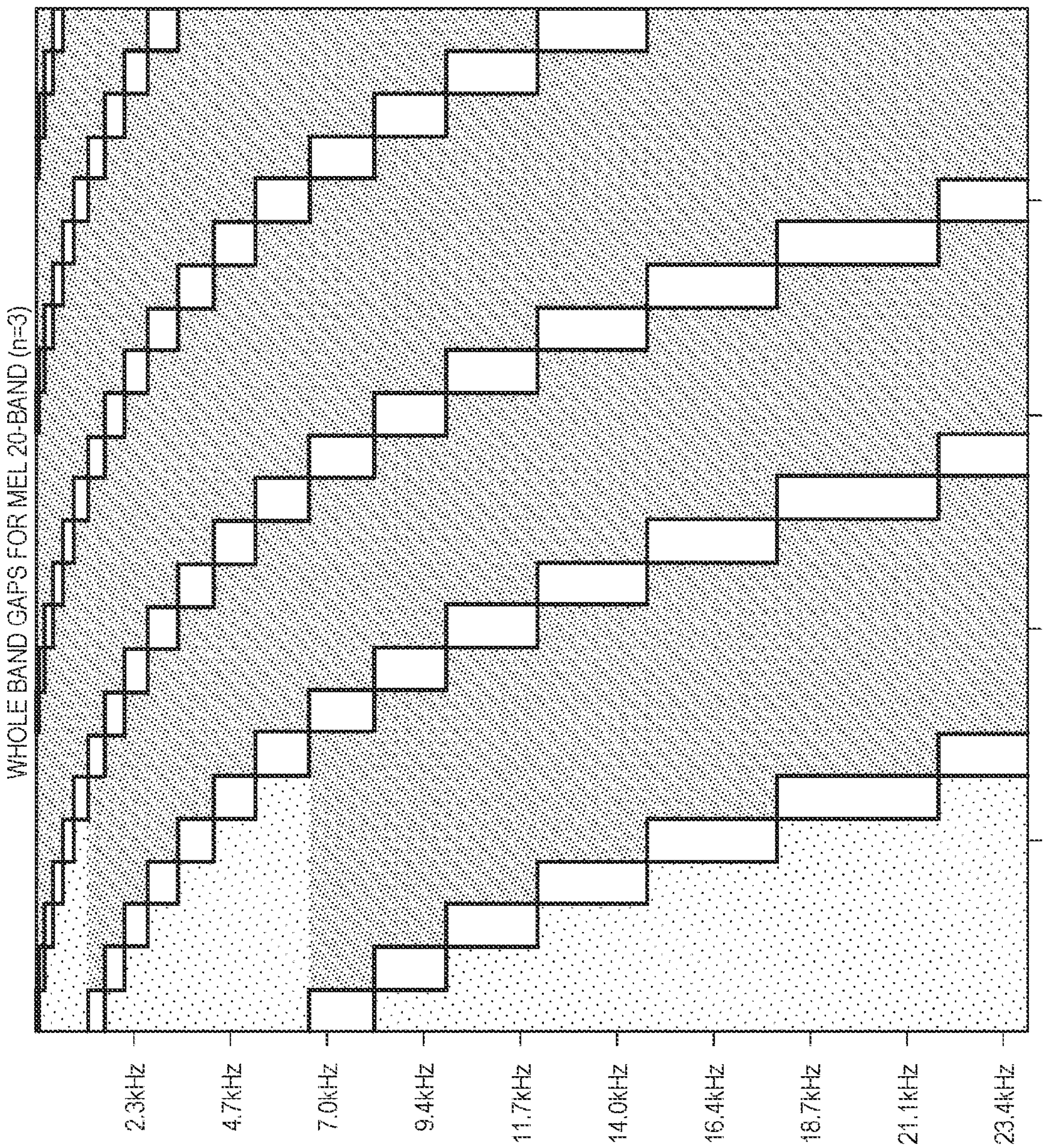

FIGS. 23B and 23C are graphs that show examples of sequences of orchestrated gaps according to one gap allocation strategy. In these examples, the gap allocation strategy involves gapping N entire frequency bands (each of the frequency bands including at least one frequency bin, and in most cases a plurality of frequency bins) at a time during each successive measurement session. In FIG. 23B N=1 and in FIG. 23C N=3, the latter of which means that example of FIG. 23C involves inserting three gaps during the same time interval. In these examples, the banding structure used is a 20-band Mel spaced arrangement. According to some such examples, after all 20 frequency bands have been measured, the sequence may restart. Although 3 m20 s is a reasonable time to reach a full measurement, the gaps being punched in the critical audio region of 300 Hz-8 kHz are very wide, and much time is devoted to measuring outside this region. Because of the relatively wide gaps in the frequency range of 300 Hz-8 kHz, this particular strategy will be very perceptible to users.

Figure 23D:
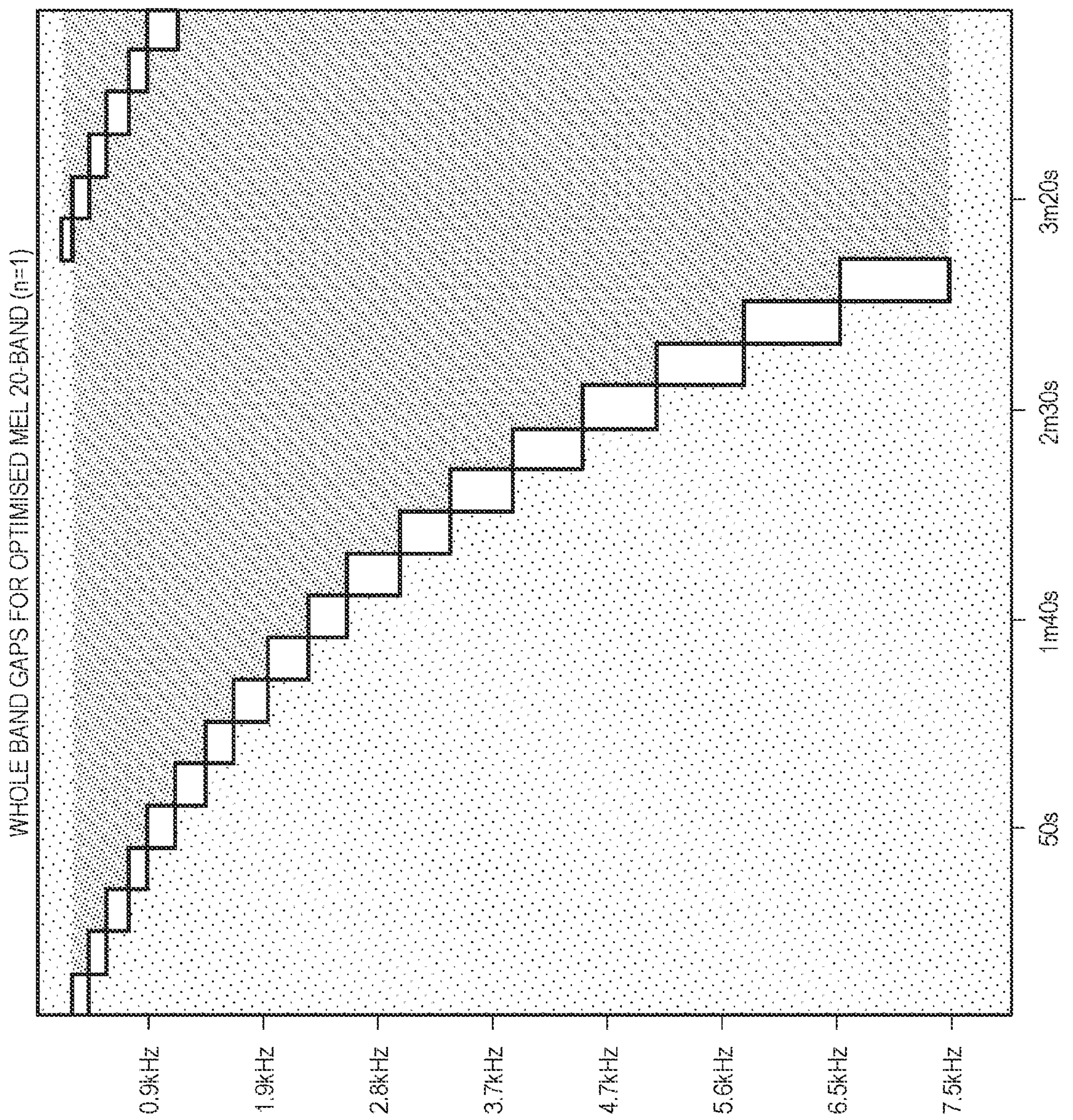
Figure 23E:
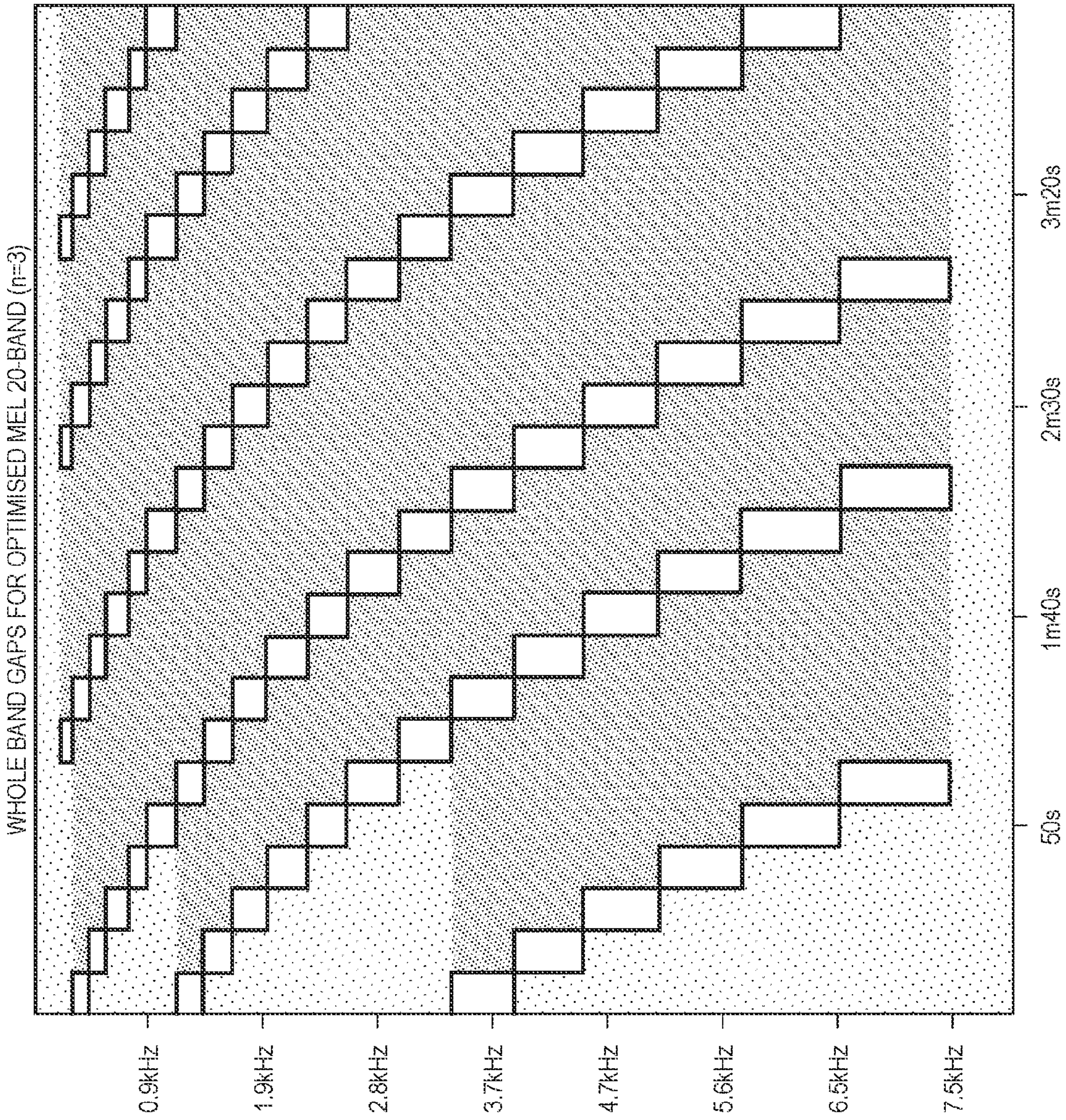

FIGS. 23D and 23E are graphs that show examples of sequences of orchestrated gaps according to another gap allocation strategy. In these examples, the gap allocation strategy involves modifying the banding structure shown in FIGS. 23B and 23C to map to the "optimized" frequency region of approximately 300 Hz to 8 kHz. The overall allocation strategy is otherwise unchanged from that represented by FIGS. 23B and 23C, though the sequence finishes slightly earlier as the 20th band is now ignored. The bandwidths of the gaps being forced here will still be perceptible. However, the benefit is a very rapid measurement of the optimized frequency region, especially if gaps are forced into multiple frequency bands at once.

Figure 23F:
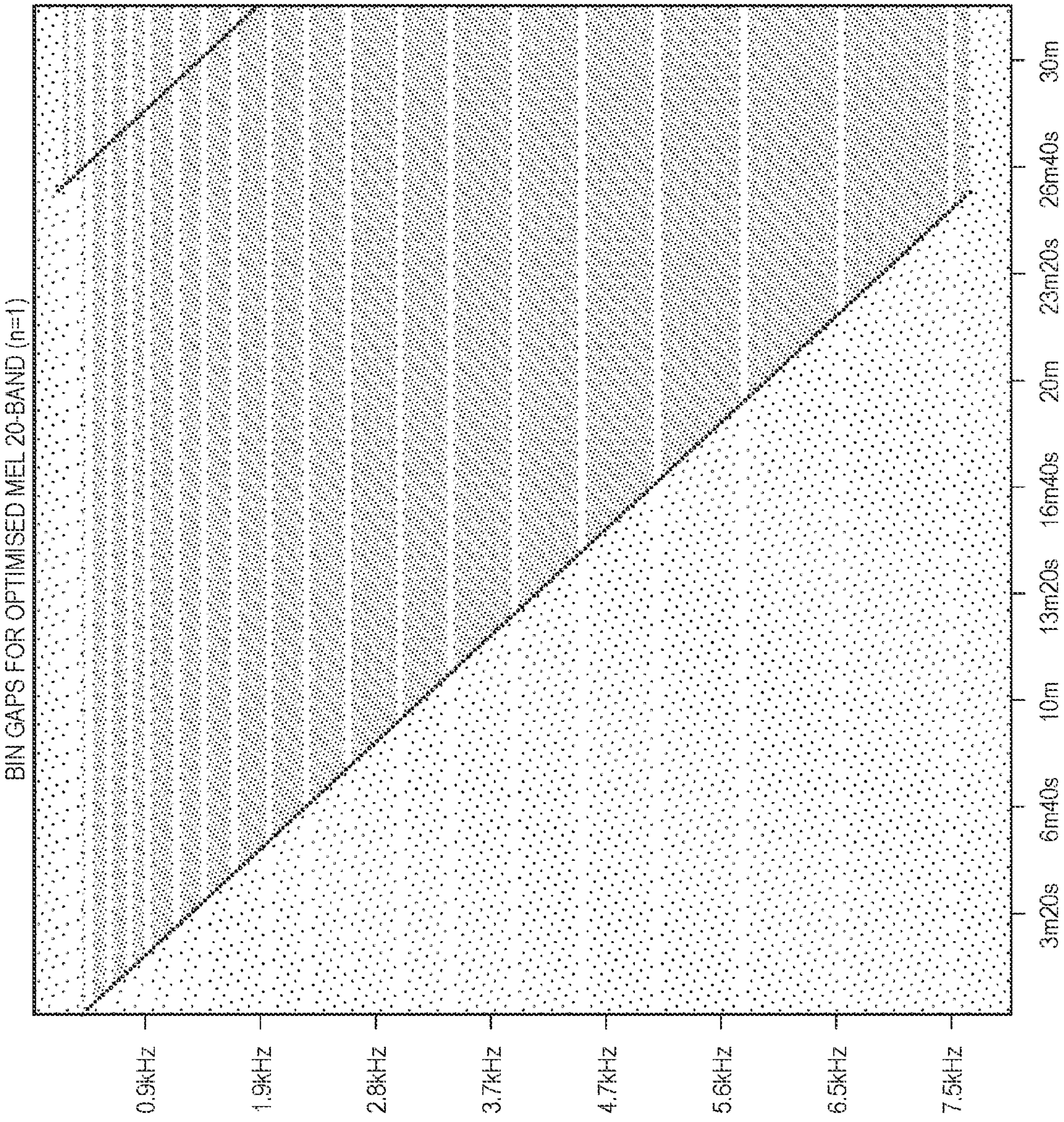
Figure 23G:
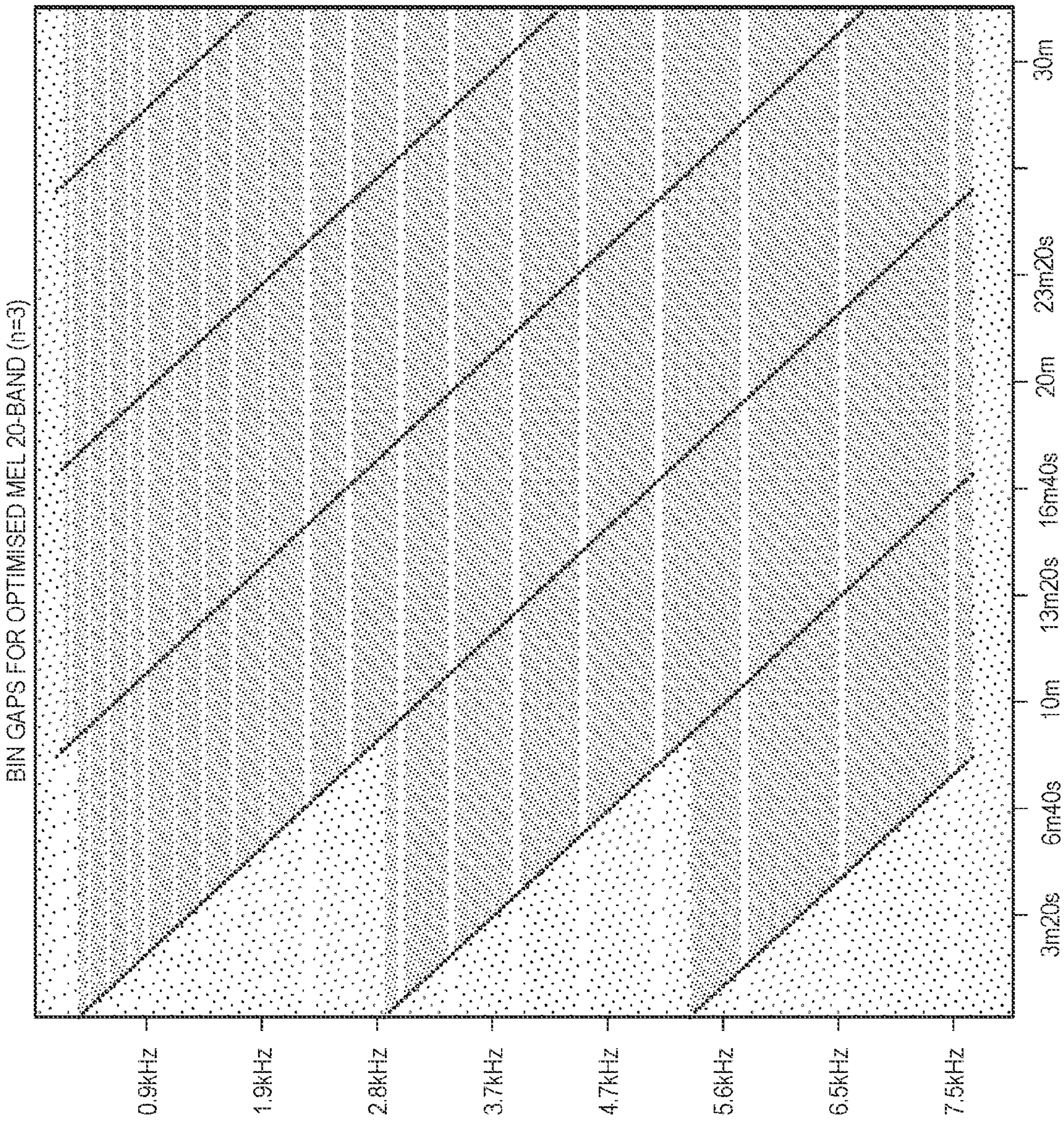
Figure 23H:
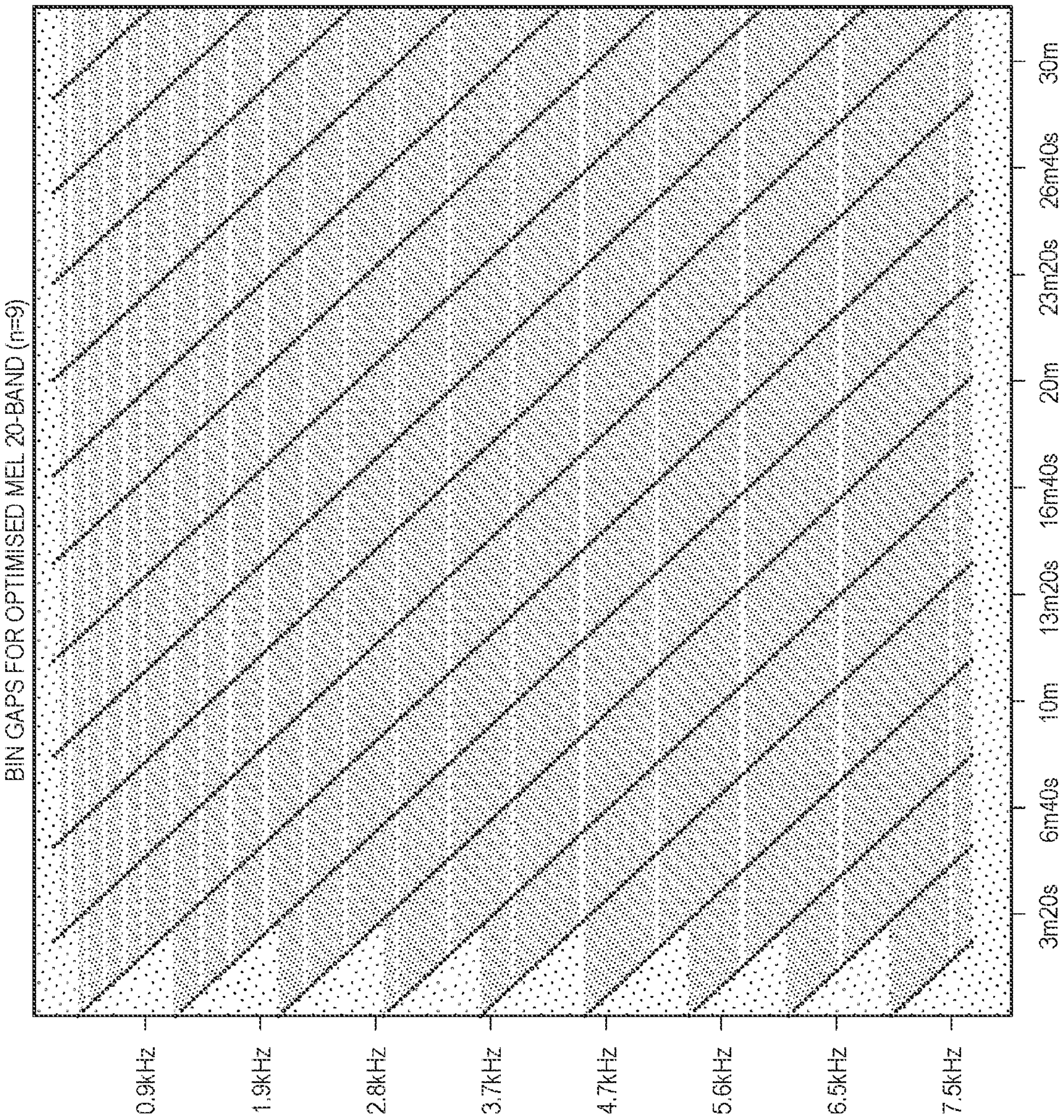

FIGS. 23F, 23G and 23H are graphs that show examples of sequences of orchestrated gaps according to another gap allocation strategy. In these examples, the gap allocation strategy involves a "force bin gaps" approach, wherein gaps are forced into single frequency bins instead of over entire frequency bands. The horizontal lines in FIGS. 23F, 23G and 23H delineate the banding structure shown in FIGS. 23D and 23E. Changing from a gap allocation strategy involving 19 bands to a gap allocation strategy involving 170 bins significantly increases the time taken to measure the optimized spectrum, with a single measurement session now taking over 25 minutes to complete in the example shown in FIG. 23F in which N=1.

The major advantage of the gap allocation strategy represented by FIGS. 23F, 23G and 23H is the significantly lowered perceptibility of the process. Choosing N=3 (as shown in FIG. 23G) or N=5 will decrease the measurement session time of the FIG. 23F example by 1/N as shown in the plots of FIGS. 23F and 23G, and the perceptibility is still manageable.

However, there are still two significant drawbacks to the gap allocation strategy represented by FIGS. 23F, 23G and 23H. One is that the logarithmic nature of the banding structure has been ignored: the bandwidth of gaps at higher frequencies are too conservative based on what is true of human perception. The other drawback is that sequentially stepping through frequencies will completely measure each band before moving onto the next band. Through the imputation of missing data, and the averaging through the banding process, algorithms can still function with some confidence even if a band has not been fully measured.

Figure 23I:
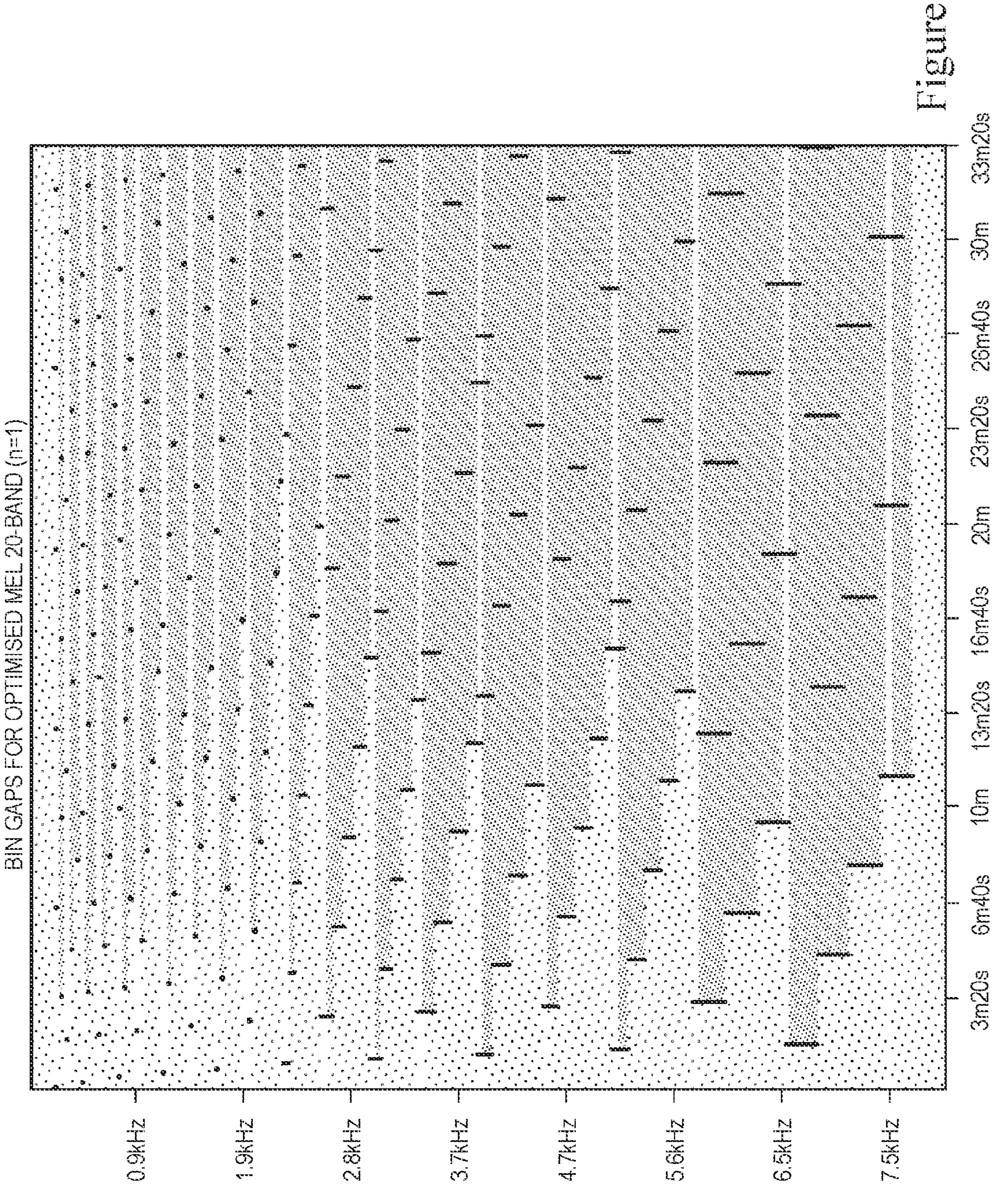
Figure 23J:
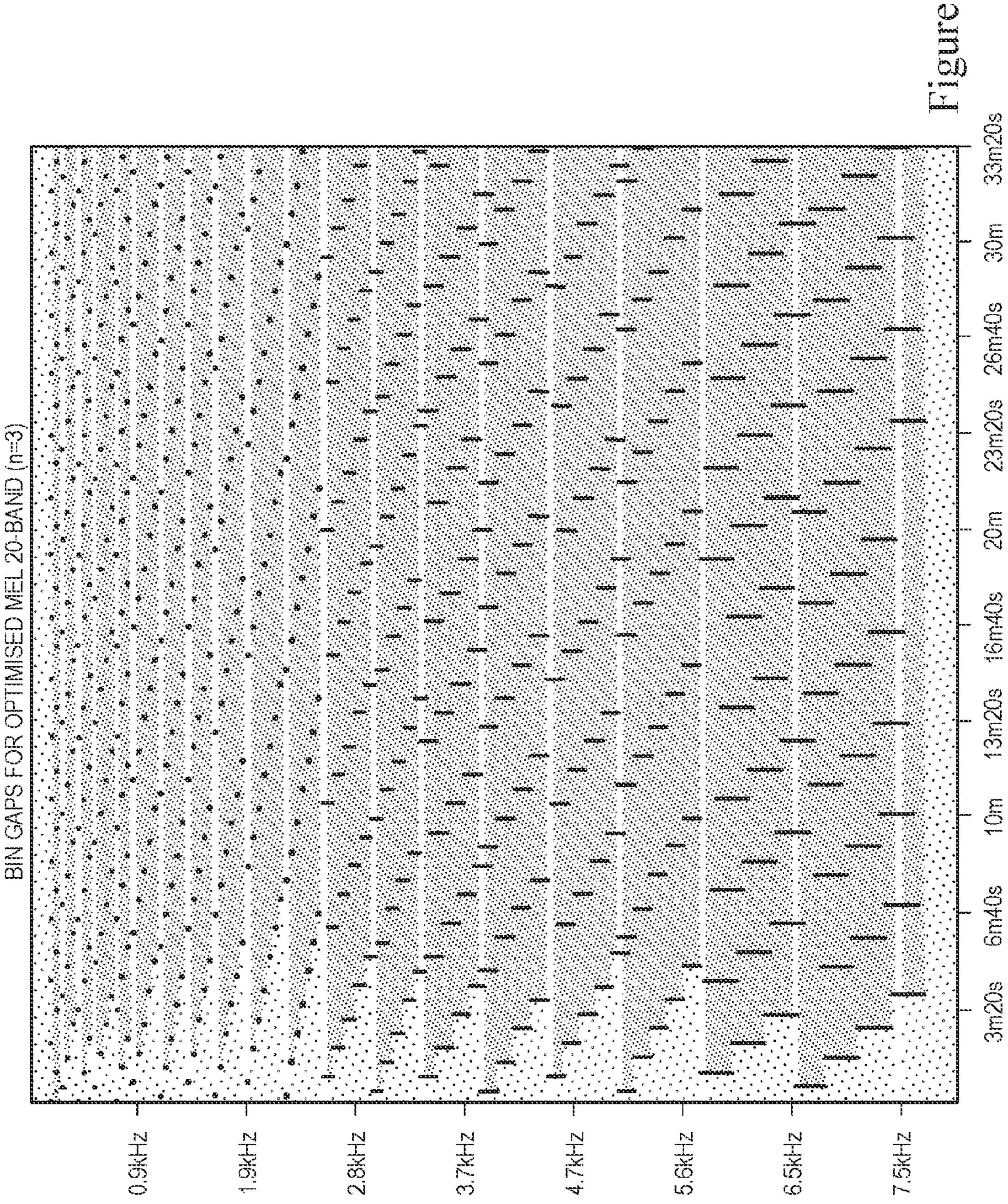

FIGS. 23I and 23J are graphs that show examples of sequences of orchestrated gaps according to another gap allocation strategy. In these examples, the bandwidth of gaps increases with frequency, but at a more conservative rate than the underlying banding structure represented by the horizontal lines in FIGS. 23I and 23J. Increasing the bandwidth of gaps with frequency reduces the overall measurement session time without negatively impacting the perceptibility of the inserted gaps. A second improvement is that for each gap being forced, the gap allocation strategy represented by FIGS. 23I and 23J involves selecting frequency bins within successive frequency bands (this is more evident in FIG. 23I). According to these examples, by remembering/keeping track of the previously measured bin within each band, the next successive bin within that band is measured when that band is revisited. This process does not affect the time taken to measure the complete spectrum, but rapidly reduces the time taken to measure at least a portion of each band at least once. The gap allocation strategy represented by FIGS. 23I and 23J also has a less discernible pattern and structure than the above-described gap allocation strategies, further lowering the perceptibility impact.

Figure 24:
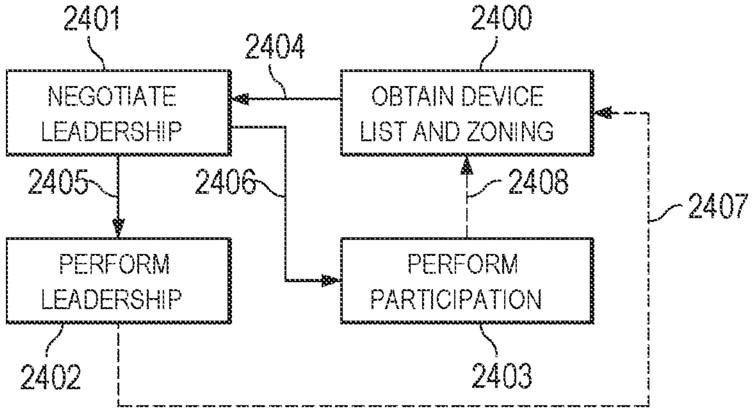
FIGS. 24, 25A and 25B are flow diagrams that show examples of how multiple audio devices coordinate measurement sessions according to some implementations.
Figure 25A:
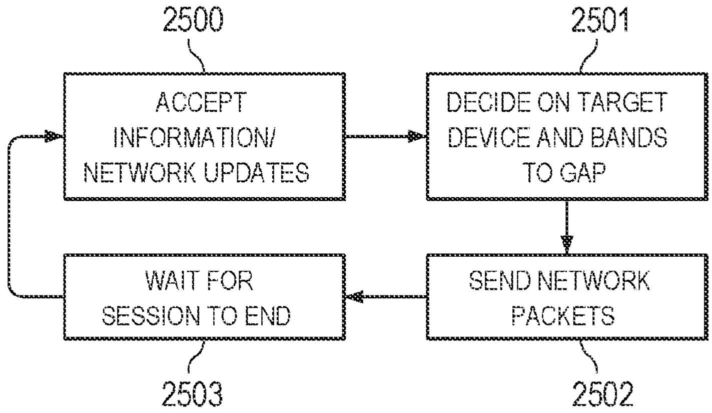
Figure 25B:
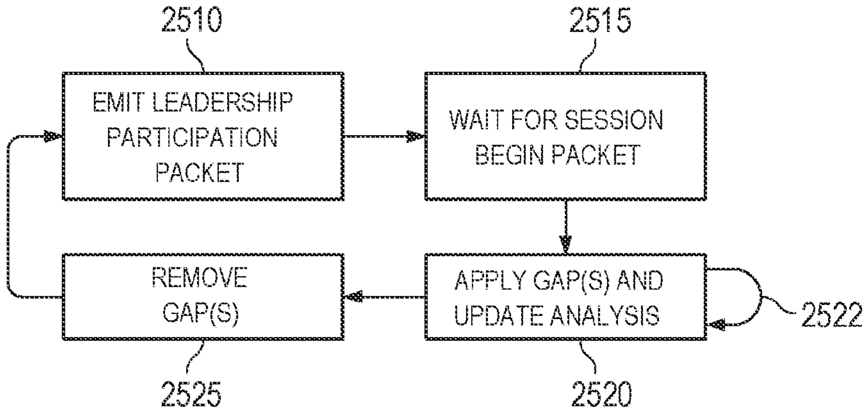

FIGS. 24, 25A and 25B are flow diagrams that show examples of how multiple audio devices coordinate measurement sessions according to some implementations. The blocks shown in FIGS. 24-25B, like those of other methods described herein, are not necessarily performed in the order indicated. For example, in some implementations the operations of block 2401 of FIG. 24 may be performed prior to the operations of block 2400. Moreover, such methods may include more or fewer blocks than shown and/or described.

According to these examples, a smart audio device is the orchestrating device (which also may be referred to herein as the "leader") and only one device may be the orchestrating device at one time. In other examples, the orchestrating device may be what is referred to herein as a smart home hub. The orchestrating device may be an instance of the apparatus 100 that is described above with reference to FIG. 1.

FIG. 24 depicts blocks that are performed by all participating audio devices according this this example. In this example, block 2400 involves obtaining a list of all the other participating audio devices. According to some such examples, block 2400 may involve obtaining an indication of the acoustic zone, group, etc., of each participating audio device. The list of block 2400 may, for example, be created by aggregating information from the other audio devices via network packets: the other audio devices may, for example, broadcast their intention to participate in the measurement session. As audio devices are added and/or removed from the audio environment, the list of block 2400 may be updated. In some such examples, the list of block 2400 may be updated according to various heuristics in order to keep the list up to date regarding only the most important devices (e.g., the audio devices that are currently within the main living space 2101*a* of FIG. 21A).

In the example shown in FIG. 24, the link 2404 indicates the passing of the list of block 2400 to block 2401, the negotiate leadership process. This negotiation process of block 2401 may take different forms, depending on the particular implementation. In the simplest embodiments, an alphanumeric sort for the lowest or highest device ID code (or other unique device identifier) may determine the leader without multiple communication rounds between devices, assuming all the devices can implement the same scheme. In more complex implementations, devices may negotiate with one another to determine which device is most suitable to be leader. For instance, it may be convenient for the device that aggregates orchestrated information to also be the leader for the purposes of facilitating the measurement sessions. The device with the highest uptime, the device with the greatest computational ability and/or a device connected to the main power supply may be good candidates for leadership. In general, arranging for such a consensus across multiple devices is a challenging problem, but a problem that has many existing and satisfactory protocols and solutions (for instance, the Paxos protocol). It will be understood that many such protocols exist and would be suitable.

All participating audio devices then go on to perform block 2403, meaning that the link 2406 is an unconditional link in this example. Block 2403 is described below with reference to FIG. 25B. If a device is the leader, it will perform block 2402. In this example, the link 2405 involves a check for leadership. The leadership process is described below with reference to FIG. 25A. The outputs from this leadership process, including but not limited to messages to the other audio devices, are indicated by link 2407 of FIG. 24.

FIG. 25A shows examples of processes performed by the orchestrating device or leader. Block 501 involves selecting a target device to be measured and selecting a gap allocation strategy, e.g., the start and end times of the gaps to be used during the measurement session, and the gaps' locations and size in the frequency. In some examples, block 2501 may involve selecting time t1, t2 and/or t3, as described above with reference to FIG. 22B. Different applications may motivate different strategies for the foregoing selections. For example, the target device to be measured may be selected in some examples in part based on a measurement of "urgency," e.g., favouring devices and frequency bands that have not been measured recently. In some instances, a particular target device may be more important to measure based on a specific application or use case. For instance, the position of speakers used for the "left" and "right" channels in a spatial presentation may be generally be important to measure.

According to this example, after the orchestrating device has made the selections of block 2501, the process of FIG. 25A continues to block 2502. In this example, block 2502 involves sending the information determined in block 2501 to the other participating audio devices. In some examples, block 2502 may involve sending the information to the other participating audio devices via wireless communication, e.g., over a local Wi-Fi network, via Bluetooth, etc. In some examples, block 2502 may involve sending the details of the gap allocation strategy to the other participating audio devices, e.g., the start and end times of the gaps to be used during the measurement session, and the gaps' locations and size in the frequency. In other examples, the other participating audio devices may have stored information regarding each of a plurality of gap allocation strategies. In some such examples, block 2502 may involve sending an indication of the stored gap allocation strategy to select, e.g., gap allocation strategy 1, gap allocation strategy 2, etc. In some examples, block 2502 may involve sending a "session begin" indication, e.g., as described below with reference to FIG. 25B.

According to this example, after the orchestrating device has performed block 2502, the process of FIG. 25A continues to block 2503, wherein the orchestrating device waits for the current measurement session to end. In this example, in block 2503 the orchestrating device waits for confirmations that all of the other participating audio devices have ended their sessions.

In this example, after the orchestrating device has received confirmations from all of the other participating audio devices in block 2503, the process of FIG. 25A continues to block 2500, wherein the orchestrating device is provided information about the measurement session. Such information may influence the selection and timing of future measurement sessions. In some embodiments, block 2500 involves accepting measurements that were obtained during the measurement session from all of the other participating audio devices. The type of received measurements may depend on the particular implementation. According to some examples, the received measurements may be, or may include, microphone signals. Alternatively, or additionally, in some examples the received measurements may be, or may include, audio data extracted from the microphone signals. In some implementations, the orchestrating device may perform (or cause to be performed) one or more operations on the measurements received. For example, the orchestrating device may estimate (or cause to be estimated) a target audio device audibility or a target audio device position based, at least in part, on the extracted audio data. Some implementations may involve estimating a far-field audio environment impulse response and/or audio environment noise based, at least in part, on the extracted audio data.

In the example shown in FIG. 25A, the process will revert to block 2501 after block 2500 is performed. In some such examples, the process will revert to block 2501 a predetermined period of time after block 2500 is performed. In some instances, the process may revert to block 2501 in response to user input.

FIG. 25B shows examples of processes performed by participating audio devices other than the orchestrating device. Here, block 2510 involves each of the other participating audio devices sending a transmission (e.g., a network packet) to the orchestrating device, signalling each device's intention to participate in one or more measurement sessions. In some embodiments, block 2510 also may involve sending the results of one or more previous measurement sessions to the leader.

In this example, block 2515 follows block 2510. According to this example, block 2515 involves waiting for notification that a new measurement session will begin, e.g., as indicated via a "session begin" packet.

According to this example, block 2520 involves applying a gap allocation strategy according to information provided by the orchestrating device, e.g., along with a "session begin" packet that was awaited in block 2515. In this example, block 2520 involves applying the gap allocation strategy to generate modified audio playback signals that will be played back by participating audio devices (except the target audio device, if any) during the measurement session. According to this example, block 2520 involves detect audio device playback sound via audio device microphones and generating corresponding microphone during the measurement session. As suggested by the link 2522, in some instances block 2520 may be repeated until all measurement sessions indicated by the orchestrating device are complete (e.g., according to a "stop" indication (for example, a stop packet) received from the orchestrating device, or after a predetermined duration of time). In some instances, block 2520 may be repeated for each of a plurality of target audio devices.

Finally, block 2525 involves ceasing to insert the gaps that were applied during the measurement session. In this example, after block 2525 the process of FIG. 25B reverts back to block 2510. In some such examples, the process will revert to block 2510 a predetermined period of time after block 2525 is performed. In some instances, the process may revert to block 2510 in response to user input.

In some implementations, the frequency region, duration, and ordering of target devices in a set sequence may be determined by a simple algorithm based on unique device ID/names alone. For instance, the ordering of target devices may come in some agreed upon lexical/alphanumeric order, and the frequency and gap duration may be based on the present time of day, common to all devices. Such simplified embodiments have a lower system complexity but may not adapt with more dynamic needs of the system.

Example Measurements on Microphone Signals Revealed Through Gaps

Sub-band signals measured over the duration of an orchestrated gap measurement session correspond to the noise in the room, plus direct stimulus from the target device if one has been nominated. In this section we show examples of acoustic properties and related information that be determined from these sub-band signals, for further use in mapping, calibration, noise suppression and/or echo attenuation applications.

Ranging

According to some examples, sub-band signals measured during an orchestrated gap measurement session may be used to estimate the approximate distance between audio devices, e.g., based on an estimated direct-to-reverb ratio. For example, the approximate distance may be estimated based on a $1/r^2$ law if the target audio device can advertise an output sound pressure level (SPL), and if the speaker-to-microphone distance of the measuring audio device is known.

DoA

In some examples, sub-band signals measured during an orchestrated gap measurement session may be used to estimate the direction of arrival (DoA) and/or time or arrival (ToA) of sounds emitted by (e.g., speech of) one or more people and/or one or more audio devices in an audio environment. In some such examples, an acoustic zone corresponding with a current location of the one or more people and/or the one or more audio devices may be estimated. Some examples are described below with reference to FIG. 8A et seq.

Audibility & Impulse Responses

According to some examples (e.g., in implementations such as that shown in FIG. 6), during a measurement session both a reference signal r and microphone signal m may be recorded and closely time-aligned over a period of P audio frames. We can denote:

$$r(t)\in\mathbb{C}^n, m(t)\in\mathbb{C}^n$$

In the foregoing expression, $\mathbb{C}^n$ represents a complex number space of dimension (size) n, r(t) and m(t) represent complex vectors of length n, and n represents the number of complex frequency bins used for the given measurement session. Accordingly, m(t) represents subband domain microphone signals. We can also denote:

$$t\in\mathbb{Z},\ 1\leq t\leq P$$

In the foregoing expression, $\mathbb{Z}$ represents the set of all integer numbers and t represents any integer number in the range of 1-P, inclusively.

In this formulation, a classic channel identification problem may be solved, attempting to estimate a linear transfer function H that predicts the signal m from r. Existing solutions to this problem include adaptive finite impulse response (FIR) filters, offline (noncausal) Wiener filters, and many other statistical signal processing methods. The magnitude of the transfer function H may be termed audibility, a useful acoustic property that may in some applications be used to rank devices relevance to one another based on how "mutually-audible" they are. According to some examples, the magnitude of the transfer function H may be determined at a range of audio device playback levels in order to determine whether played-back audio data indicates audio device non-linearities, e.g., as described above.

Some aspects of present disclosure include a system or device configured (e.g., programmed) to perform one or more examples of the disclosed methods, and a tangible computer readable medium (e.g., a disc) which stores code for implementing one or more examples of the disclosed methods or steps thereof. For example, some disclosed systems can be or include a programmable general purpose processor, digital signal processor, or microprocessor, programmed with software or firmware and/or otherwise configured to perform any of a variety of operations on data, including an embodiment of disclosed methods or steps thereof. Such a general purpose processor may be or include a computer system including an input device, a memory, and a processing subsystem that is programmed (and/or otherwise configured) to perform one or more examples of the disclosed methods (or steps thereof) in response to data asserted thereto.

Some embodiments may be implemented as a configurable (e.g., programmable) digital signal processor (DSP) that is configured (e.g., programmed and otherwise configured) to perform required processing on audio signal(s), including performance of one or more examples of the disclosed methods. Alternatively, embodiments of the disclosed systems (or elements thereof) may be implemented as a general purpose processor (e.g., a personal computer (PC) or other computer system or microprocessor, which may include an input device and a memory) which is programmed with software or firmware and/or otherwise configured to perform any of a variety of operations including one or more examples of the disclosed methods. Alternatively, elements of some embodiments of the inventive system are implemented as a general purpose processor or DSP configured (e.g., programmed) to perform one or more examples of the disclosed methods, and the system also includes other elements (e.g., one or more loudspeakers and/or one or more microphones). A general purpose processor configured to perform one or more examples of the disclosed methods may be coupled to an input device (e.g., a mouse and/or a keyboard), a memory, and a display device.

Another aspect of present disclosure is a computer readable medium (for example, a disc or other tangible storage medium) which stores code for performing (e.g., coder executable to perform) one or more examples of the disclosed methods or steps thereof.

While specific embodiments and applications have been described herein, it will be apparent to those of ordinary skill in the art that many variations on the embodiments and applications described herein are possible without departing from the scope described and claimed herein. It should be understood that while certain forms have been shown and described, the scope of the present disclosure is not to be limited to the specific embodiments described and shown or the specific methods described.

The invention claimed is:

1. An audio processing method, comprising:

causing, by a control system, a plurality of audio devices in an audio environment to reproduce audio data, each audio device of the plurality of audio devices including at least one loudspeaker and at least one microphone;

determining, by the control system, audio device location data including an audio device location for each audio device of the plurality of audio devices;

obtaining, by the control system, microphone data from each audio device of the plurality of audio devices, the microphone data corresponding, at least in part, to sound reproduced by loudspeakers of other audio devices in the audio environment;

determining, by the control system, a mutual audibility for each audio device of the plurality of audio devices relative to each other audio device of the plurality of audio devices;

determining, by the control system, a user location of a person in the audio environment;

determining, by the control system, a user location audibility of each audio device of the plurality of audio devices at the user location; and controlling one or more aspects of audio device playback based, at least in part, on the user location audibility.

2. The method of claim 1, wherein determining the audio device location data involves an audio device auto-location process.

3. The method of claim 2, wherein the audio device auto-location process involves obtaining direction of arrival data for each audio device of the plurality of audio devices.

4. The method of claim 2, wherein the audio device auto-location process involves obtaining time of arrival data for each audio device of the plurality of audio devices.

5. The method of claim 1, wherein determining the user location is based, at least in part, on at least one of direction of arrival data or time of arrival data corresponding to one or more utterances of the person.

6. The method of claim 1, wherein the one or more aspects of audio device playback include one or more of leveling or equalization.

7. The method of claim 1, wherein determining the mutual audibility for each audio device involves determining a mutual audibility matrix.

8. The method of claim 7, wherein determining the mutual audibility matrix involves a process of mapping decibels relative to full scale to decibels of sound pressure level.

9. The method of claim 7, wherein the mutual audibility matrix includes measured transfer functions between each audio device of the plurality of audio devices.

10. The method of claim 7, wherein the mutual audibility matrix includes values for each frequency band of a plurality of frequency bands.

11. The method of claim 7, further comprising determining an interpolated mutual audibility matrix by applying an interpolant to measured audibility data.

12. The method of claim 11, wherein determining the interpolated mutual audibility matrix involves applying a decay law model that is based in part on a distance decay constant.

13. The method of claim 12, wherein the distance decay constant includes at least one of a per-device parameter or an audio environment parameter.

14. The method of claim 12, wherein the decay law model is frequency band based.

15. The method of claim 12, further comprising estimating an output gain for each audio device of the plurality of audio devices according to values of the mutual audibility matrix and the decay law model.

16. The method of claim 15, wherein estimating the output gain for each audio device involves determining a least squares solution to a function of values of the mutual audibility matrix and the decay law model.

17. The method of claim 15, further comprising determining values for the interpolated mutual audibility matrix according to a function of the output gain for each audio device, the user location and each audio device location.

18. The method of claim 17, wherein the values for the interpolated mutual audibility matrix correspond to the user location audibility of each audio device.

19. An apparatus configured to perform the method of claim 1.

20. A system configured to perform the method of claim 1.

21. One or more non-transitory media having software stored thereon, the software including instructions for controlling one or more devices to perform the method of claim 1.

* * * * *